US010389920B2

(12) United States Patent
Shiohara

(10) Patent No.: US 10,389,920 B2
(45) Date of Patent: Aug. 20, 2019

(54) IMAGING DEVICE, IMAGING DISPLAY APPARATUS, AND VEHICLE

(71) Applicant: SEIKO EPSON CORPORATION, Tokyo (JP)

(72) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 138 days.

(21) Appl. No.: 15/502,399

(22) PCT Filed: Aug. 7, 2015

(86) PCT No.: PCT/JP2015/003985
§ 371 (c)(1),
(2) Date: Feb. 7, 2017

(87) PCT Pub. No.: WO2016/024396
PCT Pub. Date: Feb. 18, 2016

(65) Prior Publication Data
US 2017/0237882 A1    Aug. 17, 2017

(30) Foreign Application Priority Data

Aug. 11, 2014  (JP) ................................ 2014-163407
Jul. 8, 2015   (JP) ................................ 2015-136740

(51) Int. Cl.
*H04N 5/00*       (2011.01)
*H04N 5/04*       (2006.01)
(Continued)

(52) U.S. Cl.
CPC ................. *H04N 5/04* (2013.01); *B60R 1/00* (2013.01); *G06F 3/147* (2013.01); *G09G 5/00* (2013.01);
(Continued)

(58) Field of Classification Search
CPC ........... H04N 5/04; H04N 7/18; H04N 5/2624
See application file for complete search history.

(56) References Cited

U.S. PATENT DOCUMENTS 5,812,332 A    9/1998  Freeman
6,456,335 B1 * 9/2002  Miura .................. H04N 5/2624
                                                348/14.12
(Continued)

FOREIGN PATENT DOCUMENTS

JP    05-008661 A    1/1993
JP    06-144083 A    5/1994
(Continued)

*Primary Examiner* — Frank F Huang

(57) ABSTRACT

An imaging device that includes an imaging unit included K imaging elements, a display unit included K display areas, an image signal generation unit that generates partial image signals based on imaging signals output from the imaging unit, and outputs image signals to the display unit, and a timing control unit that outputs a timing when the image processing generation unit outputs the image signal based on display output line information and image processing line information, and the image processing generation unit outputs an image signal indicating an image to be displayed in a display target line in a case where the display output line information and the image processing line information indicate the display target line.

8 Claims, 28 Drawing Sheets

(51) Int. Cl.
*B60R 1/00* (2006.01)
*G09G 5/00* (2006.01)
*H04N 5/232* (2006.01)
*H04N 7/18* (2006.01)
*H04N 5/225* (2006.01)
*H04N 5/247* (2006.01)
*H04N 5/357* (2011.01)
*G06F 3/147* (2006.01)
*G09G 5/12* (2006.01)
*G09G 5/18* (2006.01)
*G06T 3/40* (2006.01)

(52) U.S. Cl.
CPC .............. *G09G 5/006* (2013.01); *G09G 5/12* (2013.01); *G09G 5/18* (2013.01); *H04N 5/2254* (2013.01); *H04N 5/232* (2013.01); *H04N 5/23293* (2013.01); *H04N 5/247* (2013.01); *H04N 5/3572* (2013.01); *H04N 7/181* (2013.01); *B60K 2370/1438* (2019.05); *B60K 2370/152* (2019.05); *B60K 2370/155* (2019.05); *B60K 2370/21* (2019.05); *B60K 2370/31* (2019.05); *B60K 2370/334* (2019.05); *B60K 2370/77* (2019.05); *B60R 2300/105* (2013.01); *B60R 2300/205* (2013.01); *B60R 2300/303* (2013.01); *B60R 2300/306* (2013.01); *B60R 2300/802* (2013.01); *B60R 2300/8046* (2013.01); *B60R 2300/8066* (2013.01); *G06T 3/4007* (2013.01); *G06T 2210/22* (2013.01); *G09G 2340/0492* (2013.01); *G09G 2370/08* (2013.01); *G09G 2380/10* (2013.01); *H04N 5/2257* (2013.01)

(56) References Cited

U.S. PATENT DOCUMENTS

| | | |
|---|---|---|
| 2002/0008926 A1 | 1/2002 | Freeman |
| 2004/0109251 A1 | 6/2004 | Freeman |
| 2005/0158520 A1 | 7/2005 | Freeman |
| 2005/0168695 A1 | 8/2005 | Ooba et al. |
| 2007/0038567 A1* | 2/2007 | Allaire ............... G06Q 30/0239 705/50 |
| 2009/0231432 A1* | 9/2009 | Grigsy ................. G08G 1/161 348/149 |
| 2009/0244740 A1 | 10/2009 | Takayanagi et al. |
| 2010/0245701 A1 | 9/2010 | Sato et al. |
| 2010/0284384 A1* | 11/2010 | Stahlin ................ H04W 76/40 370/338 |
| 2010/0303048 A1* | 12/2010 | Stahlin ................ H04W 84/12 370/338 |
| 2011/0098877 A1* | 4/2011 | Stahlin ................ G08G 1/161 701/31.4 |
| 2011/0128902 A1* | 6/2011 | Guo ....................... G08G 1/161 370/312 |
| 2011/0177791 A1* | 7/2011 | Stahlin ................ B60R 25/102 455/404.2 |
| 2011/0234800 A1* | 9/2011 | Terasaki .................. H04N 5/04 348/148 |
| 2011/0246594 A1* | 10/2011 | Cobbold ............... G06Q 10/10 709/206 |
| 2012/0050470 A1 | 3/2012 | Oba |
| 2013/0038735 A1 | 2/2013 | Nishiguchi et al. |
| 2014/0085420 A1* | 3/2014 | Shahinian ............. A61B 1/045 348/45 |
| 2014/0160339 A1 | 6/2014 | Shiohara |
| 2014/0343358 A1* | 11/2014 | Hameed ................ A61B 1/053 600/109 |

FOREIGN PATENT DOCUMENTS

| | | |
|---|---|---|
| JP | 07-195959 A | 8/1995 |
| JP | 08-178679 A | 7/1996 |
| JP | 09-254681 A | 9/1997 |
| JP | 10-166943 A | 6/1998 |
| JP | 10-305742 A | 11/1998 |
| JP | 11-255020 A | 9/1999 |
| JP | 2000-131642 A | 5/2000 |
| JP | 2000-177483 A | 6/2000 |
| JP | 2001-114048 A | 4/2001 |
| JP | 3154676 B2 | 4/2001 |
| JP | 2005-284029 A | 10/2005 |
| JP | 2006-135797 A | 5/2006 |
| JP | 2006-248374 A | 9/2006 |
| JP | 2007-110572 A | 4/2007 |
| JP | 2008-094292 A | 4/2008 |
| JP | 2008-126973 A | 6/2008 |
| JP | 2009-075988 A | 4/2009 |
| JP | 2009-141456 A | 6/2009 |
| JP | 4280648 B2 | 6/2009 |
| JP | 2010-221899 A | 10/2010 |
| JP | 4695665 B2 | 6/2011 |
| JP | 4706896 B2 | 6/2011 |
| JP | 2011-213185 A | 10/2011 |
| JP | 2011-213186 A | 10/2011 |
| JP | 2012-049918 A | 3/2012 |
| JP | 2012-240467 A | 12/2012 |
| JP | 2014-103647 A | 6/2014 |
| WO | 2011/118125 A1 | 9/2011 |

* cited by examiner

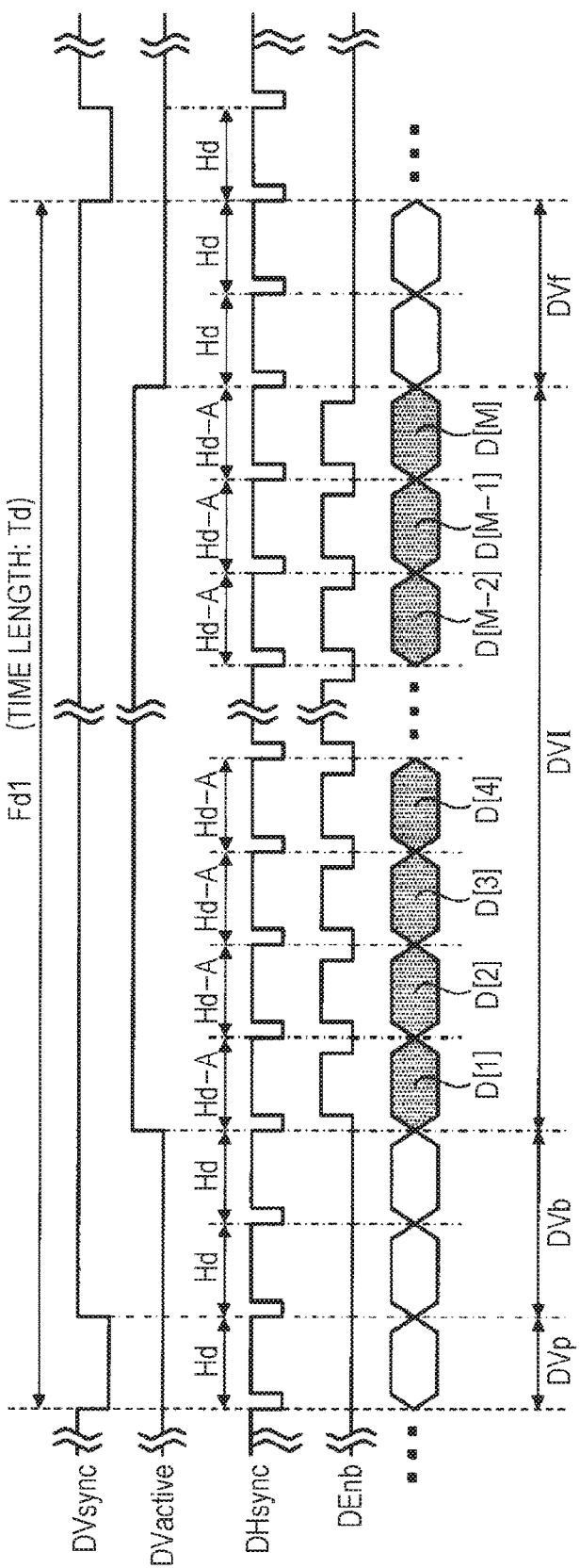

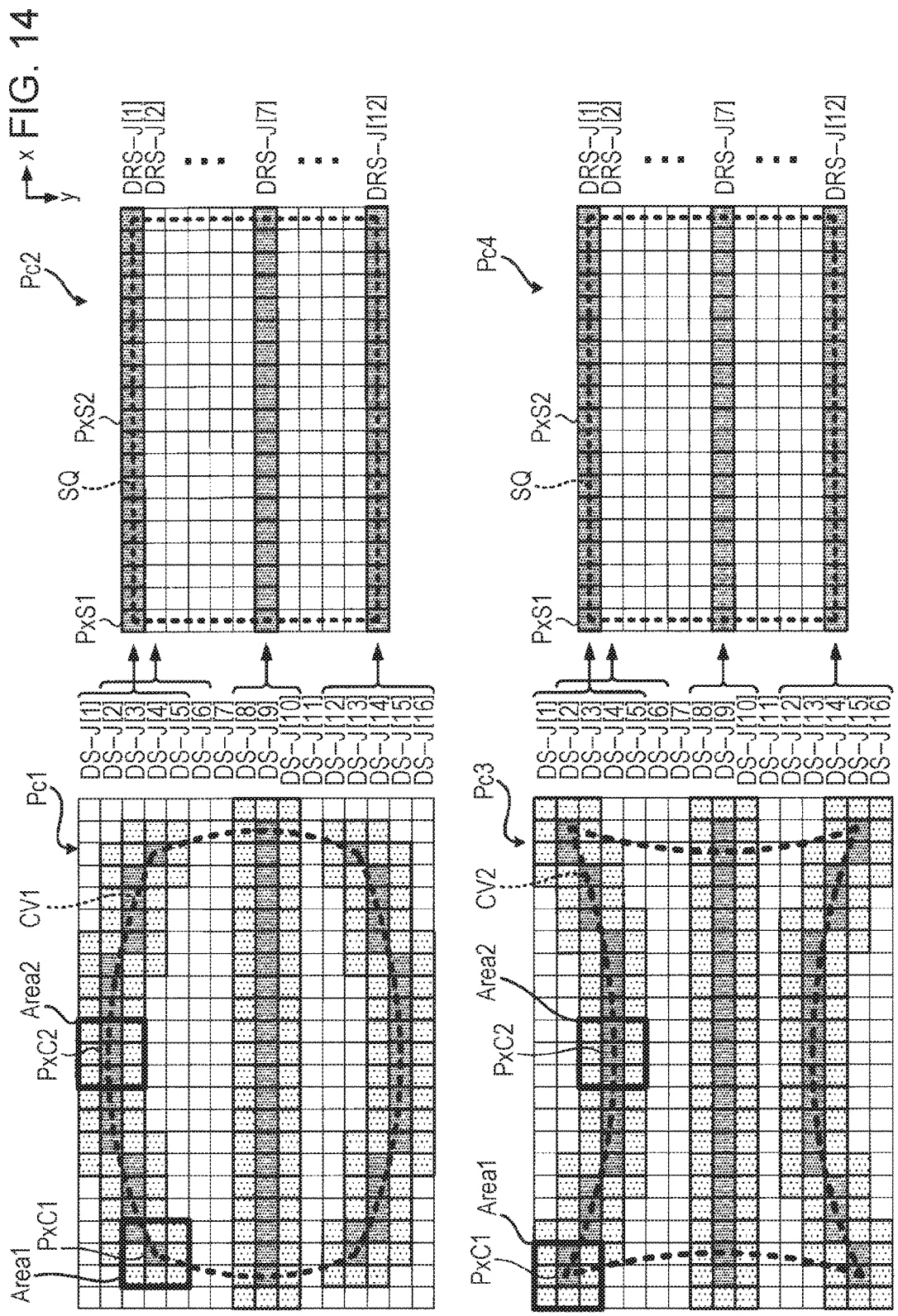

IMAGING DEVICE, IMAGING DISPLAY APPARATUS, AND VEHICLE

TECHNICAL FIELD

The present invention relates to an imaging device, an imaging display apparatus, and a vehicle.

BACKGROUND ART

In the related art, a technology in which images indicted by a plurality of image signals are combined and the combined image is displayed in a display area has been known (for example, PTL 1).

Such a technology in which the plurality of image signals is combined and displayed is utilized as an imaging display apparatus that displays an image indicating a situation outside of a vehicle in the interior of the vehicle to assist the driving of the vehicle. For example, PTL 2 discloses a technology in which images indicated by a plurality of imaging signals output from a plurality of image sensors (imaging elements) which images the outside of a vehicle are combined and the combined image is displayed on a display unit provided within the vehicle.

CITATION LIST

Patent Literature

PTL 1: Japanese Unexamined Patent Application Publication No. 2005-284029
PTL 2: Japanese Unexamined Patent Application Publication No. 2009-075988

SUMMARY OF INVENTION

Technical Problem

Incidentally, in a case where the displayed image is a moving image, there is a high necessity of displaying the imaging results of the image sensors in real time. Particularly, a vehicle imaging display apparatus is required to strictly display the imaging results in real time in order to safely drive the vehicle.

However, since the image sensor and the display unit are different devices, these devices are typically operated in synchronization with different reference signals. Thus, there is a discrepancy between the starting of a frame of the imaging signal and the starting of a frame of the image signal, and thus, a delay time may be long. For example, if the frame of the imaging signal is started immediately after the frame of the image signal is started, as many delay time as one or more frame periods of the image signal occurs.

In a case where the image indicated by the plurality of imaging signals output from the plurality of image sensors are combined and displayed, a delay time from imaging to displaying may be longer than that in a case where the image indicated by the imaging signal output from a single image sensor is displayed.

The present invention has been made in view of such circumstances, and it is an object of the present invention to reduce a delay time from imaging to displaying in a case where images based on a plurality of imaging signals output from a plurality of image sensors are displayed.

Solution to Problem

In order to achieve the aforementioned object, the present invention provides an imaging device including: an imaging unit that includes K imaging elements (K is a natural number which is equal to or greater than 2) which image subject to output imaging signals; a display unit that has K display areas in a one-to-one correspondence with the K imaging elements of the imaging unit; an image signal generation unit that generates partial image signals indicating images to be displayed in the respective lines of a j-th display area (j is a natural number which satisfies $1 \leq j \leq K$) of the display unit based on imaging signals output from the j-th imaging element of the imaging unit, and outputs image signals which include K partial image signals corresponding to the K display areas and indicate images to be displayed in the respective lines of the display unit to the display unit; and a timing control unit that controls a timing when the image processing generation unit outputs the image signal based on display output line information indicating a line corresponding to an image signal which has been output to the display unit from the image signal generation unit and image processing line information indicating a line in which an image is displayed last, among the lines corresponding to the partial image signals generated by the image signal generation unit. The timing control unit controls the image signal generation unit to output an image signal indicating an image to be displayed in a display target line in a case where the display output line information indicates a line in which an image is displayed earlier than the display target line and the image processing line information indicates a line in which an image is displayed after a timing when an image is displayed in the display target line.

According to the present invention, in a case where all the partial image signals constituting the image signal of the display target line are generated, the image signal of the display target line can be output when the output of an image signal of a preceding display line in which an image is displayed earlier than the display target line is completed. Meanwhile, when the output of the image signal of the preceding display line is completed, in a case where the image signal of the display target line is not generated, the image signal of the display target line can be output at the timing when the image signal of the display target line is generated. That is, according to the present invention, the image signal of the display target line can be output at the timing when the image signal of the display target line can be output. Thus, it is possible to control the timing when the image signals of the respective lines are output to the display unit depending on the image processing times for the respective lines. Accordingly, it is possible to further reduce a delay from the imaging by the imaging unit to the displaying by the display unit than that in a case where the output timing of the image signals of the respective lines is determined without taking the change of the image processing times for the respective lines into consideration.

In the imaging device, the display unit may be able to display images in the respective lines for every period determined by a display horizontal synchronization pulse output at a predetermined cycle, the image signal generation unit may output the image signal in synchronization with the display horizontal synchronization pulse, and the timing control unit may control the image signal generation unit to stop outputting the image signal indicating the image to be displayed in the display target line in a case where the display output line information indicates the line in which the image is displayed earlier than the display target line and the image processing line information indicates a line in which an image is displayed earlier than the display target line, and may control the image signal generation unit to output the image signal indicating the image to be displayed in the display target line in synchronization with the display horizontal synchronization pulse output after the line indicated by the image processing line information becomes the display target line.

According to the aspect, it is possible to control the output timing of the image signals of the respective lines with the precision of the horizontal scanning period determined by the display horizontal synchronization pulse. Thus, for example, the occurrence of a long delay can be prevented such that an interval from the imaging to the displaying becomes a period which is equal to or greater than one frame period.

In the imaging device, the display unit may be able to display images in the respective lines for every period determined by a display horizontal synchronization pulse, the image signal generation unit may output the image signal in synchronization with the display horizontal synchronization pulse, and the timing control unit may be able to output the display horizontal synchronization pulse at a variable cycle, may control the image signal generation unit to stop outputting the display horizontal synchronization pulse and to stop outputting the image signal indicating the image to be displayed in the display target line in a case where the display output line information indicates the line in which the image is displayed earlier than the display target line and the image processing line information indicates a line in which an image is displayed earlier than the display target line, and may control the image signal generation unit to output the display horizontal synchronization pulse and to output the image signal indicating the image to be displayed in the display target line in synchronization with the output display horizontal synchronization pulse in a case where the line indicated by the image processing line information becomes the display target line.

According to the aspect, a time length of the horizontal scanning period determined by the display horizontal synchronization pulse is determined depending on the timing when the image signals of the respective lines can be output. Thus, it is possible to output the image signals of the respective lines to the display unit at the timing corresponding to the image processing times for the respective lines, and it is possible to further reduce the delay from the imaging to the displaying than that in a case where the output timing of the image signals of the respective lines is determined without taking the change of the image processing times of the respective lines into consideration.

The present invention provides an imaging device including: an imaging unit that includes K imaging elements (K is a natural number which is equal to or greater than 2) which image subjects and output imaging signals indicating imaging results in synchronization with an imaging synchronization signal; a display unit that includes K display areas in a one-to-one correspondence with the K imaging elements of the imaging unit, and is able to display an image at a frame rate higher than that of the imaging unit in synchronization with a display synchronization signal; an image signal generation unit that generates a partial image signal indicating an image to be displayed in a j-th display area (j is a natural number which satisfies $1 \leq j \leq K$) of the display unit based on an imaging signal output from the j-th imaging element of the imaging unit, and outputs an image signal which includes K partial image signals corresponding to the K display areas and indicates an image to be displayed on the display unit to the display unit in synchronization with the display synchronization signal; and a timing control unit that controls a timing when the image signal generation unit outputs the image signal. When a time from starting of a frame of the imaging synchronization signal to starting of a frame of the display synchronization signal is a phase difference, a frame rate of the imaging unit is a first frame rate, and a highest frame rate at which the display unit is able to display is a second frame rate, the timing control unit is able to perform first timing control for gradually decreasing the phase difference in a case where the phase difference is greater than a predetermined time by causing the image signal generation unit to output the image signal such that a frame rate of the display unit is the second frame rate, and second timing control for causing the image signal generation unit to output the image signal such that the frame rate of the display unit is the first frame rate after the phase difference is equal to or less than the predetermined time.

In the present invention, in a case where the phase difference between the imaging unit and the display unit is greater than the predetermined time, the image signal is output at the second frame rate which is the higher frame rate than that of the imaging unit, and thus, the phase difference is reduced by the period equivalent to the difference between the frame period of the display unit and the frame period of the imaging unit. After the phase difference is equal to or less than the predetermined time, the frame rate of the display unit becomes the first frame rate which is the frame rate of the imaging unit, and thus, the image signal is output in synchronization with the imaging signal.

Thus, in a case where the phase difference is greater than the predetermined time, it is possible to gradually reduce the phase difference until the phase difference is equal to or less than the predetermined time, and it is possible to maintain the phase difference after the phase difference converges on the length which is equal to or less than the predetermined time. Accordingly, it is possible to maintain the state in which the delay time from the imaging to the displaying is minimized.

For example, the predetermined time may be a time determined based on a time required to generate as many image signals as one line of the display unit.

In the imaging device, in a case where the phase difference is greater than the predetermined time, the timing control unit may generate the K partial image signals, waits until the image indicated by the K partial image signals is able to be displayed on the display unit, and may output the image signal including the K partial image signals to the display unit.

According to the aspect, since the image signal is output such that the frame rate of the display unit becomes the second frame rate by waiting until the display unit is able to display the image indicated by the image signal, it is possible to gradually reduce the phase difference between the imaging unit and the display unit.

In the imaging device, the display synchronization signal may include a display horizontal synchronization pulse having a predetermined cycle, and the timing control unit may output the image signal including the K partial image signals to the display unit in synchronization with a first display horizontal synchronization pulse output after an image signal generation time when the generation of the K partial image signals is completed in a case where the image signal generation time is equal to or less than a display available time when the image indicated by the K partial image signals is able to be displayed on the display unit after the phase difference is equal to or less than the predetermined time.

According to the aspect, the interval from the generation of the image signal to the output thereof can be set to be equal to or less than the horizontal scanning period determined by the display horizontal synchronization pulse. That is, it is possible to control the output timing of the image signal with the precision of the horizontal scanning period determined by the display horizontal synchronization pulse. Thus, it is possible to output the image signal to the display unit at the timing corresponding to the completion of the image processing, and it is possible to further reduce the delay from the imaging to the displaying than that in a case where the output timing of the image signal is determined without taking the change of the image processing times into consideration.

In the imaging device, the timing control unit may output the display synchronization signal including a display horizontal synchronization pulse having a variable cycle, may stop outputting the display horizontal synchronization pulse and may stop outputting the image signal including the K partial image signals until an image signal generation time when generation of the K partial image signals is completed, in a case where the image signal generation time is equal to or less than a display available time when the image indicated by the K partial image signals is able to be displayed on the display unit after the phase difference is equal to or less than the predetermined time, and may output the display horizontal synchronization pulse and may output the image signal including the K partial image signals in synchronization with the output display horizontal synchronization pulse after the image signal generation time.

According to the aspect, the time length of the horizontal scanning period determined by the display horizontal synchronization pulse is determined depending on the timing when the image signal can be output. Thus, it is possible to output the image signal to the display unit at the timing corresponding to the completion of the image processing, and it is possible to further reduce the delay from the imaging to the displaying than that in a case where the output timing of the image signal is determined without taking the change of the image processing times into consideration.

In the imaging device, the display unit may be provided within a vehicle, and the imaging elements may image the outside of the vehicle.

According to the aspect, since the state of the outside of the vehicle can be displayed on the display unit in the interior of the vehicle in real time, the vehicle can safely run.

In the imaging device, the K imaging elements included in the imaging unit may include a first imaging element that images a subject in the rear of the vehicle, a second imaging element that images a subject on a rear left side of the vehicle, and a third imaging element that images a subject on a rear right side of the vehicle, and the K display areas of the display unit may include a first display area that corresponds to the first imaging element, a second display area that corresponds to the second imaging element and is formed on a left side of the first display area, and a third display area which corresponds to the third imaging element and is formed on a right side of the first display area.

The imaging device according to the aspect can be used instead of the rear-view mirror or the wing mirror, and the driver can visually perceive the state of the outside of the vehicle required to safely drive the vehicle. Accordingly, since it is possible to design a vehicle (interior) with excellent design and it is not necessary to attach the wing mirror onto a vehicle external surface, a wind pressure at the time of running is reduced.

The present invention provides an imaging display apparatus including: the display unit; and the above-described imaging device. The present invention provides a vehicle comprising the above-described imaging display apparatus.

BRIEF DESCRIPTION OF DRAWINGS

FIG. 11A is a timing chart for describing the operation of the vehicle imaging display apparatus 1.

FIG. 14 is an explanatory diagram for describing a distortion correction process.

DESCRIPTION OF EMBODIMENTS

Embodiments for implementing the present invention will be described with reference to the drawings. In the respective drawings, dimensions and scales of the respective units are appropriately different from actual dimensions and scales. Since the embodiments to be described below are preferable specific examples of the present invention, various preferable technical limitations are imposed thereon. However, the scope of the present invention is not limited to these embodiments unless there is particularly description limiting the present invention in the following description.

<A. First Embodiment>

Hereinafter, in a first embodiment, a vehicle imaging display apparatus 1 will be described as an example of an "imaging display apparatus".

<1. Entire Configuration of Vehicle Imaging Display Apparatus>

Figure 1:
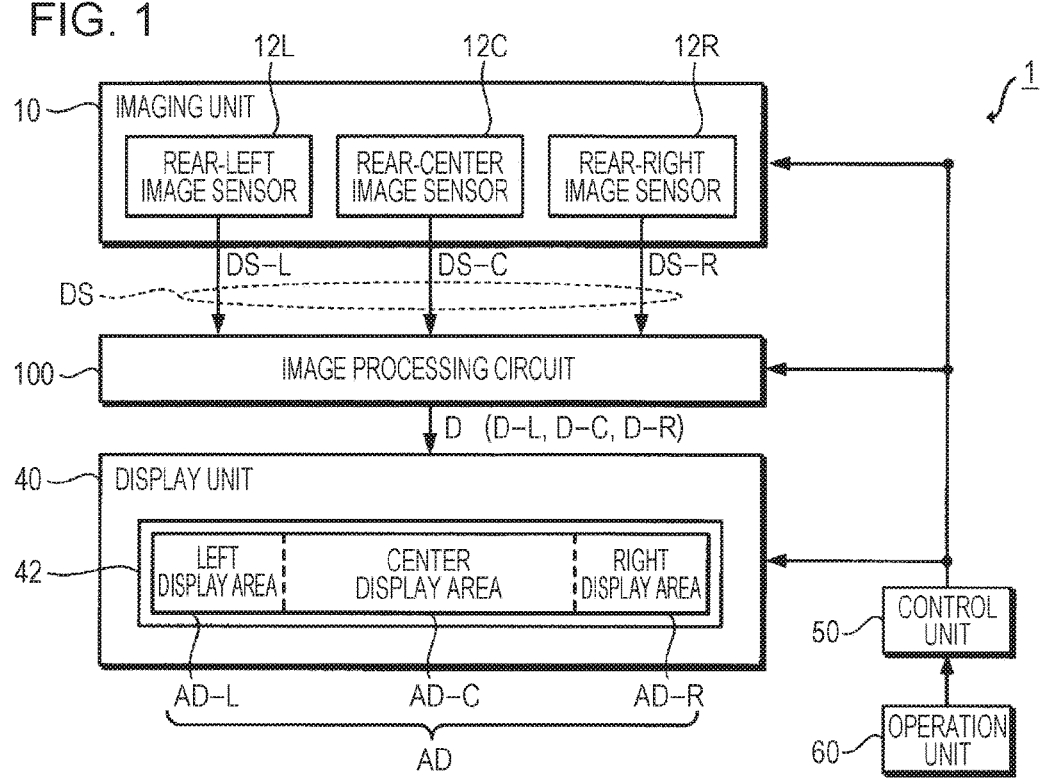
FIG. 1 is a block diagram showing a configuration of a vehicle imaging display apparatus 1 according to a first embodiment of the present invention.

FIG. 1 is a schematic block diagram showing a configuration of the vehicle imaging display apparatus 1. The vehicle imaging display apparatus 1 is a device that displays an image for assisting the running of a vehicle when a driver drives a vehicle such as an automobile or a tram.

As shown in FIG. 1, the vehicle imaging display apparatus 1 includes an imaging unit 10 that images the outside of a vehicle and outputs an imaging signal DS, an image processing circuit 100 that performs image processing on the imaging signal DS output from the imaging unit 10 and generates an image signal D, a display unit 40 that displays an image indicated by the image signal D, an operation unit 60 for inputting an instruction related to the image processing of the imaging signal DS, and a control unit 50 that controls the entire operation of the vehicle imaging display apparatus 1.

In the vehicle imaging display apparatus 1, the imaging unit 10, the image processing circuit 100, and the control unit 50 are an example of an "imaging device".

The imaging unit 10 includes a rear-left image sensor 12L that images a subject existing in a rear left area of the vehicle to output an imaging signal DS-L indicating an imaging result, a rear-center image sensor 12C that images a subject existing in a rear area of the vehicle to output an imaging signal DS-C indicating an imaging result, a rear-right image sensor 12R that images a subject in a rear right area of the vehicle to output an imaging signal DS-R indicating an imaging result. That is, the imaging signal DS output from the imaging unit 10 according to the present embodiment includes the imaging signal DS-L, the imaging signal DS-C, and the imaging signal DS-R.

The rear-center image sensor 12C is an image of a "first imaging element", the rear-left image sensor 12L is an example of a "second imaging element", and the rear-right image sensor 12R is an example of a "third imaging element". The first imaging element, the second imaging element, and the third imaging element are generally referred to as an "imaging element". That is, the vehicle imaging display apparatus 1 according to the present embodiment includes three imaging elements.

Figure 2:
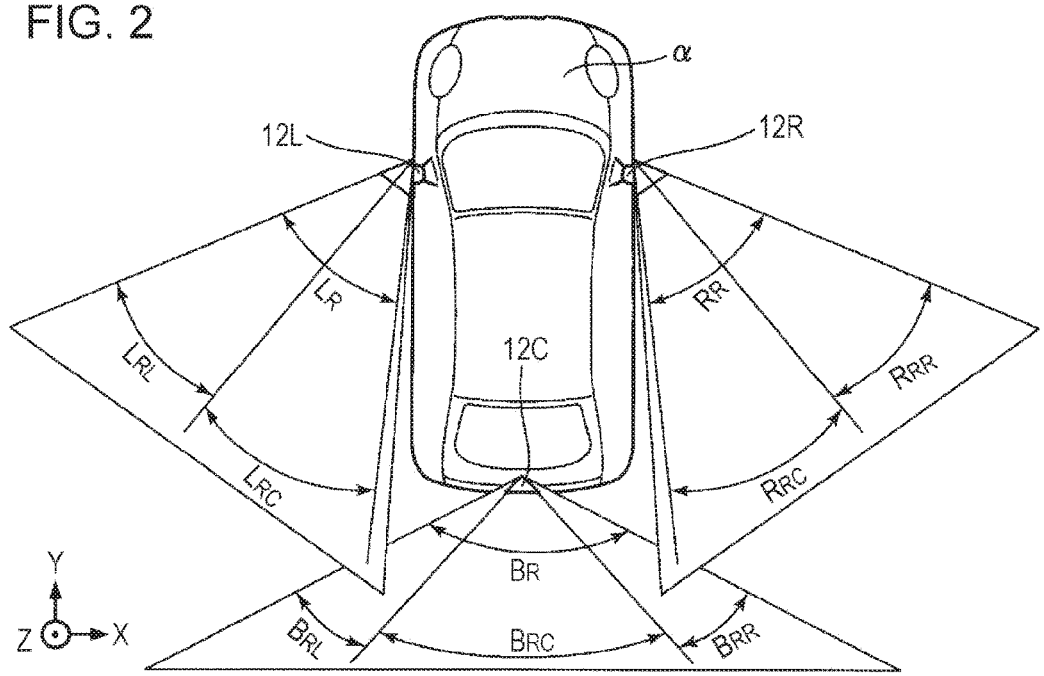
FIG. 2 is an explanatory diagram for describing an arrangement example of a rear-left image sensor 12L, a rear-center image sensor 12C, and a rear-right image sensor 12R.

FIG. 2 is an explanatory diagram showing an arrangement example of the rear-left image sensor 12L, the rear-center image sensor 12C, and the rear-right image sensor 12R in a vehicle α.

As shown in FIG. 2, the rear-left image sensor 12L is disposed near (in a position in which a left wing mirror according to the related art is provided in the example of the drawing) an external surface of a left front pillar of the vehicle α, and images a rear left area LR of the vehicle α. The rear-right image sensor 12R is disposed near (in a position in which a right wing mirror according to the related art is provided in the example of the drawing) an external surface of a right front pillar of the vehicle α, and images a rear right area RR of the vehicle α. The rear-center image sensor 12C is disposed near (on a lower side of a rear window in the example of the drawing) a midpoint of a rear end of the vehicle α in a vehicle width direction, and images a rear area BR of the vehicle. The arrangement example of the drawing is an example, and may be appropriately changed without departing from the gist of the present invention.

The image processing circuit 100 performs image processing on the imaging signal DS-L to generate partial image signal D-L, performs image processing on the imaging signals DS-C to generate a partial image signal D-C, and performs image processing on the imaging signal DS-R to generate a partial image signal D-R. The image processing circuit 100 outputs the image signal D that includes the generated partial image signal D-L, partial image signal D-C, and partial image signal D-R to the display unit 40. That is, the image signal D output from the image processing circuit 100 according to the present embodiment include the partial image signal D-L, the partial image signal D-C, and the partial image signal D-R.

The display unit 40 includes a liquid crystal panel 42 that has a display area AD displaying the image indicated by the image signal D.

The display area AD of the liquid crystal panel 42 includes a center display area AD-C (first display area) for displaying an image indicated by the partial image signal D-C of the image signals D, a left display area AD-L (second display area) for displaying an image indicated by the partial image signal D-L, and a right display area AD-R (third display area) for displaying an image indicated by the partial image signal D-R. That is, the center display area AD-C displays an image of the rear area BR instead of a rear-view mirror of the related art, the left display area AD-L displays an image of the rear left area LR instead of the left wing mirror of the related art, and the right display area AD-R displays an image of the rear right area RR instead of the right wing mirror of the related art.

Hereinafter, for the sake of convenience in the description, any one letter of letters "L", "C", and "R" attached to various reference signs may be represented by Specifically, when it is not necessary to distinguish between the rear-left image sensor 12L, a rear-center image sensor 12C, and the rear-right image sensor 12R, any one thereof is generally referred to as an "image sensor 12J". When it is not necessary to distinguish between the imaging signal DS-L, the imaging signal DS-C, and the imaging signal DS-R, any one thereof is generally referred to as an "imaging signal DS-J". When it is not necessary to distinguish between the partial image signal D-L, the partial image signal D-C, and the partial image signal D-R, any one thereof is generally referred to as a "partial image signal D-J". When it is not necessary to distinguish between the left display area AD-L, the center display area AD-C, and the right display area AD-R, any one thereof is generally referred to as a "display area AD-J".

Figure 3A:
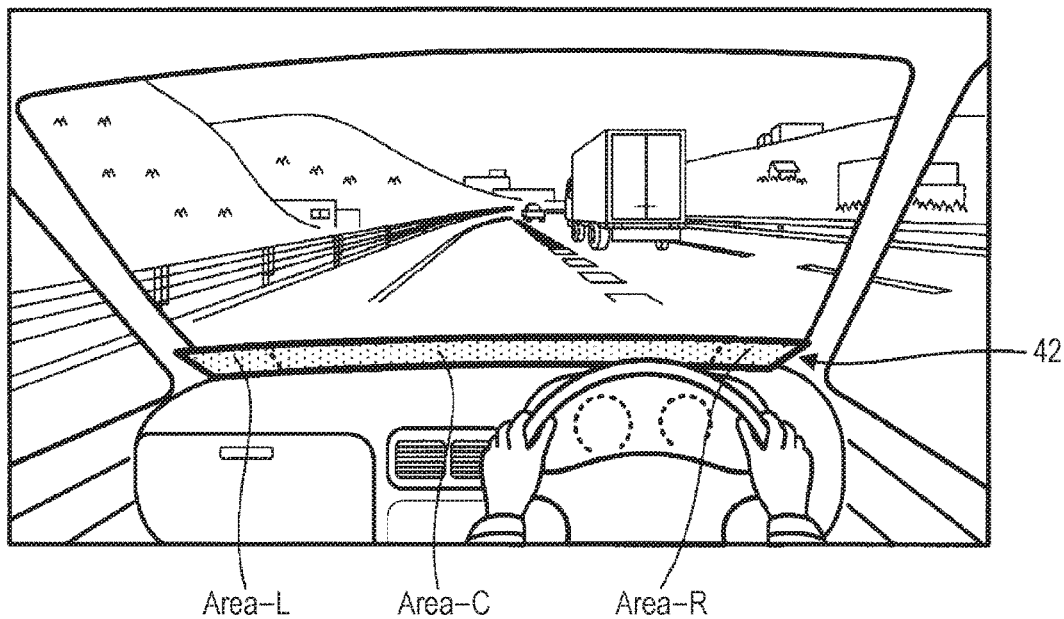
FIG. 3A is an explanatory diagram for describing a display position of an image displayed in a display area AD in the interior of a vehicle α.

FIG. 3A shows a display position of an image displayed in the display area AD in the interior of the vehicle α. As shown in the drawing, an image displayed in the left display area AD-L is magnified and displayed in a magnification display area Area-L, an image displayed in the center display area AD-C is magnified and displayed in a magnification displayed area Area-C, and an image displayed in the right display area AD-R is magnified and displayed in a magnification display area Area-R. The left display area AD-L and the magnification display area Area-L may match to each other, the center display area AD-C and the magnification display area Area-C may match to each other, and the right display area AD-R and the magnification display area Area-R may match to each other.

The magnification display area Area-L, the magnification display area Area-C, and the magnification display area Area-R are located in the front of a driver's seat such that the images displayed in the respective display areas AD-J (AD-L, AD-C, and AD-R) included in the display area AD are visually perceived by the driver with ease. When viewed from the driver, the magnification display area Area-L is located so as to be on a right side from the magnification display area Area-C, and the magnification display area Area-R is located so as to be on a right side from the magnification display area Area-C. That is, when viewed from the driver, the magnification display area Area-L, the magnification display area Area-C, and the magnification display area Area-R are located in the order of the right wing mirror, the rear-view mirror, and the left wing mirror of the related art. Thus, the driver who gets used to the right wing mirror, the rear-view mirror, and the left wing mirror of the related art can visually perceive the image without feeling a sense of incompatibility.

In the example shown in FIG. 3A, the liquid crystal panel 42 is disposed within a dashboard under a windshield in front of the driver's seat, and the image corresponding to the image signals D is displayed in strip-shaped magnification display areas (Area-L, Area-C, and Area-R) on a lower portion of the windshield glass so as to be visually perceived.

Figure 3B:
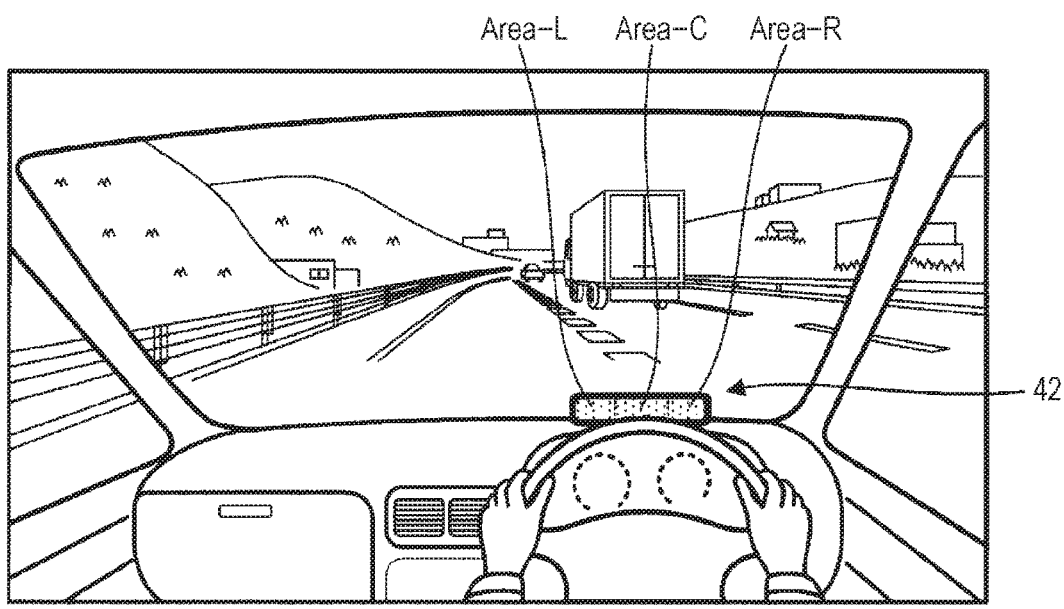
FIG. 3B is an explanatory diagram for describing the display position of the image displayed in the display area AD in the interior of the vehicle α.

The location of the liquid crystal panel 42 including the magnification display areas shown in FIG. 3A is merely an example, and for example, the magnification display areas may be disposed in an area where an instrument panel (cluster panel) of the vehicle α in the related art. Alternatively, as shown in FIG. 3B, the liquid crystal panel 42 including the magnification display areas may be provided in an upper portion of the instrument panel (cluster panel) of the vehicle α in the related art under the windshield glass so as to be in a narrower shape in a horizontal width than that in FIG. 3A. Alternatively, the magnification display areas may be formed in a portion corresponding to the rear-view mirror of the vehicle α in the related art, as a liquid crystal panel or an organic EL panel.

As shown in FIGS. 3A and 3B, in the vehicle imaging display apparatus 1 according to the present embodiment, in a case where the rear left area LR of the vehicle α, the rear area BR of the vehicle α, and the rear right area RR of the vehicle α are imaged, and these images are displayed in a place that is able to be viewed by the driver, an image indicating the rear left area LR is located on a left side of an image indicating the rear area BR, an image indicating the rear right area RR is located on a right side of the image indicating the rear area BR, and the image indicating the rear area BR is located on a right side of the image indicating the rear left area LR and on a left side of the image indicating the rear right area RR. Accordingly, the respective images are located such that the driver can intuitively and visually perceive the rear left side of the vehicle α, the rear center side of the vehicle α, and the rear right side of the vehicle α.

FIGS. 3A and 3B are merely examples, and for example, the magnification display areas may be located such that the image indicating the rear left area LR is located on a left side from a driving position of the driver and the image indicating the rear right area RR is located on a right side from the driving position of the driver.

In the present embodiment, the display unit 40 is, for example, a head-up display (HUD).

Figure 4:
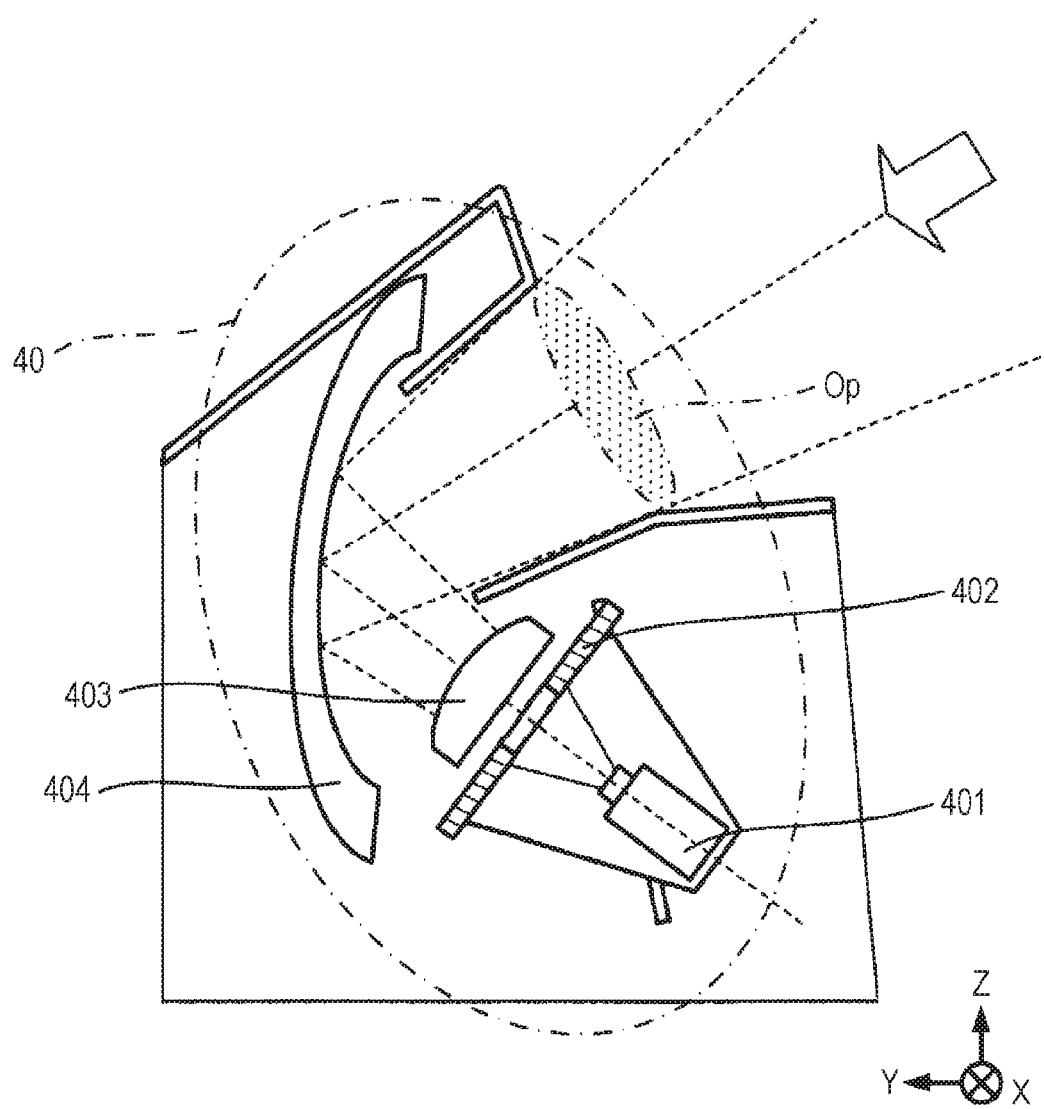
FIG. 4 is a diagram showing a configuration example of a display unit 40.

FIG. 4 shows a configuration example of the display unit 40 disposed within the dashboard. As shown in this drawing, the display unit 40 includes a pico projector 401, a transmission type screen 402, a field lens 403, and a combiner (concave half mirror) 404. The pico projector 401 projects the image corresponding to the input image signal D onto the transmission type screen 402 to draw a real image. Light that penetrates through the transmission type screen 402 is reflected from the combiner 404 after a direction of the image is adjusted by the field lens 403. In this case, if the light reflected from the combiner 404 is incident on the eyes of the driver through an opening Op formed in the dashboard, the driver sees the image that looks as if the image is magnified and displayed in the magnification display areas (Area-L, Area-C, and Area-R) (that is, a virtual image of a magnified image is formed in front of the dashboard). The opening Op may be closed by a transparent plate, and thus, it may be possible to prevent rubbish or dust from entering the inside thereof.

The display unit 40 according to the present invention is not limited to the aspect of the present embodiment, and may be a HUD that displays a virtual image of a direct-vision type panel, a projector type HUD, or a direct-vision type display panel such as a liquid crystal display (LCD) or an organic EL panel.

Figure 5:
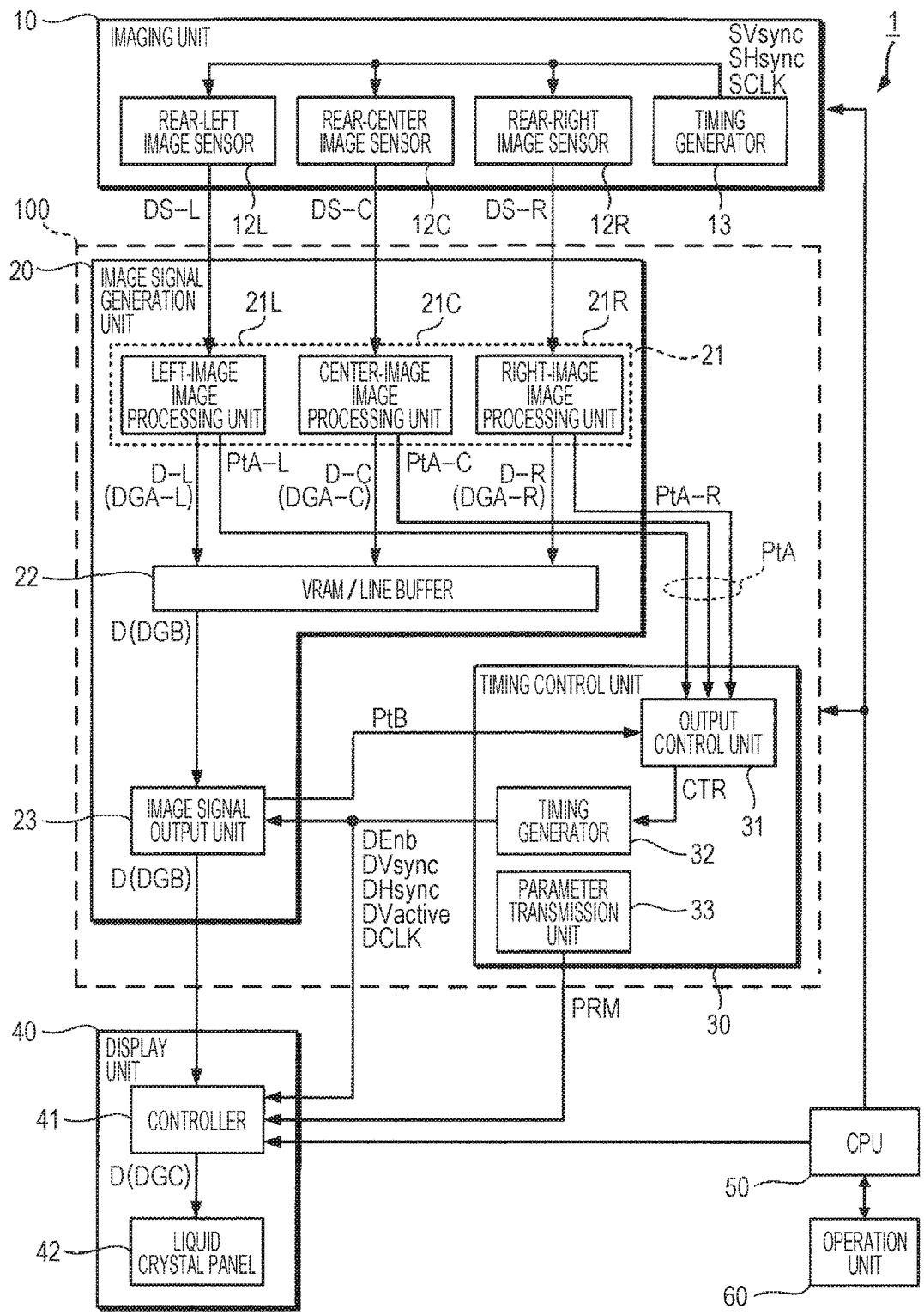
FIG. 5 is a block diagram showing the configuration of the vehicle imaging display apparatus 1.

FIG. 5 is a block diagram showing a functional configuration of the vehicle imaging display apparatus 1.

As shown in FIG. 5, the imaging unit 10 includes a plurality of image sensors 12J (12L, 12C, and 12R) that sequentially scans signals from light receiving elements arranged in a matrix shape through line scanning to output imaging signals DS-J corresponding to images of subjects, and a timing generator 13 that outputs various timing signals to the respective image sensors 12J (12L, 12C, and 12R). The imaging unit 10 includes an imaging optical system that forms the images of the subjects so as to correspond to the respective image sensors 12J, but are not shown in this drawing.

Figure 6:
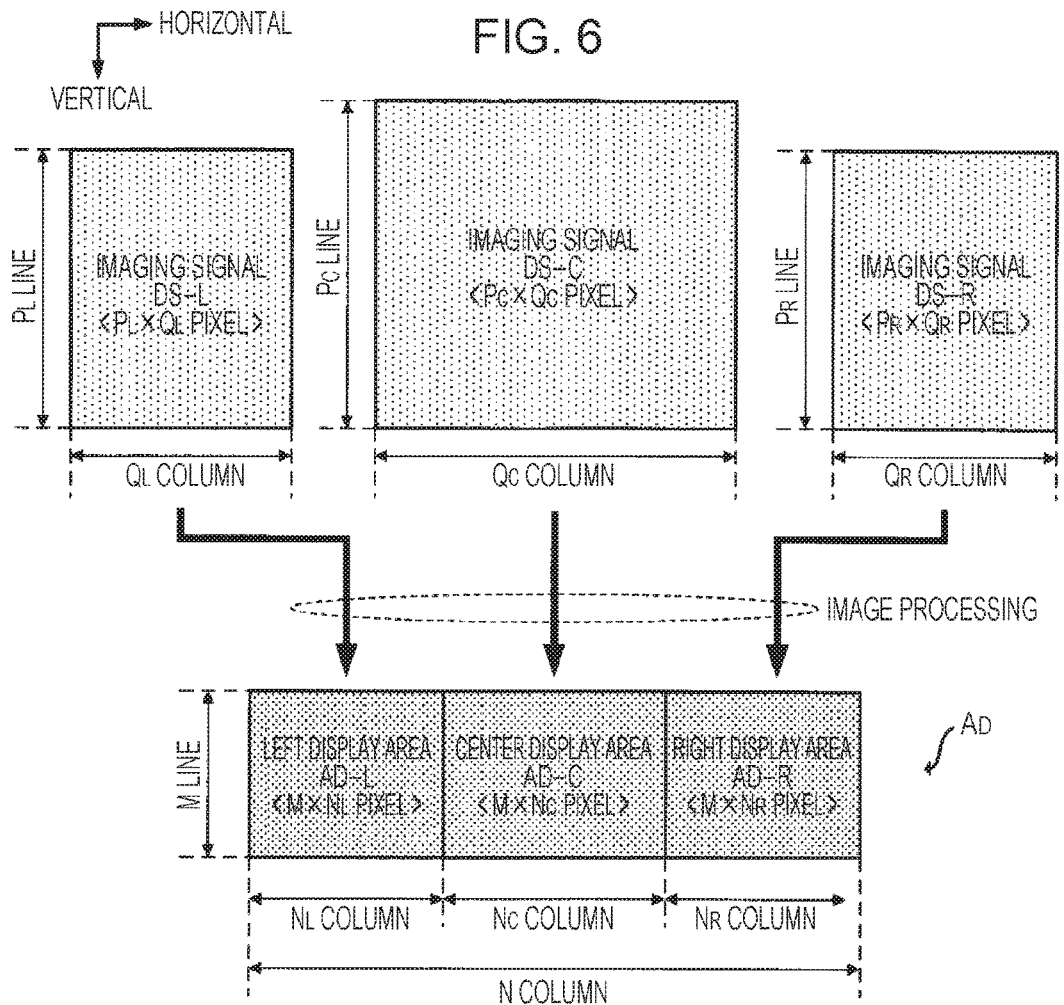
FIG. 6 is an explanatory diagram for describing the relationship between an imaging signal DS and a display area AD.

As shown in FIG. 6, the rear-left image sensor 12L outputs the imaging signal DS-L corresponding to pixels in PL rows×QL columns (PL is a natural number satisfying 2≤PL. QL is a natural number satisfying 2≤QL). The rear-center image sensor 12C outputs the imaging signal DS-C corresponding to pixels in PC rows×QC columns (PC is a natural number satisfying 2≤PC. QC is a natural number satisfying 2≤QC). The rear-right image sensor 12R outputs the imaging signal DS-R corresponding to pixels in PR rows×QR columns (PR is a natural number satisfying 2≤PR. QR is a natural number satisfying 2≤QR). As shown in this drawing, it is assumed in the present embodiment that "PL=PR<PC" and "QL=QR<QC".

Hereinafter, the size of the pixels of the imaging signal DS-J output from the image sensor 12J (12L, 12C, or 12R) may be generally referred to PJ rows×QJ columns.

The timing generator 13 generates an imaging vertical synchronization signal SVsync, an imaging horizontal synchronization signal SHsync, and an imaging dot clock signal SCLK, and outputs the generated signals to the respective image sensors 12J. Here, the timings generated by a single timing generator 13 are supplied to the respective image sensors.

Figure 7:
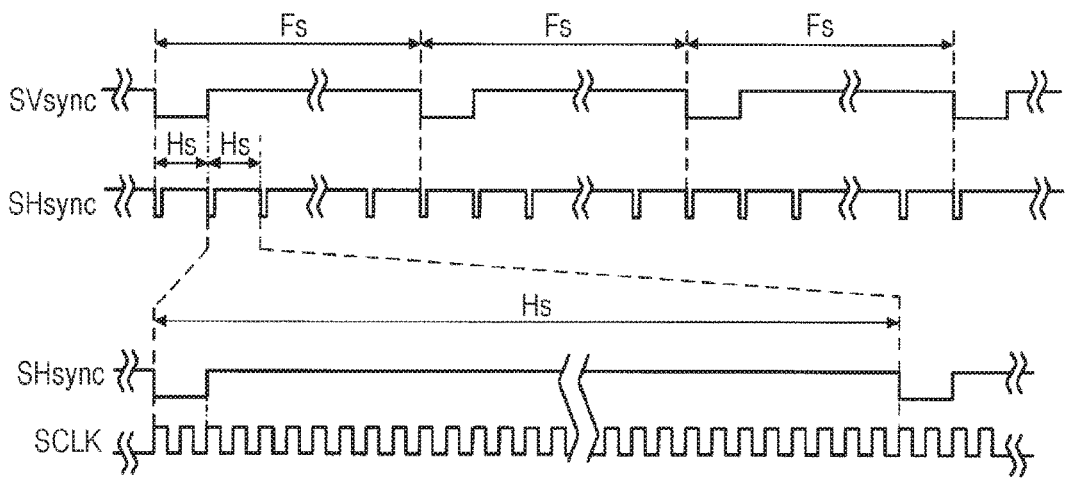
FIG. 7 is a timing chart for describing an operation of the vehicle imaging display apparatus 1.

FIG. 7 is a timing chart for describing the imaging vertical synchronization signal SVsync, the imaging horizontal synchronization signal SHsync, and the imaging dot clock signal SCLK generated by the timing generator 13. The imaging vertical synchronization signal SVsync (an example of an "imaging synchronization signal") is a signal for defining an imaging vertical scanning period Fs (an example of a "frame of an imaging synchronization signal") during which detection signals are read from the light receiving elements of each image sensor 12J. A frame rate of the imaging unit 10, namely, "1/Fs" may be referred to as a "first frame rate".

The imaging horizontal synchronization signal SHsync is a signal for defining a horizontal scanning period Hs during which detection signals are read from as many light receiving elements as one line of each image sensor 12J. The imaging dot clock signal SCLK is a signal for defining a timing when detection signals are read from as many light receiving elements as one pixel of each image sensor 12J. A time length of the imaging vertical scanning period Fs is constant (has a fixed length), and a time length of the horizontal scanning period Hs is also constant (has a fixed length). The imaging vertical scanning period Fs includes a plurality of horizontal scanning periods Hs. The timing generator 13 may output the imaging vertical synchronization signal SVsync, the imaging horizontal synchronization signal SHsync, and the imaging dot clock signal SCLK to the image processing circuit 100.

As mentioned above, in the present embodiment, the plurality of image sensors 12J (12L, 12C, and 12R) included in the imaging unit 10 are operated in synchronization with the same timing signal supplied from a single timing generator 13 (here, the same timing means that at least the imaging vertical synchronization signal SVsync timings match to each other).

The description refers back to FIG. 5.

The display unit 40 is a display device that displays an image indicating a subject as an imaging target to allow the driver of the vehicle α to recognize a state of the subject outside of the vehicle α, and the configuration thereof is as described referring to FIG. 4.

The pico projector 401 of the display unit 40 includes a light source (not shown), the liquid crystal panel 42 having the display area AD displaying the image corresponding to the image signal D generated by the image processing circuit 100, a projection optical system (not shown), and a controller 41 that controls an operation of the liquid crystal panel 42. For example, the light source includes a light-emitting diode (LED) or a laser diode, and irradiates the liquid crystal panel 42 with white light. The projection optical system is, for example, a convex lens that projects light penetrating through the liquid crystal panel 42.

As shown in FIG. 6, a plurality of pixels is arranged in a matrix shape so as to be N columns in a vertical direction and M rows (M lines) in a horizontal direction in the display area AD of the liquid crystal panel 42 (M is a natural number satisfying 2≤M. N is a natural number satisfying 6≤N). In other words, the display area AD is formed such that the lines of the N pixels arranged in the horizontal direction are arranged in M rows in the vertical direction. For example, the pixels in M rows×N columns include pixels for displaying red, pixels for displaying green, and pixels for displaying blue.

As described referring to FIG. 1, the display area AD is divided into three display areas AD-J. Among them, the left display area AD-L includes pixels in M rows×NL columns, the center display area AD-C includes pixels in M rows×NC columns, and the right display area AD-R includes pixels in M rows×NR columns (NL, NC, and NR are natural numbers which are equal or greater than 2). Here, NL, NC, and NR satisfy "N=NL+NC+NR". Hereinafter, the size of the pixels of each display area AD-J (AD-L, AD-C, or AD-R) of the display area AD may be referred to as M rows×NJ columns.

In the present embodiment, the number of pixels of the imaging signal DS-J and the number of pixels of the display areas AD-J may be different from each other. That is, "M≠PJ", and "NJ≠QJ" in some cases. In the present embodiment, it is assumed that "M<PJ" and "NJ<QJ".

In the present embodiment, a time length required to display as many an image as one screen at a highest frame rate at which the display area AD of the display unit 40 can display is less than a time length at which the image sensors 12J image as many images as one screen. Thus, in a case where there is an attempt to display the image at the highest frame rate at which the display unit 40 can display, the output of the imaging signal DS from the imaging unit 10 does not follow the frame rate. Thus, in the vehicle imaging display apparatus 1 according to the present embodiment, output timings of the image signals D from the image processing circuit 100 are adjusted by the image processing circuit 100, and thus, a display speed of the display unit 40 follows an output cycle of the imaging signals DS from the imaging unit 10.

As shown in FIG. 5, the image processing circuit 100 includes an image signal generation unit 20 that generates the image signals D (the plurality of partial image signals D-J) based on the imaging signals DS (the plurality of imaging signals DS-J) and outputs the generated image signals D to the display unit 40, and a timing control unit 30 that controls timings when the image signal generation unit 20 outputs the image signals D.

As shown in FIG. 5, the image signal generation unit 20 includes an image processing unit 21 that performs image processing on the imaging signals DS to generate the image signals D, a VRAM/line buffer 22 (hereinafter, referred to as a "line buffer 22") that temporarily stores the image signals D generated by the image processing unit 21, and an image signal output unit 23 that acquires the image signals D from the line buffer 22 and outputs the acquired image signals D to the display unit 40.

The image signals D are signals that define images (gradation) to be displayed by the pixels in M rows×N columns formed in the display area AD of the liquid crystal panel 42.

Hereinafter, among the image signals D indicating the image to be displayed in the display area AD, as many image signals D as one line indicating the image to be displayed in an (m-th)-row line of the display area AD are described as image signals D[m] (m is a natural number satisfying 1≤m≤M). Hereinafter, among the partial image signals D-J indicating the images to be displayed in the display areas AD-J, as many a partial image signal D-J as one line indicating the image to be displayed in an (m-th)-row line of the display area AD-J is described as a partial image signal D-J[m]. That is, the image signals D[m] includes a partial image signal D-L[m], a partial image signal D-C[m], and a partial image signal D-R[m].

As shown in FIG. 5, the image processing unit 21 includes a left-image image processing unit 21L that performs image processing on the imaging signal DS-L among the imaging signals DS to generate the partial image signal D-L, a center-image image processing unit 21C that performs image processing on the imaging signal DS-C among the imaging signals DS to generate the partial image signal D-C, and a right-image image processing unit 21R that performs image processing on the imaging signal DS-R among the imaging signals DS to generate the partial image signal D-R. Hereinafter, when it is not necessary to distinguish between the left-image image processing unit 21L, the center-image image processing unit 21C, and the right-image image processing unit 21R, any one thereof is referred to as a "partial image processing unit 21J".

The partial image processing unit 21J (21L, 21C, or 21R) generates the partial image signals D-J indicating the image to be displayed in the display area AD-J of the liquid crystal panel 42 for every image to be displayed by as many pixels as one line of the display areas AD-J. More specifically, the partial image processing unit 21J generates the partial image signals D-J in the order of a partial image signal J-D[1], a partial image signal D-J[2], . . . , and a partial image signal D-J[m]. The details of the image processing performed by the partial image processing unit 21J will be described below.

If the partial image processing unit 21J (21L, 21C, or 21R) generates the partial image signals D-J[m] (D-L[m], D-C[m], and D-R[m]), the partial image processing unit stores the generated partial image signals D-J[m] in the line buffer 22 and outputs partial writing-completion signals PtA-J (PtA-L, PtA-C, and PtA-R) indicating that the storing of the partial image signals D-J[m] in the line buffer 22 is completed to the timing control unit 30. That is, if the left-image image processing unit 21L generates the partial image signals D-L[m] and stores the generated partial image signals in the line buffer 22, the left-image image processing unit outputs the partial writing-completion signals PtA-L. The center-image image processing unit 21C generates the partial image signals D-C[m] and stores the generated partial image signals in the line buffer 22, the center-image image processing unit outputs the partial writing-completion signals PtA-C. The right-image image processing unit 21R generates the partial image signals D-R[m] and stores the generated partial image signals in the line buffer 22, the right-image image processing unit outputs the partial writing-completion signals PtA-R. The signals including such partial writing-completion signal PtA-L, PtA-C, and PtA-R which are output when the image processing unit 21 generates the image signals D[m] and stores the generated image signals in the line buffer 22 are referred to as writing-completion signals PtA.

In the present embodiment, the partial writing-completion signals PtA-J (PtA-L, PtA-C, and PtA-R) are signals indicating the numbers m of the lines corresponding to the partial image signals D-J which have been written in the line buffer 22 by the partial image processing unit 21J is completed. Hereinafter, the numbers m of the lines indicated by the partial writing-completion signals PtA-J (PtA-L, PtA-C, and PtA-R) are particularly referred to as "line numbers ma-J (ma-L, ma-C, and ma-R) (ma-J is a natural number satisfying 1≤ma-J≤M). A minimum value ma of the line numbers ma-L, ma-C, and ma-R indicated by the partial writing-completion signals PtA-L, PtA-C, and PtA-R included in the writing-completion signals PtA corresponds to "image processing line information" indicating the line on which the image processing is completed. That is, the writing-completion signal PtA is a signal indicating the image processing line information.

The partial writing-completion signal PtA-J is not limited to the signal indicating the number of the line, and may be a binary signal including a pulse waveform which rises to a high level in a case where the generation of the partial image signals D-J[m] by the partial image processing unit 21J is completed. In a case where the partial writing-completion signal PtA-J is the binary signal, the timing control unit 30 counts the number of pulses included in the partial writing-completion signal PtA-J after displaying is started on one screen, and it is possible to acquire the line numbers of the partial image signals D-J[m] which have been already generated by the partial image processing unit 21J.

The image signal output unit 23 reads the image signals D for every one line from the line buffer 22, and outputs as many of the read image signals D[m] as one line to the display unit 40 under the control of the timing control unit 30.

Hereinafter, in a case where it is necessary to distinguish between the image signals for the sake of convenience in the description, the image signals D which are generated by the image processing unit 21 and are stored in the line buffer 22 are referred to as image signals DGA, and the image signals D which are acquired from the line buffer 22 and are output to the display unit 40 by the image signal output unit 23 are referred to as image signals DGB. Among the image signals DGA, the image signals DGA generated by the partial image processing unit 21J are referred to as partial image signals DGA-J (DGA-L, DGA-C, and DGA-R). Among the image signals DGA stored in the line buffer 22 by the image processing unit 21, the image signals DGA indicating the image to be displayed in the (m-th)-row line of the display area AD are referred to as image signals DGA[m], and among the image signals DGB output to the display unit 40 by the image signal output unit 23, the image signals DGB indicating the image to be displayed in the (m-th)-row line of the display area AD are referred to as image signals DGB[m].

In a case where the process of reading the image signals DGB[m] from the line buffer 22 to output the image signals DGB[m] to the display unit 40 is completed, the image signal output unit 23 outputs output-completion signals PtB indicating that the output of the image signals DGB[m] to the display unit 40 is completed to the timing control unit 30. In the present embodiment, the output-completion signals PtB are signals indicating the numbers m of the lines corresponding to the image signals D[m] which have been output to the display unit 40 by the image signal output unit 23. Hereinafter, the numbers m of the lines indicated by the output-completion signals PtB are particularly described as "line numbers mb" (mb is basically a natural number satisfying 0≤mb≤M). The line numbers mb which are values indicated by the output-completion signals PtB are an example of "display output line information" indicating the lines of the image signals D[m] which have been output to the display unit 40.

Although the details will be described below, the image signal output unit 23 may output inactive signals Dmy instead of output the image signals DGB[m] to the display unit 40 (see FIG. 8D). In this case, the image signal output unit 23 does not output the output-completion signals PtB.

mb satisfies mb=M immediately after the final line of one frame is output, and mb=M is subsequently maintained. It is assumed that the mb signal is reset at a point of time (at a timing after a vertical back porch period after a vertical synchronization signal is output is completed) when preparation to output an image for the next frame is completed and mb=0.

The output-completion signal PtB is not limited to the signal indicating the number of the line, and may be a binary signal including a pulse waveform which rises to a high level in a case where the output of the image signals D[m] by the image signal output unit 23 is completed.

As shown in FIG. 5, the timing control unit 30 includes an output control unit 31 that generates output control signals CTR (precisely, CTR[m]) based on the writing-completion signals PtA and the output-completion signals PtB, a timing generator 32 that generates various timing signals and controls timings when the image signal output unit 23 outputs the image signals D[m] (image signals DGB[m]), and a parameter transmission unit 33 that transmits setting parameters PRM for defining an operation of the controller 41 to the controller 41.

The output control unit 31 determines whether or not the image signal output unit 23 completes preparation to output the image signals D[m] (image signals DGB[m]) indicating the image to be displayed in the m-th row of the display area AD to the display unit 40 based on the writing-completion signals PtA and the output-completion signals PtB, and generates the output control signals CTR (precisely, CTR[m]) indicating the determination results.

Here, the "preparation to output the image signals D[m] (image signals DGB[m]) being completed" means that the following first condition and second condition are satisfied.

(First Condition) The image processing unit 21 completes the image processing of the image signals D[m] (image signals DGA[m]) in the m-th row, and completes the writing of the image signals DGA[m] in the line buffer 22.

(Second Condition) The image signal output unit 23 completes the output of the image signals D[m−1] (image signals DGB[m−1]) in an (m−1)-th row.

The first condition indicates a case where the minimum value ma of the line numbers ma-j indicated by the partial writing-completion signals PtA-J is equal to or greater than the line number m. That is, the first condition is satisfied in a case where "m≤ma", more specifically, in a case where "m≤ma-L", "m≤ma-C", and "m≤ma-R".

The second condition is satisfied in a case where the line numbers mb indicated by the output-completion signals PtB satisfy "mb=m−1" (specifically, the second condition is satisfied in a case where "mb=0" (the mb signal is reset at a timing after the completion of the vertical back porch period after the output of the vertical synchronization signal after "mb=M", and thus, mb=0) is satisfied in a case where "m=1").

In the present specification, the lines of the display area AD displaying the image indicated by the image signals D[m] to be determined by the output control unit 31 may be referred to as "display target lines".

Specifically, in order for the image signal output unit 23 to output the image signals DM (image signals DGB[m]), the following third condition needs to be satisfied.

(Third Condition) The timing when the image signal output unit 23 outputs the image signals D[m] (image signals DGB[m]) in the m-th row is included in a period (a horizontal active data period DHI to be described in FIG. 8) during which the display area AD can display the image.

However, in a case where the first condition and the second condition are satisfied, the timing generator 32 controls the output timings of the image signals D[m] (image signals DGB[m]) from the image signal output unit 23, and thus, the third condition is necessarily satisfied. Thus, in the present embodiment, the third condition is not taken into consideration in the determination of the output control unit 31.

Hereinafter, a method of implementing the control method of the output control unit 31 will be described in more details. For example, the output control unit 31 may perform the determination of whether or not "the preparation to output the image signals D[m] (image signals DGB[m]) is completed" by the following two aspects.

A first aspect is an aspect in which the output control unit 31 directly performs two determinations of determination (first determination) of whether or not the first condition is satisfied and determination (second determination) of whether or not the second condition is satisfied.

Specifically, if the image processing unit 21 outputs the writing-completion signals PtA, the output control unit 31 outputs determines whether or not m satisfies "m≤ma" based on the minimum value ma of the line numbers ma-J indicated by the plurality of partial writing-completion signals PtA-J included in the writing-completion signal PtA (first determination is performed). If the image signal output unit 23 outputs the output-completion signals PtB, the output control unit 31 determines whether or not the line numbers mb indicated by the output-completion signals PtB satisfy "mb=m−1" (second determination is performed). In a case where both the determination result of the first determination and the determination result of the second determination are positive, the output control unit 31 determines that the preparation to output the image signals D[m] is completed.

In the first aspect, the output control unit 31 functions as a "processing state determination unit" that determines whether or not the image signals corresponding to the image to be displayed in the display target lines are generated by performing the first determination, and functions as a "display determination unit" that determines whether or not the image in the display target lines can be displayed by performing the second determination.

In a case where the determination of the first determination or the determination result of the second determination is negative, the output control unit 31 repeats the first determination and the second determination until both the determination result of the first determination and the determination result of the second determination become positive. Specifically, for example, the output control unit 31 may perform the first determination whenever the writing-completion signals PtA are output from the image processing unit 21 and may perform the second determination whenever the output-completion signals PtB are output from the image signal output unit 23 until both the determination results of the first determination and the second determination become positive. For example, the output control unit 31 may repeat the first determination and the second determination at a cycle of a horizontal scanning period Hd, to be described below, until both the determination results of the first determination and the second determination become positive. When both the determination result of the first determination and the determination result of the second determination become positive, the output control signals CTR (precisely, CTR[m]) are set to be values indicating that the determination results are positive.

Next, a second aspect of the determination of whether or not "the preparation to output the image signals D[m] (image signals DGB[m]) is completed" is an aspect in which the output control unit 31 performs the determination (first determination) of whether or not the first condition is satisfied at a timing when the image signal output unit 23 outputs the line numbers mb=m−1 indicated by the output-completion signals PtB after the result of the previous determination (determination of whether or not the preparation to output the image signals D[m−1] is completed) becomes positive.

In this aspect, in a case where the determination result of the first determination is negative, the output control unit 31 repeats the first determination until the determination result of the first determination becomes positive, and sets the output control signals CTR to the values (CTR[m]) indicating that the determination results are positive when the determination result of the first determination becomes positive. Specifically, for example, in a case where the determination result of the first determination is negative at a timing when the output-completion signals PtB are output, the output control unit 31 may determine whether or not m satisfies "m≤ma" based on the minimum value ma of the line numbers ma-J indicated by the writing-completion signals PtA whenever the image processing unit 21 outputs the writing-completion signals PtA, and may determine that the first condition is satisfied when "m≤ma" is satisfied.

As stated above, the image processing unit 21 generates the image signals D[m] (image signals DGA[m]) in the order of the line numbers, and the image signal output unit 23 outputs the image signals D[m] (image signals DGB[m]) in the order of the line numbers. In the present embodiment, after the output of the image signals D[m−2] in an (m−2)-th row is completed and the output control unit 31 determines that "the preparation to output the image signals D[m−1] is completed", the image signal output unit 23 outputs the image signals D[m−1]. Thus, the timing when the output control unit 31 determines whether or not "the preparation to output the image signals D[m] (image signals DGB[m]) is completed is a timing after the image signals D[m−2] (image signals DGB[m−2]) is output from the image signal output unit 23 and is a timing after the output control unit 31 determines that "the preparation to output the image signals D[m−1] (image signals DGB[m−1]) is completed". That is, the line numbers mb indicated by the output-completion signals PtB output by the image signal output unit 23 become "m−1" at a timing when the output control unit 31 performs the first determination of whether or not "the preparation to output the image signals D[m] is completed".

Thus, in the second aspect, the output control unit 31 regards that the second condition is satisfied based on the output of the output-completion signals PtB from the image signal output unit 23. The output control unit 31 performs the determination (first determination) of whether or not the first condition is satisfied at a timing when the output-completion signals PtB are output from the image signal output unit 23, and thus, the output control unit determines whether or not "the preparation to output the image signals D[m] (image signals DGB[m]) is completed.

In the present embodiment, it will be described on the assumption that the second aspect of the two aspects is adopted.

The timing generator 32 generates a display vertical synchronization signal DVsync, a vertical active data signal DVactive, a display horizontal synchronization signal DHsync, a display dot clock signal DCLK, and an enable signal DEnb, and outputs the generated signals to the image signal output unit 23 and the display unit 40.

Figure 8A:
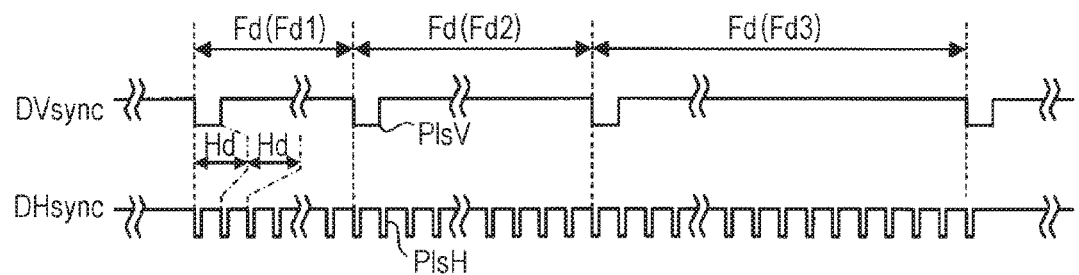
FIG. 8A is a timing chart for describing the operation of the vehicle imaging display apparatus 1.
Figure 8B:
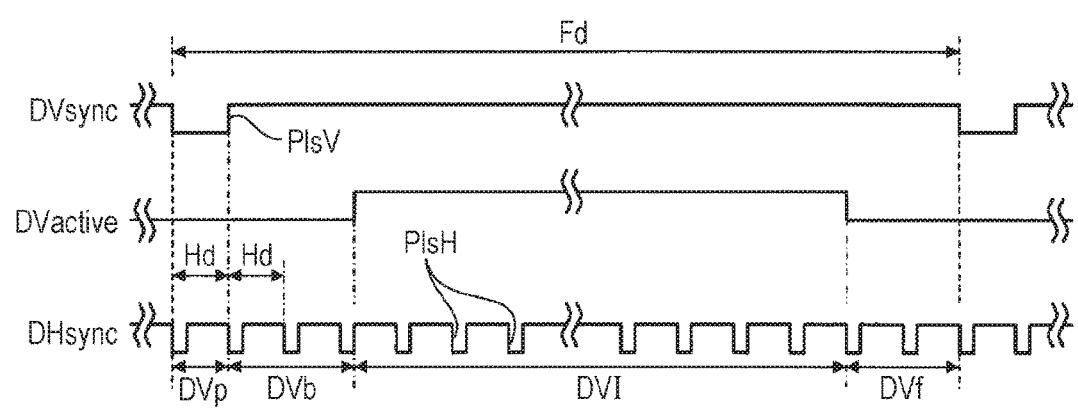
FIG. 8B is a timing chart for describing the operation of the vehicle imaging display apparatus 1.
Figure 8C:
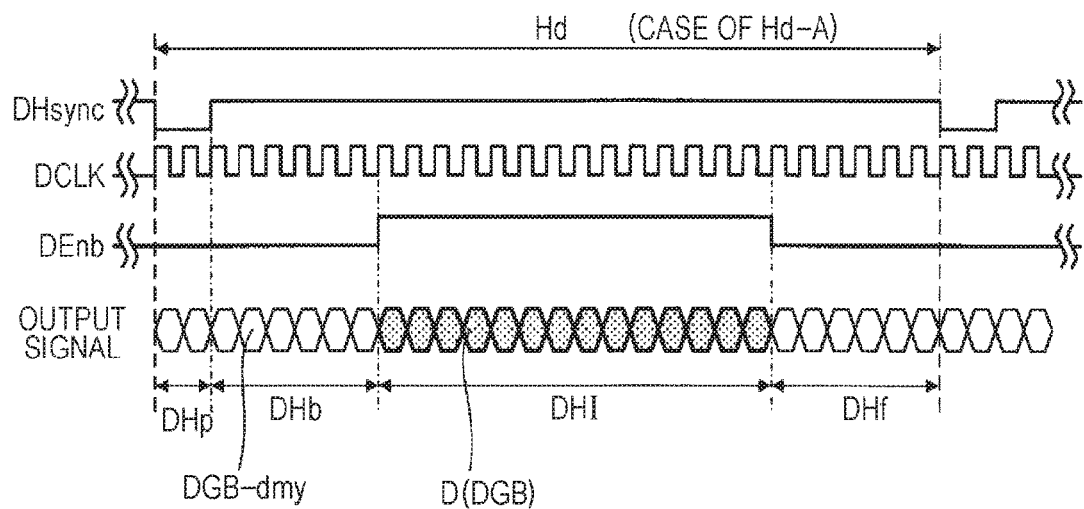
FIG. 8C is a timing chart for describing the operation of the vehicle imaging display apparatus 1.
Figure 8D:
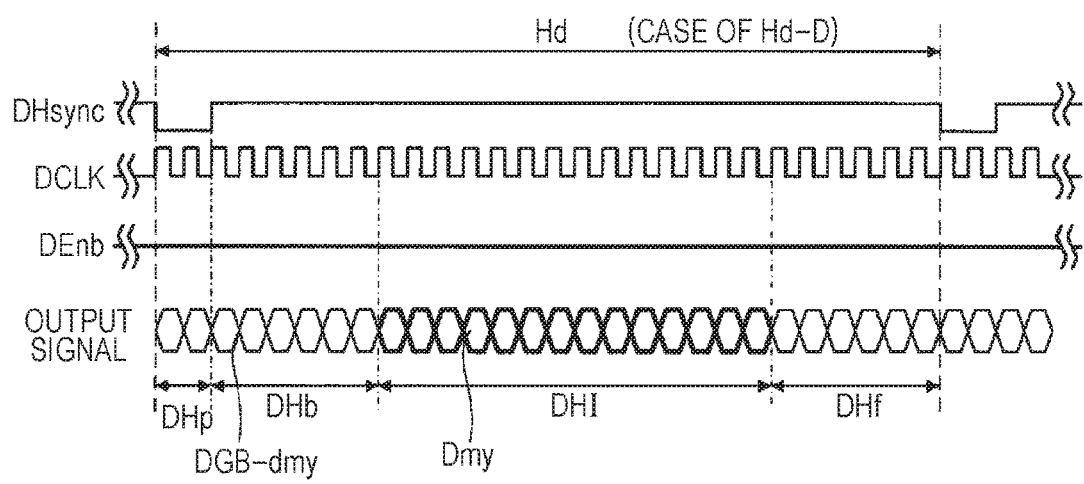
FIG. 8D is a timing chart for describing the operation of the vehicle imaging display apparatus 1.

FIGS. 8A and 8D are timing charts for describing the display vertical synchronization signal DVsync, the vertical active data signal DVactive, the display horizontal synchronization signal DHsync, the display dot clock signal DCLK, and the enable signal DEnb which are generated by the timing generator 32.

As shown in FIGS. 8A and 8B, the display vertical synchronization signal DVsync (an example of a "display synchronization signal") is a signal that defines a display vertical scanning period Fd (an example of a "frame of a display synchronization signal") during which the image is displayed in the pixels (as many pixels as M lines) of the entire display area AD of the liquid crystal panel 42. The display horizontal synchronization signal DHsync is a signal that defines the horizontal scanning period Hd during which the image is displayed in as many pixels as one line of the display area A. The display dot clock signal DCLK is a signal that defines the timing when the image is displayed in the respective pixels of the display area AD.

In the present embodiment, the horizontal scanning period Hd has a predetermined constant time length. In the present embodiment, the display vertical scanning period Fd includes the plurality of horizontal scanning periods Hd, and has a variable time length (cycle) less than the time length (cycle) of the imaging vertical scanning period Fs. That is, the number of horizontal scanning periods Hd included in each display vertical scanning period Fd is variable. In the example shown in FIG. 8A, a case where among the plurality of display vertical scanning periods Fd shown in FIG. 8A, a display vertical scanning period Fd1 which is a first display vertical scanning period Fd is shorter than a display vertical scanning period Fd2 subsequent to the display vertical scanning period Fd1 and the display vertical scanning period Fd2 is shorter than a display vertical scanning period Fd3 subsequent to the display vertical scanning period Fd2 is illustrated.

Among the waveforms of the display vertical synchronization signal DVsync, pulse-shaped waveforms that define timings when the display vertical scanning period Fd is started and ended are referred to as display vertical synchronization pulses PlsV. Among the waveforms of the display horizontal synchronization signal DHsync, pulse-shaped waveforms that define timings when the horizontal scanning period Hd is started and ended are referred to as display horizontal synchronization pulse PlsH.

As shown in FIG. 8B, the display vertical scanning period Fd includes a vertical synchronization period DVp, a vertical back porch period DVb, a vertical active data period DVl, and a vertical front porch period DVf.

The vertical synchronization period DVp is a period during which the display vertical synchronization signal DVsync is active (is at a low level in the example of this drawing), and is a period having a predetermined time length which is started simultaneously with the starting of the display vertical scanning period Fd. The vertical back porch period DVb is a period subsequent to the vertical synchronization period DVp and is a period having a predetermined time length. The vertical active data period DVI is a period having a variable time length which is subsequent to the vertical back porch period DVb. The image signals DGB (image signals DGB[1] to DGB[M]) are output from the image signal output unit 23 during the vertical active data period DVI. The vertical front porch period DVf is a period subsequent to the vertical active data period DVI and is a period having a predetermined time length which is ended simultaneously with the ending of the display vertical scanning period Fd.

The vertical active data period DVI is a period from the starting of the horizontal scanning period Hd during which the enable signal DEnb becomes initially active to the ending of the horizontal scanning period Hd during which the enable signal DEnb becomes active in the M-th number of times in each display vertical scanning period Fd (a case where the enable signal DEnb becomes active is described below).

For example, the vertical active data period DVI may be determined based on a count value output by a counter (not shown) that counts the number of times the enable signal DEnb becomes active. Here, in the present embodiment, for the sake of convenience in the description, the vertical active data signal DVactive that becomes active during the period from the starting of the horizontal scanning period Hd during which the enable signal DEnb becomes initially active to the ending of the horizontal scanning period Hd during which the enable signal DEnb becomes active (at a high level in the example of this drawing) in the M-th number of times is introduced in each display vertical scanning period Fd. That is, it will be described in the present embodiment that the period during which the vertical active data signal DVactive becomes active is the vertical active data period DVI. The vertical active data signal DVactive is a signal introduced for the sake of convenience in the description, and the output control unit 31 may not output the vertical active data signal DVactive.

As shown in FIGS. 8C and 8D, the horizontal scanning period Hd includes a horizontal synchronization period DHp, a horizontal back porch period DHb, a horizontal active data period DHI, and a horizontal front porch period DHf.

The horizontal synchronization period DHp is a period during which the display horizontal synchronization signal DHsync is active (is at a low level in the example of this drawing), and is a period having a predetermined time length which is started simultaneously with the starting of the horizontal scanning period Hd. The horizontal back porch period DHb is a period subsequent to the horizontal synchronization period DHp and is a period having a predetermined time length. The horizontal active data period DHI is a period having a predetermined time length which is subsequent to the horizontal back porch period DHb. The horizontal front porch period DHf is a period subsequent to the horizontal active data period DHI and is a period having a predetermined time length which is ended simultaneously with the ending of the horizontal scanning period Hd.

In the present embodiment, an active horizontal scanning period Hd-A (see FIG. 8C) during which the image signal output unit 23 outputs the image signals D[m] and a inactive horizontal scanning period Hd-D (see FIG. 8D) during which the image signal output unit outputs the inactive signals Dmy[m] instead of outputting the image signals D[m] are present in the horizontal scanning period Hd.

FIG. 8C shows a case where the horizontal scanning period Hd is the active horizontal scanning period Hd-A. As shown in this drawing, in a case where the horizontal scanning period Hd is the active horizontal scanning period Hd-A, the enable signal DEnb becomes active (is at a high level in the example of this drawing) during the horizontal active data period DHI. The image signals D[m] (image signals DGB[m]) are output from the image signal output unit 23 during the horizontal active data period DHI during which the enable signal DEnb becomes active. Meanwhile, the enable signal DEnb becomes inactive during the periods (the horizontal synchronization period DHp, the horizontal back porch period DHb, and the horizontal front porch period DHf) other than the horizontal active data period DHI in the active horizontal scanning period Hd-A. The image signal output unit 23 stops outputting the image signals D[m](image signals DGB[m]) for every pixel of line data during the periods other than the horizontal active data period DHI during which the enable signal DEnb becomes inactive in the active horizontal scanning period Hd-A, and outputs inactive line signals DGB-dmy.

The timing generator 32 activates the enable signal DEnb during the horizontal active data period DHI, and thus, the third condition is satisfied. That is, the timing control unit 30 that includes the output control unit 31 and the timing generator 32 causes the image signal output unit 23 to output the line data of the image signals D[m] (image signals DGB[m]) corresponding to the display target lines for every pixel at a timing when all the first condition to the third condition are satisfied.

FIG. 8D shows a case where the horizontal scanning period Hd is the inactive horizontal scanning period Hd-D. As shown in this drawing, the enable signal DEnb becomes inactive during the horizontal active data period DHI in a case where the horizontal scanning period Hd is the inactive horizontal scanning period Hd-D. The image signal output unit 23 outputs the inactive signals Dmy instead of the image signals DM (image signals DGB[m]) during the horizontal active data period DHI of the inactive horizontal scanning period Hd-D. Meanwhile, the enable signal DEnb becomes inactive during the periods (the horizontal synchronization period DHp, the horizontal back porch period DHb, and the horizontal front porch period DHf) other than the horizontal active data period DHI of the inactive horizontal scanning period Hd-D. The image signal output unit 23 stops outputting the image signals DM (image signals DGB[m]) to output the inactive line signals DGB-dmy during the periods other than the horizontal active data period DHI of the inactive horizontal scanning period Hd-D.

The timing generator 32 determines whether the horizontal scanning period Hd is set to the active horizontal scanning period Hd-A or the inactive horizontal scanning period Hd-D based on the output control signals CTR output by the output control unit 31. In other words, the timing generator 32 determines whether or not the enable signal DEnb becomes active during the horizontal active data period DHI based on the output control signals CTR. The relationship between the types of the output control signal CTR, the enable signal DEnb, and the horizontal scanning period Hd will be described below.

Figure 9:
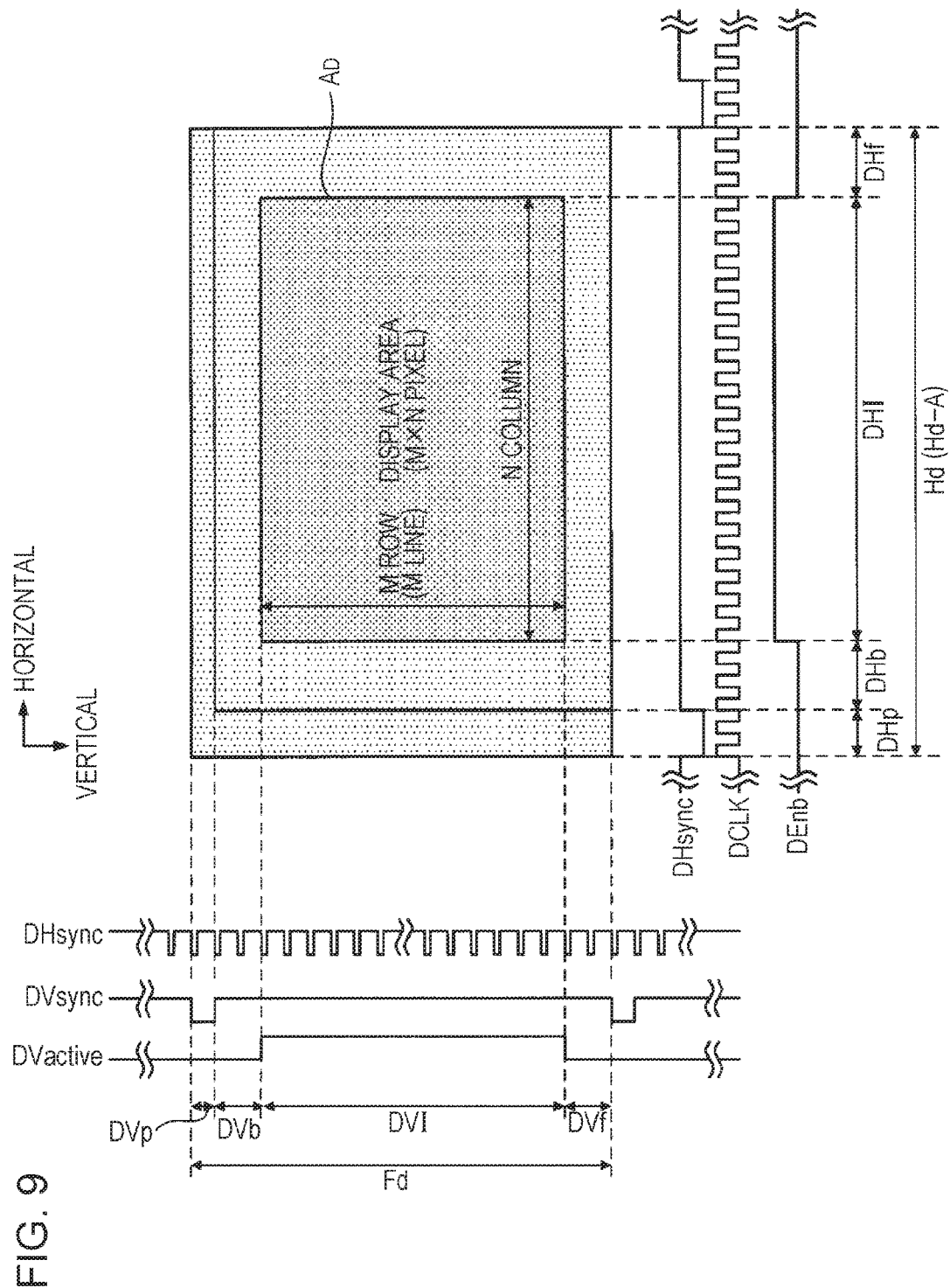
FIG. 9 is an explanatory diagram for describing the display area AD and a timing chart for displaying the display area AD in the display unit.

FIG. 9 is an explanatory diagram for describing the relationship between various signals generated by the timing generator 32 and the display timing of the image in the display area AD of the liquid crystal panel 42.

As shown in this drawing, the pixels in M rows×N columns over a first-row line to an (M-th)-row line of the display area AD display as many an image as one screen indicated by the image signals D[1] to D[M] during the vertical active data period DVI during which the vertical active data signal DVactive becomes active, in the display vertical scanning period Fd.

N pixels constituting the (m-th)-row line of the display area AD display an image for every pixel of the line data indicated by the image signals D[m] during the horizontal active data period DHI during which the enable signal DEnb becomes active, in the horizontal scanning period Hd (active horizontal scanning period Hd-A).

Although the vertical active data period DVI is extended depending on the number of inactive horizontal scanning periods Hd-D included in the vertical active data period DVI, it is assumed in this drawing that all the horizontal scanning periods Hd included in the vertical active data period DVI are the active horizontal scanning periods Hd-A.

Figure 10:
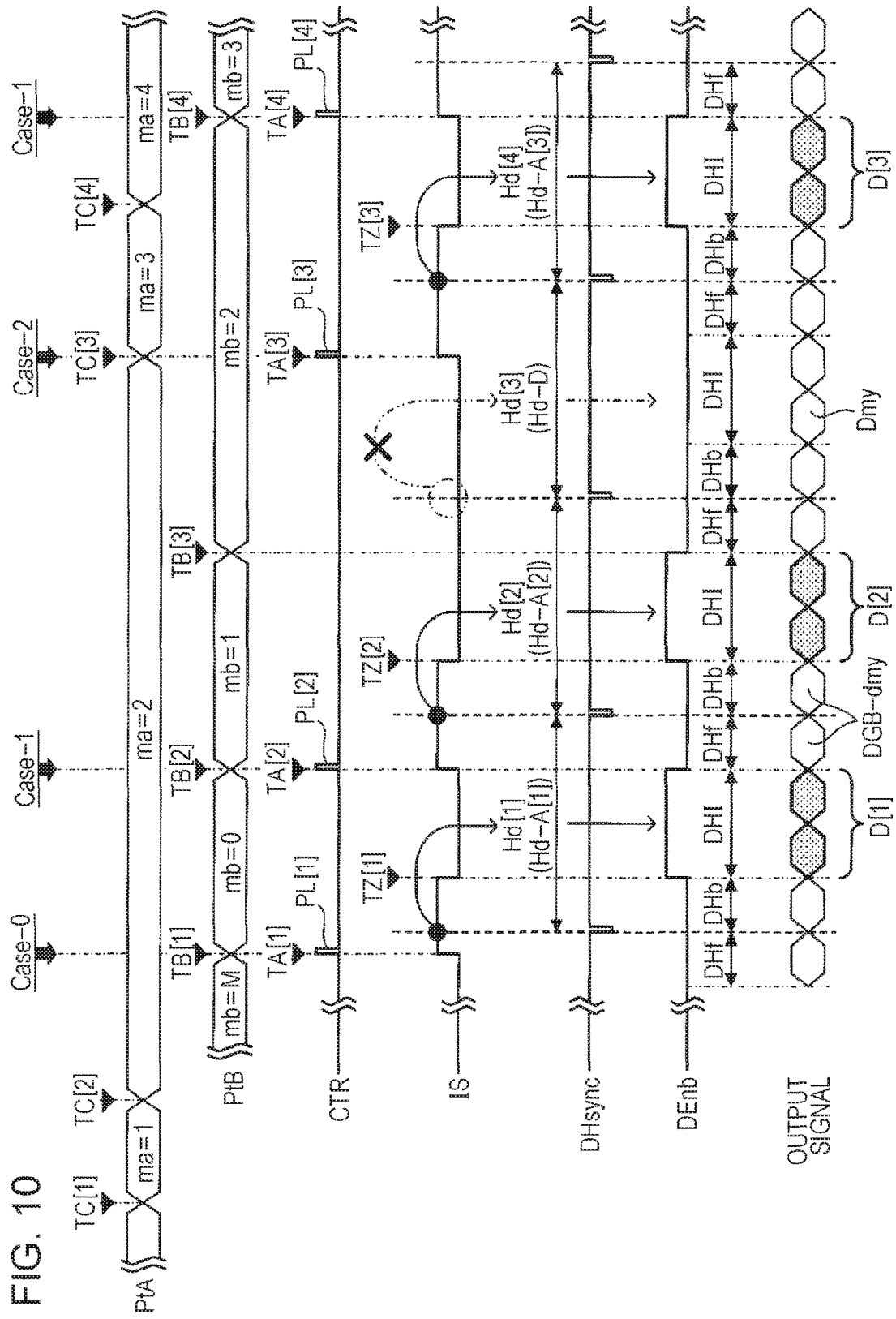
FIG. 10 is a timing chart for describing the operation of the vehicle imaging display apparatus 1.

FIG. 10 is an explanatory diagram for describing the output control signal CTR and the enable signal DEnb.

As stated above, when it is determined that the preparation to output the image signals D[m] is completed, that is, when the first condition and the second condition are satisfied, the output control unit 31 sets the values CTR[m] indicating that the determination results are positive to the output control signals CTR. In the present embodiment, for convenience's sake, it is assumed that the output control unit 31 temporarily outputs pulse-shaped waveforms that rise to a high level to the output control signals CTR when it is determined that the preparation to output the image signals D[m] is completed, and it is assumed as shown in FIG. 10 that output pulse waveforms representing the determination results indicating that the preparation to output the image signals D[m] set to the output control signals CTR is completed are referred to as output permission pulses PL[m] (=CTR[m]).

As stated above, the output control unit 31 according to the present embodiment regards that the second condition is satisfied based on the output of the output-completion signals PtB from the image signal output unit 23. The output control unit 31 determines whether or not the preparation to output the image signals D[m] is completed by performing the determination (first determination) of whether or not the image processing on the image signals DM is completed (the first condition is satisfied) when the output-completion signals PtB are output.

As shown in FIG. 10, in a case where the output control unit 31 determines whether or not the preparation to output the image signals D[m] is completed, a timing when the output control unit 31 determines (determines that the first condition is satisfied) that the image processing on the image signals DM is completed, that is, a timing when the results of the first determination become positive is referred to as an image processing determination time TA[m].

A timing when the output-completion signal PtB is supplied to the output control unit 31 (the second condition is regarded as being satisfied) is referred to as a display preparation determination time TB[m].

Hereinafter, for the sake of convenience in the description, a time when the generation of the image signals D[m] by the image processing unit 21 is actually completed is defined as an image signal generation time TC[m]. More specifically, the image signal generation time TC[m] is a time when the generation of all the partial image signals D-L[m], D-C[m], and D-R[m] is completed, and is the latest time of the time when the left-image image processing unit 21L completes the generation of the partial image signals D-L[m], the time when the center-image image processing unit 21C completes the generation of the partial image signals D-C[m], and the time when the right-image image processing unit 21R completes the generation of the partial image signals D-R[m]. The image signal generation time TC[m] is an example of an "image signal generation time".

The display preparation determination time TB[m] is the substantially same time as the time when the output of the image signals D[m−1] from the output control unit 31 is completed, and is the substantially same time as the time when the horizontal active data periods DHI of the active horizontal scanning periods Hd-A (referred to as active horizontal scanning periods Hd-A[m−1]) during which the image signals D[m−1] is output are ended. A time when the horizontal active data period DHI of the first horizontal scanning period Hd[m] is started after the display preparation determination time TB[m] is an example of a "display available time".

In the present specification, the "substantially same time" includes the concept that even though there are time lags caused by the signal transmission and reception or time lags caused by various processes, these times can be regarded as the same time in a case where these time legs are ignored.

The image processing determination time TA[m] is the substantially same time as the display preparation determination time TB[m] in a case where the generation of the image signals D[m] (image signals DGA[m]) is completed before the display preparation determination time TB[m], that is, in a case (referred to as Case-1) where the image signal generation time TC[m] elapses before the display preparation determination time TB[m].

In the case of Case-1, at the timing (=timing when the second condition is regarded as being satisfied) of the display preparation determination time TB[m], the output control unit 31 performs the determination indicating that m satisfies "m≤ma" based on the minimum value ma of the line numbers ma-J indicated by the writing-completion signals PtA supplied to the output control unit 31 before the display preparation determination time TB[m]. Since the timing when this determination is performed is the image processing determination time TA[m], there is actually a time leg between the image processing determination time TA[m] and the display preparation determination time TB[m], but it is assumed in the following description that both these times are substantially the same for the sake of convenience in the description.

Meanwhile, in a case (referred to as Case-2) where the generation of the image signals D[m] (image signals DGA [m]) is not completed before the display preparation determination time TB[m] (that is, the image signal generation time TC[m] does not arrive before the display preparation determination time TB[m]), the image processing determination time TA[m] become the time (that is, the substantially same time as the image signal generation time TC[m]) when the image processing unit 21 completes the generation of the image signal D[m].

In the case of Case-2, after the image processing unit 21 completes the generation of the image signals D[m] at the image signal generation time TC[m], the image processing unit 21 outputs the partial writing-completion signal PtA-J corresponding to the minimum value ma, and since the timing when the output control unit 31 which receives the partial writing-completion signals PtA-J determines that "m≤ma" is satisfied is the image processing determination time TA[m], there is a time leg between the image processing determination time TA[m] and the image signal generation time TC[m], but both the times are regarded as being substantially the same for simplicity's sake in the following description.

As mentioned above, since there may be Case-1 and Case-2, if both the cases are summarized, the output control unit 31 sets the output permission pulse PL[m] to the output control signal CTR at the later time (that is, this time is the image processing determination time TA[m]) of the image signal generation time TC[m] and the display preparation determination time TB[m]. That is, the output permission pulse PL[m] is output when the first condition and the second condition are satisfied for the image signal D[m]. When the third condition is satisfied after the output permission pulse PL[m] is output, in other words, when the enable signal DEnb initially becomes active after the output permission pulse PL[m] is output, the timing generator 32 controls the image signal output unit 23 to output the image signal D[m].

For the sake of convenience in the description, hereinafter, the time when all the first condition to the third condition are satisfied for the image signal D[m] is referred to as an output condition satisfaction time TZ[m].

In the present embodiment, the timing generator 32 determines a level of an internal processing signal IS for use in internal processing of the timing generator 32 based on the output control signal CTR. The timing generator 32 determines the timing when the enable signal DEnb becomes active and the type (active horizontal scanning period Hd-A or inactive horizontal scanning period Hd-D) of the horizontal scanning period Hd based on the internal processing signal IS.

Specifically, if the output permission pulse PL[m] is set to the output control signal CTR as shown in FIG. 10, the timing generator 32 sets the internal processing signal IS to be active (high level in the example of this drawing).

In a case where the internal processing signal is active at the timing when the horizontal scanning period Hd is started, the timing generator 32 determines (classifies) the type of the horizontal scanning period Hd as the active horizontal scanning period Hd-A[m], and sets the enable signal DEnb to be active at the timing when the horizontal active data period DHI of the active horizontal scanning period Hd-A [m]. The timing when the enable signal DEnb becomes active corresponds to the output condition satisfaction time TZ[m].

The timing generator 32 sets the internal processing signal IS to be inactive at the timing when the horizontal active data period DHI of the active horizontal scanning period Hd-A[m] is started and the enable signal DEnb becomes active, that is, the output condition satisfaction time TZ[m].

Meanwhile, in a case where the internal processing signal IS becomes inactive at the timing when the horizontal scanning period Hd is started, the timing generator 32 determines (classifies) the type of the horizontal scanning period Hd as the inactive horizontal scanning period Hd-D, and sets the enable signal DEnb to be inactive during the inactive horizontal scanning period Hd-D.

Here, in the example shown in FIG. 10, mb of the PtB signal is maintained at mb=M from immediately after the final line of one frame is output before the display preparation determination time TB[1]. Data output of the next frame is possible at a point of time the vertical back porch period is completed after the vertical synchronization signal is output. Thus, the mb signal is reset at the display preparation determination time TB[1], and mb=0 (Case-0). There is only Case-0 once at a special timing when one first line of one frame is started to be displayed and in one frame. As a result, the horizontal active data period DHI of the horizontal scanning period Hd[2] is started.

Hereinafter, an example of the second line and the subsequent lines will be described. Hereinafter, a case (corresponding to Case-1) where the output control unit 31 determines whether or not the preparation to output the image signal D[2] is completed and sets the output permission pulse PL[2] to the output control signal CTR will be described in the example shown in FIG. 10.

In the example shown in FIG. 10, the display preparation determination time TB[2] is a time when the horizontal active data period DHI of the horizontal scanning period Hd[1] (active horizontal scanning period Hd-A[1]) during which the output of the image signal D[1] is completed. In this example, it is assumed that the image signal generation time TC[2] when the image processing on the image signal D[2] is completed arrives before the display preparation determination time TB[2]. Thus, in this example, the image processing determination time TA[2] becomes the substantially same as the display preparation determination time TB[2]. Thus, the output control unit 31 outputs the output permission pulse PL[2] as the output control signal CTR when the horizontal active data period DHI of the horizontal scanning period Hd[1] is ended, that is, at the display preparation determination time TB[2].

The timing generator 32 sets the internal processing signal IS to be active at the timing when the output permission pulse PL[2] is output as the output control signal CTR, that is, the timing when the horizontal active data period DHI of the horizontal scanning period Hd[1] is ended. In this case, the internal processing signal IS becomes active even when the horizontal scanning period Hd[2] is started. Here, it is assumed that the timing generator 32 determines whether to set the horizontal scanning period to be the active horizontal scanning period Hd-A[m] or the inactive horizontal scanning period Hd-D at the starting timing (DHsync pulse) of the horizontal scanning period based on the internal processing signal IS. In this case, the internal processing signal IS is active. Thus, the timing generator 32 sets the horizontal scanning period Hd[2] to be the active horizontal scanning period Hd-A[2], and sets the enable signal DEnb to be active during the horizontal active data period DHI of the horizontal scanning period Hd[2].

That is, the starting time of the horizontal active data period DHI of the horizontal scanning period Hd[2] becomes the output condition satisfaction time TZ[2] when all the first condition to the third condition are satisfied for the image signal D[2]. Thus, the image signal D[2] is output during the horizontal scanning period Hd[2]. The timing generator 32 sets the internal processing signal IS to be inactive at the timing when the horizontal active data period DHI of the horizontal scanning period Hd[2] is started.

Hereinafter, a case (corresponding to Case-2) where the output control unit 31 determines whether or not the preparation to output the image signal D[3] is completed and sets the output permission pulse PL[3] to the output control signal CTR will be described in the example shown in FIG. 10.

In the example shown in FIG. 10, the display preparation determination time TB[3] is the time when the horizontal active data period DHI of the horizontal scanning period Hd[2] (active horizontal scanning period Hd-A[2]) during which the output of the image signal D[2] is completed. In this example, it is assumed that the image signal generation time TC[3] when the image processing on the image signal D[3] is completed is later than the display preparation determination time TB[3]. Thus, in this example, the image processing determination time TA[3] becomes the time later than the display preparation determination time TB[3]. In this example, it is assumed that the image signal generation time TC[3] is later than the starting time of the horizontal scanning period Hd[3]. Thus, the output control unit 31 outputs the output permission pulse PL[3] at the time later than the starting time of the horizontal scanning period Hd[3].

As mentioned above, the timing generator 32 sets the internal processing signal IS to be inactive at the starting time of the horizontal active data period DHI of the horizontal scanning period Hd[2]. Thus, the internal processing signal IS becomes inactive at the starting time of the horizontal scanning period Hd[3]. Since the state of the internal processing signal IS is inactive at the starting timing (DHsync pulse) of the horizontal scanning period, the timing generator 32 classifies the horizontal scanning period Hd[3] as the inactive horizontal scanning period Hd-D, and sets the enable signal DEnb to be inactive during the horizontal active data period DHI of the horizontal scanning period Hd[3]. In this case, the image signal output unit 23 outputs the inactive signal Dmy without output the image signal D[3] during the horizontal active data period DHI of the horizontal scanning period Hd[3].

Thereafter, the timing generator 32 sets the internal processing signal IS to be active at the timing when the output permission pulse PL[3] is output as the output control signal CTR. In this example, the timing when the output permission pulse PL[3] is output is before the horizontal scanning period Hd[4]. In this case, the internal processing signal IS becomes active at the starting time (DHsync pulse) of the horizontal scanning period Hd[4]. Thus, the timing generator 32 sets the horizontal scanning period Hd[4] to be the active horizontal scanning period Hd-A[3], and sets the enable signal DEnb to be active during the horizontal active data period DHI of the horizontal scanning period Hd[4].

That is, the starting time of the horizontal active data period DHI of the horizontal scanning period Hd[4] becomes the output condition satisfaction time TZ[3] when all the first condition to the third condition are satisfied for the image signal D[3]. Thus, the image signal D[3] is output during the horizontal scanning period Hd[4].

In the example shown in this drawing, it is assumed that a case where the output control unit 31 determines whether or not the preparation to output the image signal D[1] is completed and sets the output permission pulse PL[1] to the output control signal CTR, and a case (Case-0) where the output control unit determines whether or not the preparation to output the image signal D[1] is completed and sets the output permission pulse PL[1] to the output control signal CTR is the case of the condition as Case-1.

As stated above, in the present embodiment, when the first condition and the second condition are satisfied, the output control unit 31 outputs the output permission pulse PL[m], sets the state of the internal processing signal IS to be active, and determines whether to set the horizontal scanning period to be the active horizontal scanning period Hd-A[m] or the inactive horizontal scanning period Hd-D[m] at the starting time (DHsync pulse) of the horizontal scanning period. In a case where it is determined that the horizontal scanning period is set to be the active horizontal scanning period, the image signal output unit 23 performs an operation of outputting the image signal D[m] during the first horizontal scanning period Hd after the output permission pulse PL[m] is output. Due to such an operation, the output timing of the image signal D[m] from the image signal output unit 23 as result of the image processing on every line D[m] by the image processing unit 21 is adjusted for every horizontal scanning period Hd with precision.

It has been described in the example shown in FIG. 10 that the timing generator 32 determines the type of the horizontal scanning period Hd at the timing when the horizontal scanning period Hd is started, and such an example is merely an example. For example, the type of the horizontal scanning period may be determined during a period from the starting of the horizontal front porch period DHf of the horizontal scanning period Hd during which the output permission pulse PL[m] is output to the ending of the horizontal back porch period DHb of the first horizontal scanning period Hd after the output permission pulse PL[m] is output.

It has been described in the example shown in FIG. 10 that the timing when the internal processing signal IS becomes inactive is the timing when the enable signal DEnb becomes active, and such an example is merely an example. The timing when the timing generator 32 sets the internal processing signal IS to be inactive may be any horizontal active data period DHI from when the enable signal DEnb becomes active to when the enable signal becomes inactive.

It has been described in the present embodiment that the timing generator 32 determines the waveform of the enable signal DEnb and the type of the horizontal scanning period Hd by using the internal processing signal IS, and such an example is merely an example. The timing generator may determine the waveform thereof and the type thereof based on the output control signal CTR without using the internal processing signal IS.

It has been described in the present embodiment that the output control signal CTR has the waveform including the output permission pulse PL[m], and such an example is merely an example. For example, the output control signal CTR may have the waveform of the internal processing signal IS shown in FIG. 10. In this case, the timing generator 32 may supply various signals such as the enable signal DEnb necessary for the output control unit 31 to determine the waveform of the output control signal CTR to the output control unit 31.

Figure 11B:
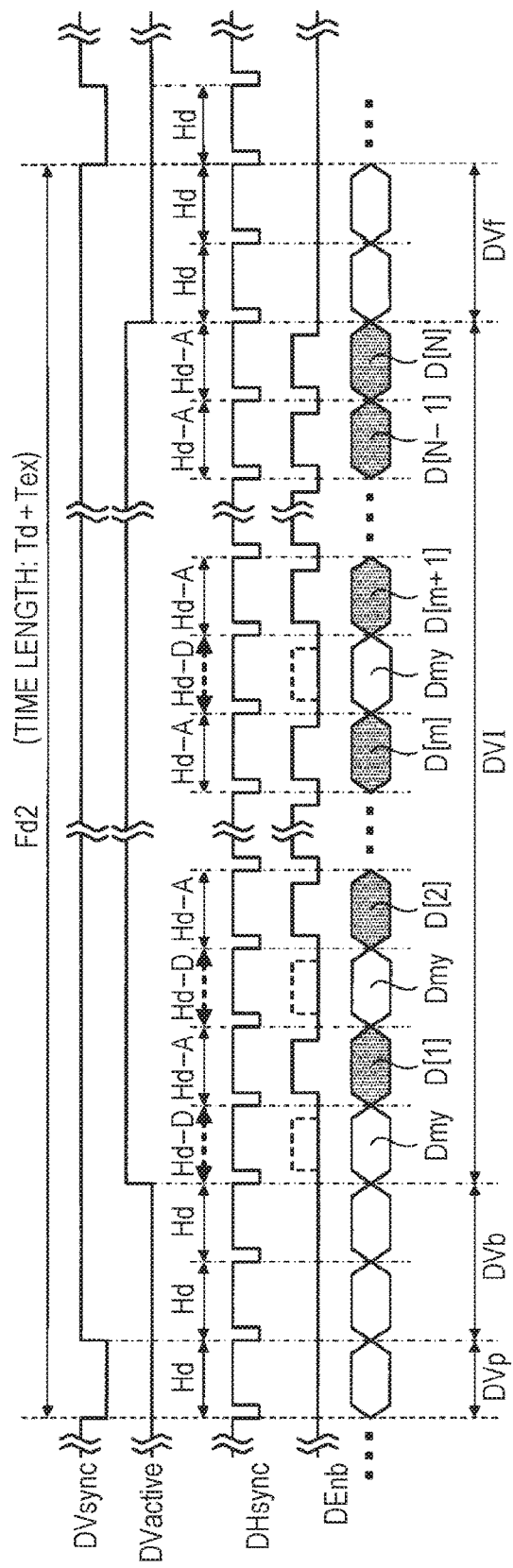
FIG. 11B is a timing chart for describing the operation of the vehicle imaging display apparatus 1.

FIGS. 11A and 11B are explanatory diagrams for describing the relationship between the active horizontal scanning period Hd-A and the inactive horizontal scanning period Hd-D and between the active horizontal scanning period and the display vertical scanning period Fd.

The display vertical scanning period Fd is a period which is output the image signals D[1] to D[M] corresponding to the (M-th)-row line. Thus, the timing generator 32 sets M active horizontal scanning periods Hd-A to the vertical active data period DVI of each display vertical scanning period Fd.

Meanwhile, the timing generator 32 according to the present embodiment classifies the horizontal scanning period Hd as any one of the active horizontal scanning period Hd-A and the inactive horizontal scanning period Hd-D. Only when the horizontal scanning period Hd is the active horizontal scanning period Hd-A, the image signal D[m] is output during the horizontal scanning period Hd.

Thus, in a case where the inactive horizontal scanning period Hd-D is set to the vertical active data period DVI of the display vertical scanning period Fd, the timing generator 32 according to the present embodiment extends as many of the vertical active data period DVI as the time length equivalent to the inactive horizontal scanning period Hd-D, and outputs the display vertical synchronization signal DVsync and the vertical active data signal DVactive such that M active horizontal scanning periods Hd-A are set to the vertical active data period DVI of each display vertical scanning period Fd.

For example, in a case where all the horizontal scanning period Hd of the vertical active data period DVI are set to be the active horizontal scanning period Hd-A like the display vertical scanning period Fd1 shown in FIG. 11A, the timing generator 32 sets the time length of the vertical active data period DVI to be a time length M times greater than the horizontal scanning period Hd. Here, the period of the display vertical scanning period Fd1 except for the vertical synchronization front porch period (DVf), the vertical synchronization period (DVp) and the vertical synchronization back porch period (DVb), that is, DVI is referred to as the vertical active data period DVI, and is set to a period of DVactive=H.

Meanwhile, in a case where one or the plurality of inactive horizontal scanning periods Hd-D are set to the vertical active data period DVI like the display vertical scanning period Fd2 shown in FIG. 11B, the timing generator 32 sets the time length (period of DVactive=H) of the vertical active data period DVI to be a time length acquired by adding a time length M times greater than the horizontal scanning period Hd and a total time length of one or the plurality of inactive horizontal scanning periods Hd-D existing in the vertical active data period DVI.

That is, the timing generator 32 can cause the image signal output unit 23 to output the image signals D[1] to D[M] during each display vertical scanning period Fd by adjusting the time length of the display vertical scanning period Fd for every horizontal scanning period Hd.

The time length of the display vertical scanning period Fd in a case where all the horizontal scanning period Hd of the vertical active data period DVI are the active horizontal scanning period Hd-A like the display vertical scanning period Fd1 shown in FIG. 11A is referred to as a standard vertical scanning time Td. The highest frame rate at which the display unit 40 can display, that is, "1/Td" which is a frame rate in a case where the time length of the display vertical scanning period Fd is the standard vertical scanning time Td may be referred to as a "second frame rate". Among the timing control processes performed by the timing control unit 30, timing control performed such that the image signal D is output at the second frame rate may be referred to as "first timing control".

The total value of the time lengths of one or the plurality of inactive horizontal scanning periods Hd-D in a case where one or the plurality of inactive horizontal scanning periods Hd-D is provided in the vertical active data period DVI like the display vertical scanning period Fd2 shown in FIG. 11B is referred to as an extended vertical scanning time Tex. That is, the time length of the display vertical scanning period Fd in a case where one or the plurality of inactive horizontal scanning period Hd-D is provided in the vertical active data period DVI is a total time of the standard vertical scanning time Td and the extended vertical scanning time Tex. Among the timing control processes performed by the timing control unit 30, timing control performed such that the image signal D is output during the vertical active data period DVI in which one or the plurality of inactive horizontal scanning periods Hd-D is provided may be referred to as "second timing control". Although the details are described below, the timing control unit 30 controls the timing such that the image signal D is output at the first frame rate in the second timing control.

Hereinafter, the display unit 40 will be described with reference to FIG. 12.

Figure 12:
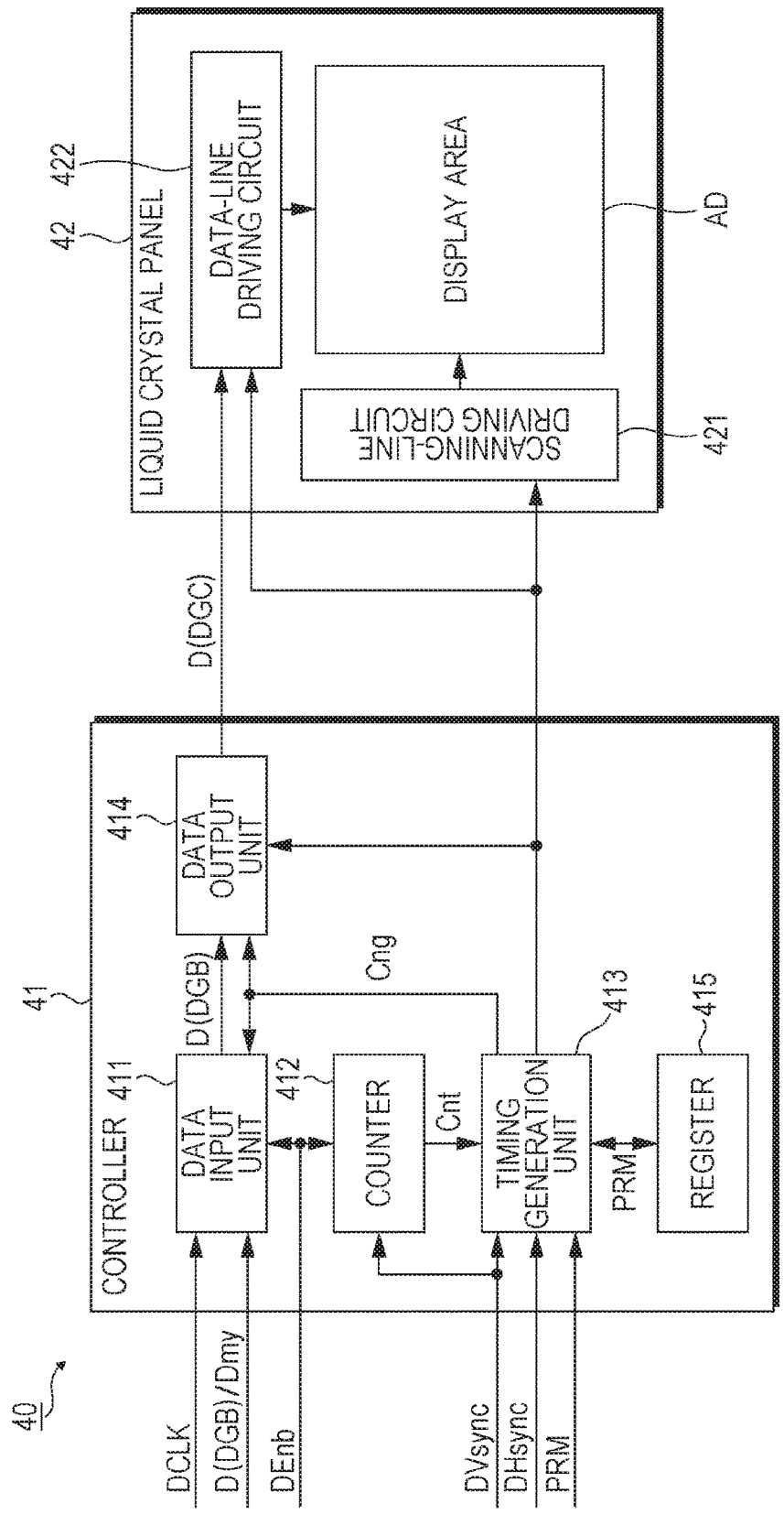
FIG. 12 is a block diagram showing the configuration of the display unit 40.

FIG. 12 is a block diagram showing a configuration of the display unit 40. As stated above, the display unit 40 includes the controller 41 that controls the operation of the liquid crystal panel 42, and the liquid crystal panel 42 for displaying the image corresponding to the image signals D.

As sated above, the display area AD for displaying the image corresponding to the image signals D is formed in the liquid crystal panel 42. The display area AD includes M-row scanning lines extending in the horizontal direction in FIG. 9, N-column data lines extending in the vertical direction, and pixels in M rows×N columns which are received so as to correspond to the intersections of the scanning lines and the data lines. The liquid crystal panel 42 includes a scanning-line driving circuit 421 for selecting the scanning line, and a data-line driving circuit 422 for driving the data line.

The controller 41 includes a data input unit 411 to which the image signal D (image signal DGB) is input from the image signal output unit 23, a counter 412 that counts the number of active horizontal scanning periods Hd-A (the number of times the enable signal DEnb becomes active) during each vertical active data period DVI, a timing generation unit 413 that generates various timing signals for defining a driving timing of the liquid crystal panel 42, a data output unit 414 that outputs the image signal D (image signal DGC) to the liquid crystal panel 42, and a register 415 that stores setting parameters PRM for defining the operations of the controller 41.

In the present embodiment, data transmission between the image processing circuit 100 (image signal generation unit 20 and the timing control unit 30) and the controller 41 is performed through a low-voltage differential (LVDS) serial interface (not shown). Thus, it is possible to achieve data transmission between the image processing circuit 100 and the controller 41 at higher speed through such a serial interface than that in a case where the data transmission therebetween is performed through a parallel interface.

The setting parameters PRM set to the register 415 are values that are used to operate the controller 41 according to the specification of the liquid crystal panel 42 and define the operations of the controller 41.

For example, the setting parameters PRM may include the time length of the horizontal scanning period Hd (or the number of clocks of the display dot clock signals DCLK included in the horizontal scanning period Hd. Hereinafter, the number of clocks of the display dot clock signals DCLK is simply referred to as a "clock number".), the time length of the horizontal active data period DHI (or the number of pixels (N) of the display area AD in an X-axis direction), the time length of the horizontal synchronization period DHp (or a clock number), the time length of the horizontal back porch period DHb (or a clock number), the time length of the horizontal front porch period DHf (or a clock number), the time length of the vertical active data period DVI in a case where the inactive horizontal scanning period Hd-D is not included in the vertical active data period DVI (or the number of lines (M) of the display area AD in the vertical direction. That is, the number of active horizontal scanning periods Hd-A included in the vertical active data period DVI), the time length of the vertical synchronization period DVp (or a clock number), the time length of the vertical back porch period DVb (or a clock number), and the time length of the vertical front porch period DVf (or a clock number).

In the vehicle imaging display apparatus 1 according to the present embodiment, since the operation timing of the controller 41 can be set from the image processing circuit 100 according to the specification of the liquid crystal panel 42, it is not necessary to change the controller 41 even in a case where the size of the liquid crystal panel 42 is changed or a case where the specification of the liquid crystal panel 42 such as the frame rate is changed. Thus, it is possible to improve the versatility of the system.

The display dot clock signal DCLK, the output signal including the image signal D(Image signal DGB) and the inactive signal Dmy from the image signal output unit 23, and the enable signal DEnb are supplied from the image processing circuit 100 to the data input unit 411.

If the enable signal DEnb becomes active, the data input unit 411 synchronizes the display dot clock signal DCLK for the period during which the enable signal DEnb is active, receives as many image signals D[m] as one line supplied from the image signal output unit 23, and outputs the received image signals D[m] to the data output unit 414. Meanwhile, in a case where the enable signal DEnb is inactive, the data input unit 411 discards the inactive signal Dmy supplied from the image signal output unit 23 without receiving the inactive signal.

The enable signal DEnb and the display vertical synchronization signal DVsync are supplied to the counter 412 from the image processing circuit 100. The counter 412 counts rising edges of the enable signal DEnb, and outputs the count value Cnt indicating the count result to the timing generation unit 413. If the display vertical synchronization signal DVsync becomes active and the display vertical synchronization pulse PlsV is supplied as the display vertical synchronization signal DVsync, the counter 412 resets the count value Cnt to be "0". Thus, the counter 412 can count the number of active horizontal scanning periods Hd-A included in each display vertical scanning period Fd. That is, the count value Cnt indicates the line number (m) corresponding to the image signal D[m] in a case where the data input unit 411 receives the image signal D[m] that designates the image to be displayed by the (m-th)-row line.

The display vertical synchronization signal DVsync, the display horizontal synchronization signal DHsync, and the setting parameters PRM from the image processing circuit 100 and the count value Cnt from the counter 412 are supplied to the timing generation unit 413. As mentioned above, if the setting parameter PRM is supplied from the image processing circuit 100, the timing generation unit 413 sets the supplied setting parameter PRM to the register 415.

In a case where the count value Cnt indicates "m", the timing generation unit 413 causes the scanning-line driving circuit 421 to select the (m-th)-row line (scanning line) corresponding to the count value Cnt. In a case where the count value Cnt indicates "m", the timing generation unit 413 causes the data output unit 414 to supply the as many image signals D[m] as one line received by the data input unit 411 to the data-line driving circuit 422, the image signals DGC[m]. In this case, the data-line driving circuit 422 writes the image signals DGC[m] supplied from the data output unit 414 in N pixels (pixels of the (m-th)-row line) formed so as to correspond to the (m-th)-row line scanning line selected by the scanning-line driving circuit 421. Accordingly, the image of the selected line is displayed in the display area AD. Although it has been described in the present embodiment that the image signals DGA and DGB are digital signals, the image signals DGC may be digital signals or may be analog signals.

As stated above, the controller 41 displays the image indicated by the image signals D supplied from the image signal output unit 23 in the display area AD of the liquid crystal panel 42.

In a case where it is detected that the count value Cnt is equal to the number of lines "M" of the display area AD set to the register 415, the controller 41 prepares a frame renewal process at the timing when the display horizontal synchronization signal DHsync is initially supplied after the detection, that is, the timing when the vertical front porch period DVf is started. After the vertical front porch period DVf is started, the timing generation unit 413 outputs a frame renewal process starting signal Cng for instructing that the frame process is performed to the data input unit 411 and the data output unit 414.

Here, the frame renewal process is a process for preparing to display the image during the next display vertical scanning period Fd, and includes, for example, a process of deleting data stored in the buffers included in the data input unit 411 and the data output unit 414. The frame renewal process is started after the vertical front porch period DVf is started. The frame renewal process is preferably ended before the vertical front porch period DVf is ended.

<2. Image Processing>

Hereinafter, the details of each partial image processing unit 21J included in the image processing unit 21 and the image processing performed by each partial image processing unit 21J will be described with reference to FIGS. 13 to 19.

Figure 13:
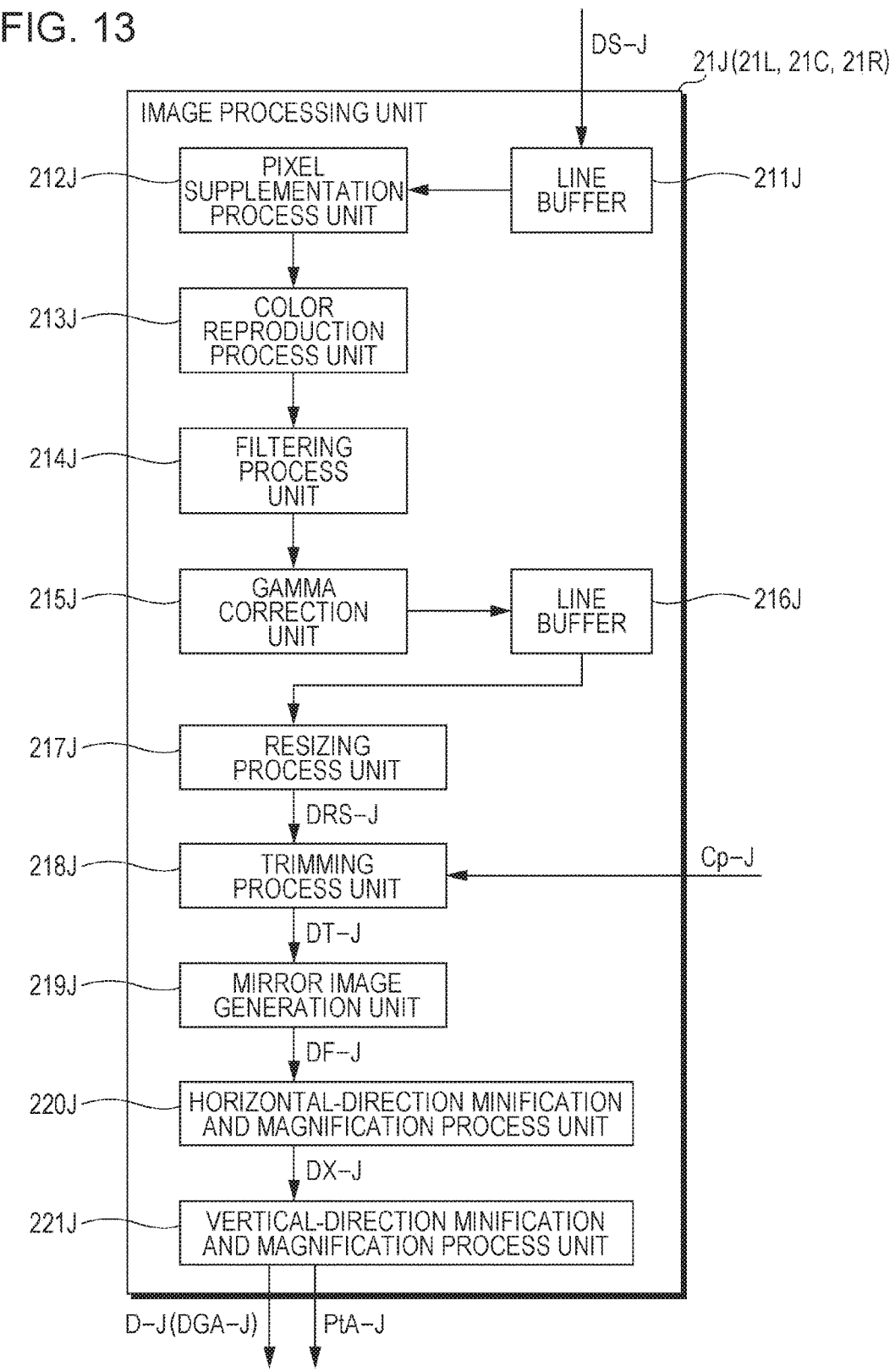
FIG. 13 is a block diagram showing a configuration of a partial image processing unit 21J.

FIG. 13 is a block diagram showing a configuration of each partial image processing unit 21J (21L, 21C, or 21R).

As shown in this drawing, the partial image processing unit 21J includes a line buffer 211J (211L, 211C, or 211R) that temporarily stores the imaging signals DS-J output from the image sensor 12J, a pixel interpolation process unit 212J (212L, 212C, or 212R) that performs an interpolation process on the imaging signals DS-J stored in the line buffer 211J, a color reproduction process unit 213J (213L, 213C, or 213R) that performs a color reproduction process on the interpolated imaging signals DS-J, a filtering process unit 214J (214L, 214C, or 214R) that performs a filtering process on the color-reproduced imaging signals DS-J, a gamma correction unit 215J (215L, 2150, or 215R) that performs gamma correction on the filtered imaging signals DS-J, a line buffer 216J (216L, 216C, or 216R) that temporarily stores the gamma-corrected imaging signals DS-J, a resizing process unit 217J (217L, 217C, or 217R) that performs a resizing process for converting the imaging signals DS-J stored in the line buffer 216J into as many partial image signals DRS-J (DRS-L, DRS-C, or DRS-R) as pixels of the display area AD-J, and a trimming process unit 218J (218L, 218C, or 218R) that generates the partial image signals DT-J (DT-L, DT-C, or DT-R) by performing a trimming process for trimming an area corresponding to the position designated by the driver on the partial image signals DRS-J, among the partial image signals DRS-J.

The driver can input an instruction for designating the trimming position by using the operation unit 60.

As stated above, the number of pixels of the image indicated by the imaging signals DS-J included in the imaging signals DS and the number of pixels (the number of pixels of the display areas AD-J of the display area AD) of the image indicated by the partial image signals D-J included in the image signal D are different. Thus, the resizing process unit 217J performs the resizing process for converting the imaging signals DS-J into the partial image signals DRS-J corresponding to the number of pixels of the display area AD-J.

Incidentally, the image indicated by the imaging signals DS-J may have distortion caused by optical characteristics of the lens included in the imaging optical system provided to correspond to the image sensor 12J. Specifically, the image indicating the imaging result when the subject is imaged may have barrel distortion in which the image is outwardly further expanded than an image to be originally displayed in the display area AD-J or pincushion distortion in which the image is inwardly further contracted than an image to be originally displayed. Thus, the resizing process unit 217J performs a distortion correction process for correcting the distortion such as the barrel distortion or the pincushion distortion.

FIG. 14 is an explanatory diagram for describing the distortion correction process performed by the resizing process unit 217J. Hereinafter, the distortion correction process performed during the resizing process will be described with reference to FIG. 14. In FIG. 14, it is assumed that the number of lines PJ of the image indicated by the imaging signal DS-J is 16 lines (PJ=16) and the number of lines of the image indicated by the partial image signals D-J (and the partial image signals DRS-J) is 12 lines (M=12).

Hereinafter, among the imaging signals DS-J, as many imaging signals DS-J as one line indicating the image to be displayed in a (pJ-th)-row line are described as imaging signals DS-J[pJ] (pJ is a natural number satisfying 1≤pJ≤PJ). Hereinafter, among the partial image signals DRS-J, as many partial image signals DRS-J as one line in the (m-th)-row line are described as partial image signals DRS-J[m].

In FIG. 14, the image indicated by the imaging signals DS-J in a case where the barrel distortion occurs is denoted by reference signal Pc1, the image indicated by the partial image signals DRS-J when the subject is imaged based on the imaging signals DS-J indicating the image Pc1 is denoted by reference sign Pc2, the image indicated by the imaging signals DS-J in a case where the pincushion distortion occurs is denoted by reference sign Pc3, and the image indicated by the partial image signals DRS-J when the subject is imaged based on the imaging signals DS-J indicating the image Pc3 is denoted by reference sign Pc4.

The image Pc1 is signals indicated by the imaging signals DS-J in a case where the imaging signals DS-J indicate a closed curve line CV1 acquired by which a square SQ is expanded due to the barrel distortion even though the image to be displayed in the display area AD-J is the square SQ (in a case where it is assumed that a trimming process, a horizontal-direction minification and magnification process, a vertical-direction minification and magnification process, to be described below, are not performed). The image Pc3 is signals indicated by the imaging signals DS-J in a case where the imaging signals DS-J indicate a closed curve line CV2 acquired by which the square SQ is contracted due to the pincushion distortion even though the image to be displayed in the display area AD-J is the square SQ (in a case where it is assumed that a trimming process, a horizontal-direction minification and magnification process, a vertical-direction minification and magnification process, to be described below, are not performed).

The resizing process unit 217J corrects the image Pc1 indicating the closed curve line CV1 to the image Pc2 indicating the square SQ in the distortion correction process in a case where the barrel distortion occurs. Similarly, the resizing process unit 217J corrects the image Pc3 indicating the closed curve line CV2 to the image Pc4 indicating the square SQ in the distortion correction process in a case where the barrel distortion occurs.

In such cases, the resizing process unit 217J associates the pixels in the non-corrected image with the pixels in the corrected image, and determines gradation to be displayed in the corrected pixels based on the gradation displayed by the pixels within a reference area including center pixels and surrounding pixels which are pixels around the center pixels by using the non-corrected pixels corresponding to the corrected pixels as center pixels.

For example, in a case where the gradation of the corrected pixels PxS1 constituting the image Pc2 or the image Pc4 is determined, the resizing process unit 217J determines non-corrected pixels PxC1 constituting the image PC1 or the image Pc3 as the center pixels. The resizing process unit 217J determines the gradation to be displayed in the pixels PxS1 based on the gradation to be displayed in the pixels within a reference area Area1 including the pixels PxC1 which are the center pixels.

Similarly, when the gradation of the corrected pixels PxS2 constituting the image Pc2 or the image Pc4 is determined, the resizing process unit 217J determines the non-corrected pixels PxC2 constituting the image Pc1 or the image Pc3 as the center pixels. The resizing process unit 217J determines the gradation to be displayed in the pixels PxS2 based on the gradation to be displayed in the pixels within a reference area Area2 including the pixels PxC2 which are the center pixels.

The pixels hatched in dark in the image Pc2 and the image Pc4 indicate the corrected pixels positioned in a first row, a seventh row, and a twelfth row of the partial image signal D-J, the pixels hatched in dark in the image Pct and the image Pc3 indicate the non-corrected pixels (central pixels) which respectively correspond to the corrected pixels, and the pixels hatched in light in the image Pc1 and the image Pc3 indicate the surrounding pixels which respectively correspond to the central pixels.

As can be apparent from the example shown in FIG. 14, a degree of expansion of the image in a case where the barrel distortion occurs is changed depending on the position of the line of the screen, and as the position of the line in the vertical direction of the screen becomes closer to the end, the degree of expansion of the image becomes larger. A degree of contraction of the image in a case where the pincushion distortion occurs is changed depending on the position of the line of the screen, and as the position of the line in the vertical direction of the screen becomes closer to the end, the degree of contraction of the image becomes larger.

Accordingly, the number of lines of the imaging signal DS-J required in a case where the resizing process unit 217J generates the partial image signal DRS-J[m] is changed depending on the position (value of m) of the line corresponding to the partial image signal D-J[m]. Thus, the time length necessary for the resizing process unit 217J to perform the resizing process is changed depending on the position of the line.

For example, in the example shown in FIG. 14, in order for the resizing process unit 217J to generate the partial image signal DRS-J[1] corresponding to the first-row line, the imaging signals DS-J[1] to DS-J[5] corresponding to the first-row to fifth-row lines are required. In contrast, in order for the resizing process unit 217J to generate the partial image signal DRS-J[7] corresponding to the seventh-row line, the imaging signals DS-J[8] to DS-J[10] corresponding to the eighth-row to tenth-row lines are required. That is, the time length necessary for the resizing process unit 217J to generate the partial image signal DRS-J[1] is greater than the time length necessary to generate the partial image signal DRS-J[7].

Incidentally, in the wing mirror of the related art, the driver sets an orientation of the mirror in the up, down, left and right directions to be in an arbitrary direction by an operation lever or a button positioned by the driver's seat, and can change an area reflection on the mirror. In order to allow for the same area change, in the present embodiment, the driver of the vehicle α can input an instruction for designating a trimming position through a touch panel (not shown) of the operation unit 60 for the trimming process of trimming a partial area of the image indicated by the partial image signals DRS-J on which the resizing process is performed.

Figure 15A:
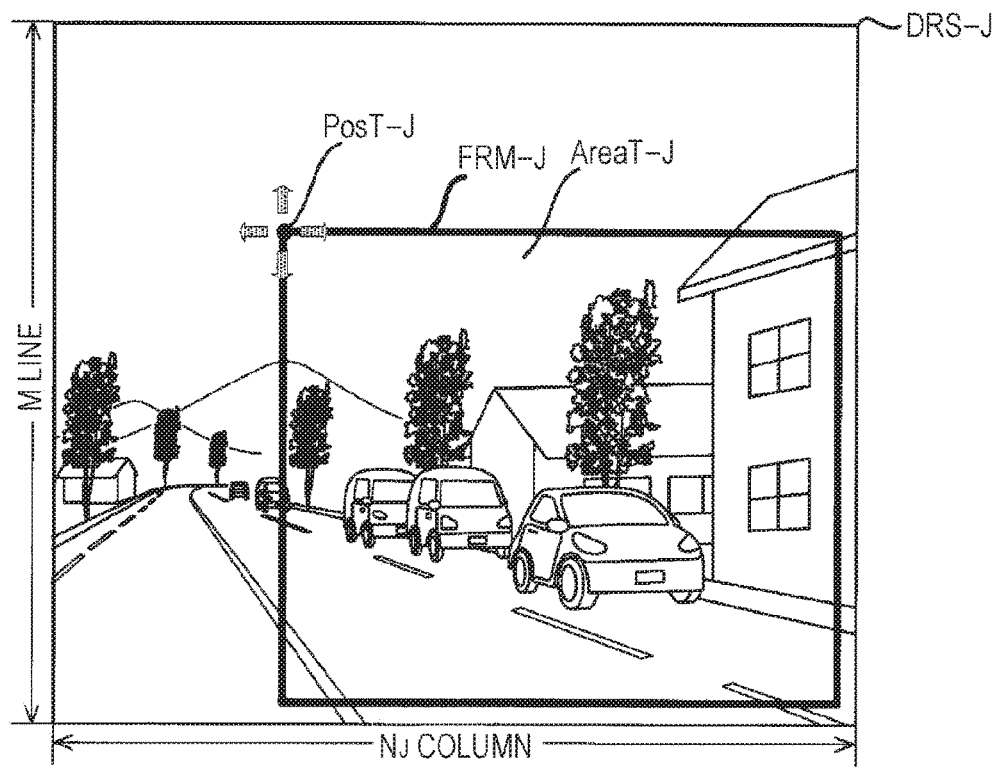
FIG. 15A is an explanatory diagram for describing a trimming process.

FIG. 15A shows an example of a trimming area designated by the driver. As shown in FIG. 15A, a trimming area AreaT-J is a rectangular area which is a part of the image indicated by the partial image signals DRS-J. For example, the driver designates the trimming area AreaT-J by moving a rectangular frame FRM-J displayed on the image through a touch operation while visually perceiving the image indicated by the partial image signals DRS-J displayed on the touch panel (not shown) of the operation unit 60 within the vehicle when the vehicle is not driven. Here, the rectangular frame FRM-J partitions an area having a predetermined size, and the trimming area AreaT-J is determined by, for example, a position PosT-J of an upper left vertex of the rectangular frame FRM-J.

If the driver designates the position PosT-J by moving the rectangular frame FRM-J on the touch panel, the control unit 50 generates a position designation signal Cp-J indicating the position PosT-J and supplies the generated signal to the trimming process unit 218J of the partial image processing unit 21J. The trimming process unit 218J determines the rectangular frame FRM-J having the position PosT-J designated by the position designation signal Cp-J as the upper left vertex, as the trimming area AreaT-J, and performs the trimming process of trimming the trimming area AreaT-J of the image indicated by the partial image signal DRS-J.

The same operation lever as that of the related art is provided instead of the touch panel, and the driver moves the operation lever with their hand to move the rectangular frame FRM-J having a predetermined size in the up, down, left and right directions. Thus, the trimming area AreaT-J can be designated.

In the present embodiment, since the number of partial image signals DRS-J is equal to the number of pixels of the display area AD-J, the number of pixels of the trimming area AreaT-J which is a part thereof is less than the number of pixels of the display area AD-J. Thus, in order to cause the number of pixels of the trimming area AreaT-J to be equal to the number of pixels of the display area AD-J, the trimming process unit 218J performs a magnification process of magnifying the trimming area AreaT-J after the trimming area AreaT-J is designated.

Figure 15B:
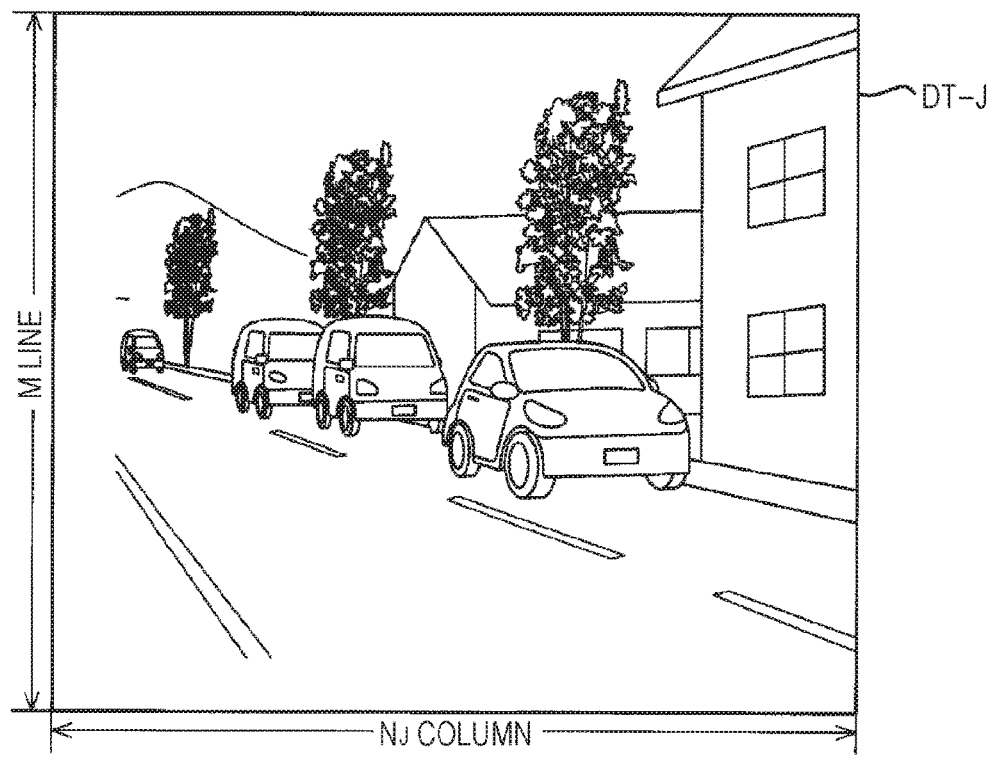
FIG. 15B is a diagram showing an example of an image after the trimming process.

FIG. 15B shows an example of the image after the trimming process. As can be seen from FIGS. 15A and 15B, the image indicated by the trimming area AreaT-J shown in FIG. 15A is magnified by the trimming process, and the partial image signals DT-J (having the same number of pixels as that of the partial image signals D-J) having the number of pixels in M rows×NJ columns of the display area AD-J is generated.

The image in Mrs rows×NrsJ columns (Mrs is a natural number satisfying M<Mrs<PJ, and NrsJ is a natural number satisfying NJ<NrsJ<QJ) may be generated by the resizing process, and thereafter, the trimming process of cutting the image in M rows×NJ columns from the image generated by the resizing process may be performed. In this case, since the trimming area AreaT-J is in M rows×NJ columns, the magnification process is not required, and thus, it is possible to improve the quality of the image. The rectangular frame FRM-J does not need to have a predetermined size, and may be changed by the operation of the driver. In this case, a magnification ratio of the image indicated by the trimming area AreaT-J may be freely changed.

According to the trimming process, for example, there is an advantage that cost is suppressed since a mechanism for varying an orientation of a camera is not require unlike the configuration in which an imaging range is changed by varying an orientation in which the camera itself including the image sensors in the imaging unit images. In the trimming process, since the trimming area AreaT-J is magnified so as to match to the size of the display area AD-J after the trimming area is designated, there is an advantage that an area desired to be viewed by the driver is magnified and displayed.

As shown in FIG. 13, the partial image processing unit 21J further includes a mirror image generation unit 219J (219L, 219C, or 219R) that generates partial image signals DF-J (DF-L, DF-C, or DF-R) indicating a left-right reversal image of the image indicated by the partial image signals DT-J by performing a left-right reversal process on the partial image signals DT-J, a horizontal-direction minification and magnification process unit 220J (220L, 220C, or 220R) that generates partial image signals DX-J (DX-L, DX-C, or DX-R) indicating an image acquired by reducing and magnifying the image indicated by the partial image signals DF-J in the horizontal direction for every line by performing the horizontal-direction minification and magnification process on the partial image signals DF-J, and a vertical-direction minification and magnification process unit 221J (221L, 221C, or 221R) that generates partial image signals D-J indicating an image acquired by reducing or magnifying the image indicated by the partial image signals DX-J in the vertical direction by performing a vertical-direction minification and magnification process on the partial image signals DX-J.

Figure 15C:
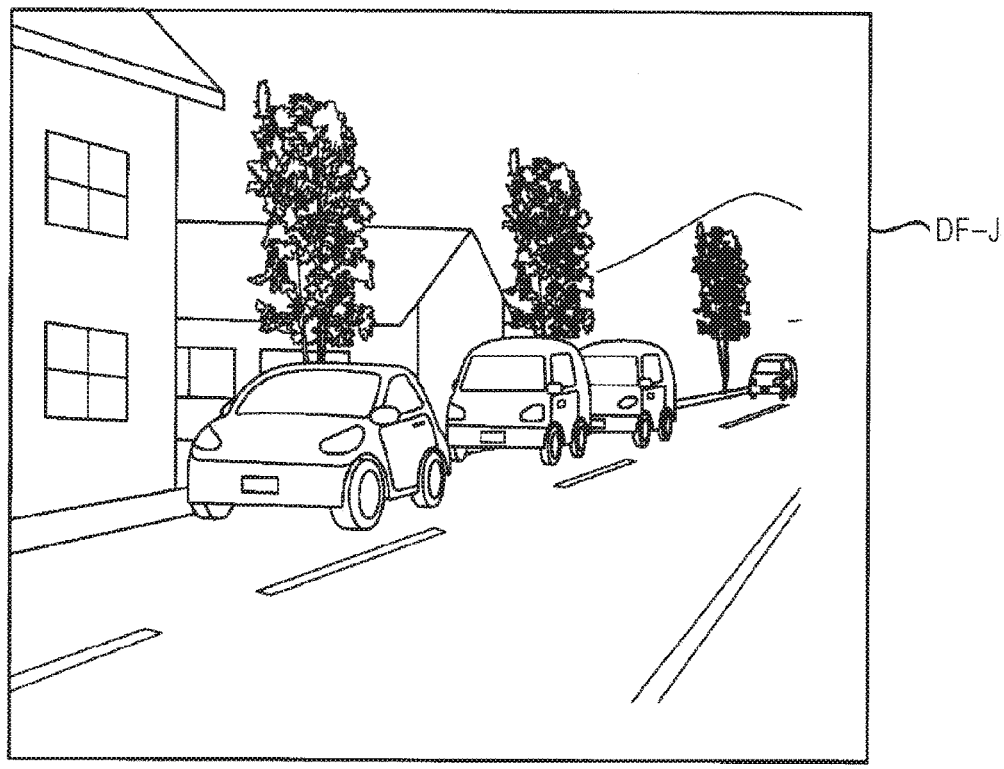
FIG. 15C is a diagram showing an example of an image generated by a left-right reversal process.

FIG. 15C shows an example of the image indicated by the partial image signals DF-J generated by the left-right reversal process performed by the mirror image generation unit 219J. The driver of the vehicle α sees a mirror image of the subject reflected on the wing mirror or the rear-view mirror of the related art, and checks the safety of the vehicle on the rear side and rear lateral side. The image sensor 12J images not the mirror image of the subject but the subject itself. Thus, an orientation of the image indicated by the imaging signals DS-J output from the image sensor 12J is reversed in the left and right direction to that of the mirror image reflected on the wing mirror or the rear-view mirror of the related art.

Thus, the mirror image generation unit 219J performs the left-right reversal process of generating the partial image signals DF-J (FIG. 15C) indicating a mirror surface image as a left-right reversal image of the image (FIG. 15B) indicated by the partial image signals DT-J output from the trimming process unit 218J in the left and right direction. According to the left-right reversal process, since the safety can be checked using the image of which the left and right direction are the same as those of the mirror image reflected on the wing mirror or the fender mirror of the related art, there is not a concern that the left-right reversal image to that in the related art is reflected, and thus, the driver may be confused.

Hereinafter, the horizontal-direction minification and magnification process performed by the horizontal-direction minification and magnification process unit 220J and the vertical-direction minification and magnification process performed by the vertical-direction minification and magnification unit 221J will be described with reference to FIGS. 16A to 19. Hereinafter, these two processes may be referred to as the minification and magnification process.

Figure 16A:
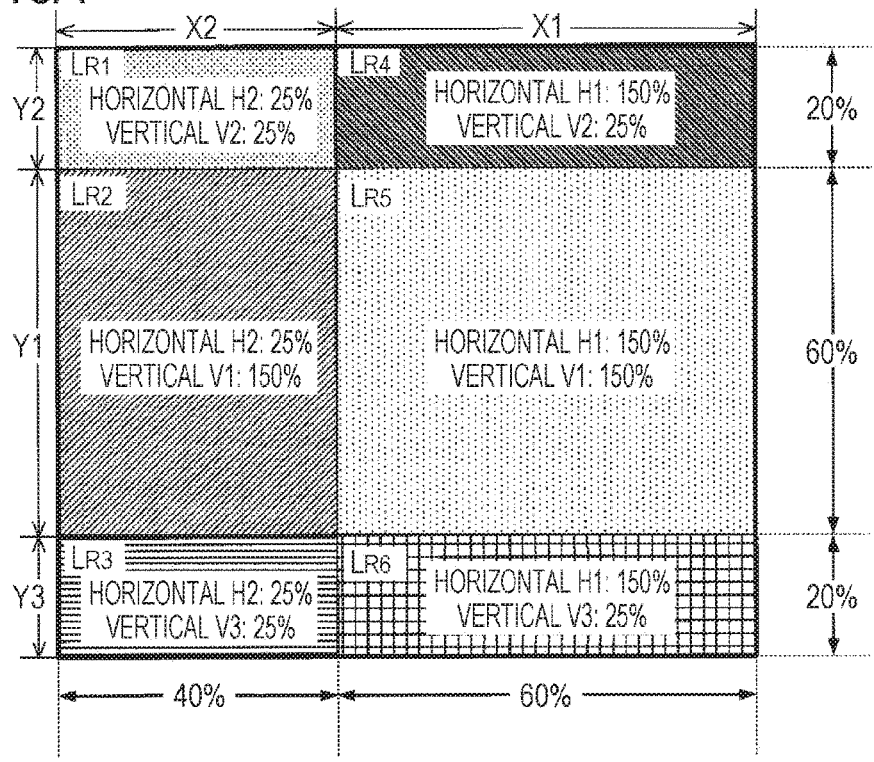
FIG. 16A is an explanatory diagram for describing a minification and magnification process.

FIG. 16A is a conceptual diagram of the magnification and minification process of the image according to the present embodiment. In this drawing, the minification and magnification process of the left-image image processing unit 21L of the partial image processing unit 21J (21L, 21C, or 21R) will be described as an example.

As shown in this drawing, in the magnification and minification process of the left-image image processing unit 21L, the image indicated by the partial image signals DF-L output from the mirror image generation unit 219L is divided into six areas including an upper left area LR1, a left center area LR2, a lower left area LR3, an upper center area LR4, a center area LR5, and a lower center area LR6. In the left and right direction (horizontal direction) of the image indicated by the partial image signals DF-L, a length ratio between a left area (an area far away from a vehicle body) and a center area (an area close to the vehicle body) is "2:3", and in the up and down direction (vertical direction), a length ratio between an upper area, a center area, and a lower area is "1:3:1".

A predetermined horizontal-direction variable magnification (a magnification ratio or a minification ratio in the left and right direction) and a predetermined vertical-direction variable magnification (a magnification ratio or a minification ratio in the up and down direction) are previously set to each area shown in FIG. 16A.

Since an image present in the area LRC (FIG. 2) of the image reflected on the wing mirror, which is close to the vehicle body, shows that there is a high risk that the subject will collide with the vehicle, such information is information required to safely drive the vehicle. In contrast, an image present in the area LRL far away from the vehicle body, for example, an image such as a roadside building has low importance in checking the safety. Thus, in the present embodiment, the magnification ratio or the minification ratio in the left and right direction is set such that the area LRC close to the vehicle body in the left and right direction is relatively further magnified than the area LRL far away from the vehicle body. An image such as another vehicle or a pedestrian of the images based on the imaging signals DS-J is information required to safely drive the vehicle, but an image of the scenery such as sky or mountain present in the upper area of the image or an image of a road surface in the lower area of the image has low importance. Thus, in the present embodiment, the magnification ratio or the minification ratio in the up and down direction is set such that the center area in the up and down direction is relatively further magnified than the upper area or lower area.

Specifically, in the minification and magnification process in the left-image image processing unit 21L, a minification ratio H2 in the left and right direction and minification ratios V2 and V3 in the up and down direction are set as 25% to the upper left area LR1 and the lower left area LR3 which are far away from the vehicle α and are upper or lower areas, as shown in FIG. 16A.

The minification ratio H2 in the left and right direction and the magnification ratio V1 in the up and down direction are respectively set as 25% and 150% to the left center area LR2 which is far away from the vehicle α but is the center area in the up and down direction. A magnification ratio H1 in the left and right direction and the minification ratios V2 and V3 in the up and down direction are respectively set as of 150% and 25% to the upper center area LR4 and the lower center area LR6 which are close to the vehicle α but are the upper or lower area. The magnification ratio H1 in the left and right direction and the magnification ratio V1 in the up and down direction are set as 150% to the center area LR5 which is close to the vehicle α and is the center area in the up and down direction. By setting the ratios in this manner, it is possible to improve visual perceptibility of a required area by the safety check when the vehicle α is driven, among the image based on the imaging signals DS-L. For example, it is possible to further improve visual perceptibility of the area which is closer to the vehicle α and is the center in the up and down direction without requiring a physical machining process than that in the configuration in which a plane-surface portion and a convex-surface portion are formed on the mirror surface of the wing mirror and the mirror image reflected on the convex-surface portion is contracted.

The minification and magnification process performed by the right-image image processing unit 21R and the minification and magnification process performed by the left-image image processing unit 21L shown in FIG. 16A are the same except that the image is reversed in the left and right direction.

That is, in the minification and magnification processes of the left-image image processing unit 21L and the right-image image processing unit 21R, the magnification ratio H1 of the area close to the vehicle α in the left and right direction and the minification ratio H2 of the area far away from the vehicle α in the left and right direction are determined so as to be "X1+X2=X1·H1+X2·H2" when a length of the area close to the vehicle α in the left and right direction is set as X1 and a length of the area far away from the vehicle α in the left and right direction is set as X2.

In the minification and magnification processes of the left-image image processing unit 21L and the right-image image processing unit 21R, the magnification ratio V1 of the center area, the minification ratio V2 of the upper area, and the minification ratio V3 of the lower area in the up and down direction are set so as to be "Y1+Y2+Y3=Y1·V1+Y2·V2+Y3·V3" when a length of the center area in the up and down direction is set as Y1, a length of the upper area in the up and down direction is set as Y2, and a length of the lower area in the up and down direction is set as Y3.

By setting the magnification ratios and the minification ratios in this manner, it is possible to generate the partial image signals D-L and D-R of which the size ratio between the respective areas without changing the size (the number of pixels) of the image itself indicated by the partial image signals DF-L and DF-R. In other words, even in a case where the minification and magnification process is performed, the partial image signals D-L and D-R can be equal to the number of pixels of the display areas AD-L and AD-R.

Figure 16B:
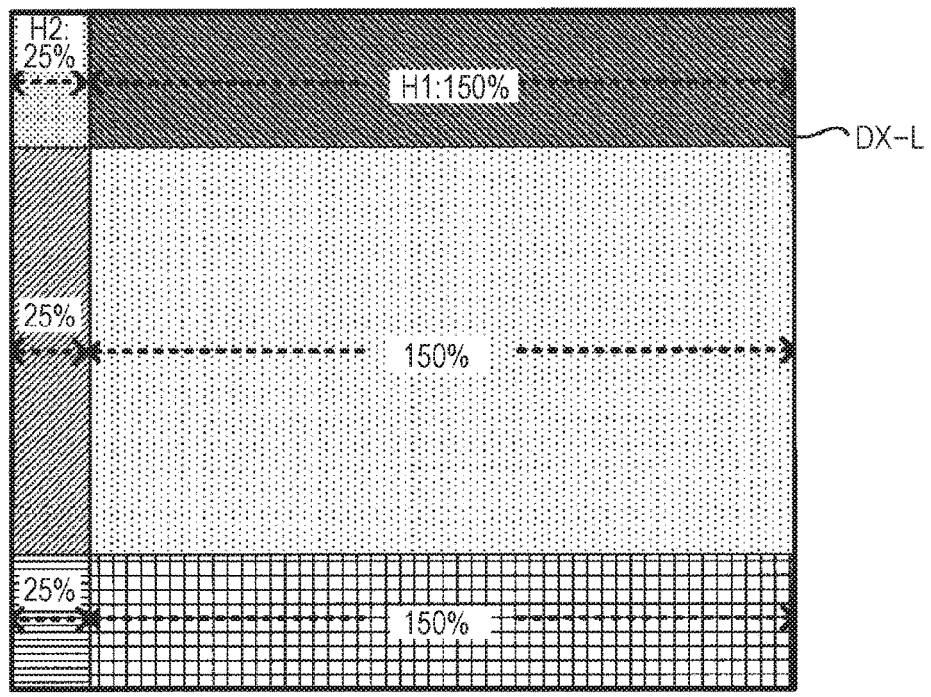
FIG. 16B is an explanatory diagram for describing a horizontal-direction minification and magnification process.
Figure 16C:
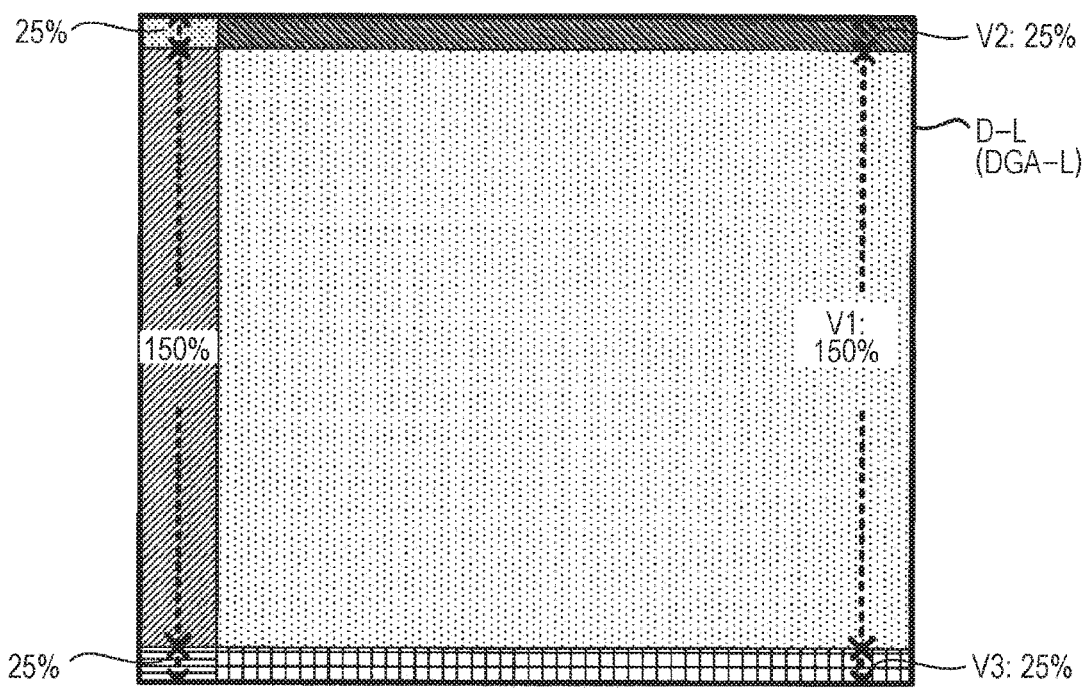
FIG. 16C is an explanatory diagram for describing a vertical-direction minification and magnification process.

FIG. 16B is a conceptual diagram for describing the horizontal-direction minification and magnification process performed by the horizontal-direction minification and magnification process unit 220L of the left-image image processing unit 21L, and FIG. 16C is a conceptual diagram for describing the vertical-direction minification and magnification process performed by the vertical-direction minification and magnification process unit 221L.

The horizontal-direction minification and magnification process unit 220L performs the process (horizontal-direction minification and magnification process) of relatively further magnifying the area close to the vehicle body in the left and right direction than the area far away from the vehicle body on the partial image signal DF-L output from the mirror image generation unit 219L. Specifically, a magnification varying process depending on the set magnification ratio H1 or minification ratio H2 is performed on the image of the areas LR1 to LR6. This magnification varying process is a process performed on every one line. For example, in a case where the number of pixels in one line is 100 (that is, 100 columns), a process of minifying pixels from a first column to a fortieth column belonging to the upper left area LR1, the left center area LR2, and the lower left area LR3 with the minification ratio H2 (25%) is performed. That is, a process of decreasing the number of pixels from 40 up to 10 is performed. For example, as the minification process, a known method of calculating arithmetic mean of the values indicated by the detection signals output from the light receiving elements for a predetermined number of adjacent pixels is arbitrarily adopted. A process of magnifying the pixels from a forty-first column to a hundredth column belonging to the upper center area LR4, the center area LR5, and the lower center area LR6 with the magnification ratio H1 (150%) is performed. That is, a process of increasing the number of pixels from 60 up to 90 is performed. As the magnification process, a known method such as nearest-neighbor interpolation is arbitrarily adopted. If the horizontal-direction minification and magnification process is performed on all the lines, the image (image indicated by the partial image signal DX-L) of which the size ratio of the image in the respective LR1 to LR6 is changed as shown in FIG. 16B is generated.

The vertical-direction reduction and magnification process unit 221L performs the process (vertical-direction minification and magnification process) of relatively further magnifying the center area in the up and down direction than the upper or lower area on the partial image signals DX-L output for every line from the horizontal-direction minification and magnification process unit 220L. Specifically, a magnification varying process depending on the set magnification ratio V1, minification ratio V2, or minification ratio V3 is performed on the image of the respective areas LR1 to LR6. This magnification varying process is a process performed for every plurality of lines. For example, in a case where the number of lines of the partial image signals DX-L is 100 rows, a process of thinning as many lines as the number depending on the minification ratio V2 (25%) out of the lines of a first row to a twentieth line belonging to the upper left area LR1 and the upper center area LR4 is performed. That is, a process of thinning one line out of four lines is performed. A process of magnifying the pixels from a twentieth-first row to an eightieth row belonging to the left center area LR2 and the center area LR5 with the magnification ratio V1 (150%) is performed. A process of thinning as many lines as the number depending on the minification ratio V3 (25%) out of the lines of an eightieth-first row to a hundredth row belonging to the lower left area LR3 and the lower center area LR6 is performed. If the vertical-direction minification and magnification process is performed on all the lines, an image (image indicated by the partial image signals D-L) of which the size ratio of the image in the respective areas LR1 to LR6 is changed as shown in FIG. 16C is generated.

Figure 17:
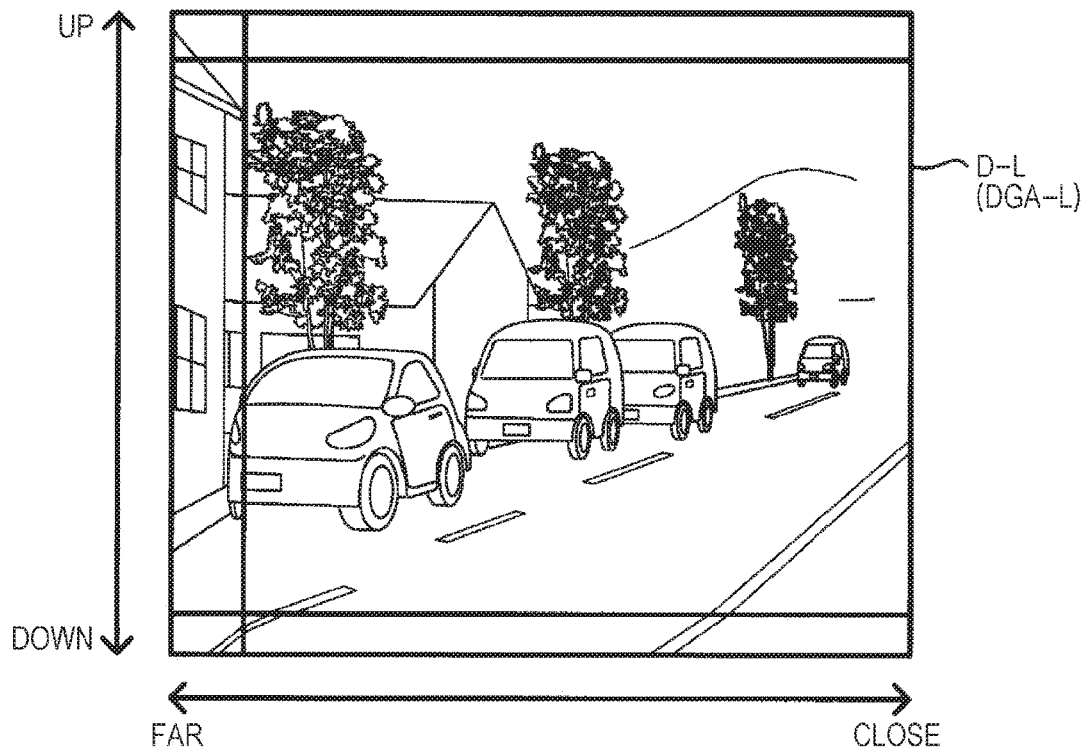
FIG. 17 is a diagram showing an example of an image after the minification and magnification process.

FIG. 17 shows an example of the image indicated by the partial image signals D-L on which the horizontal-direction minification and magnification process and the vertical-direction minification and magnification process have been performed. The image indicated by the partial image signals D-L shown in this drawing is displayed in the left display area AD-L, and then is magnified and displayed in the magnification display area Area-L (see FIG. 3A or 3B). That is, an image of which the area which is close to the vehicle body in the left and right direction and is the center in the up and down direction is relatively further magnified than another area is displayed in the magnification display area Area-L.

Figure 18:
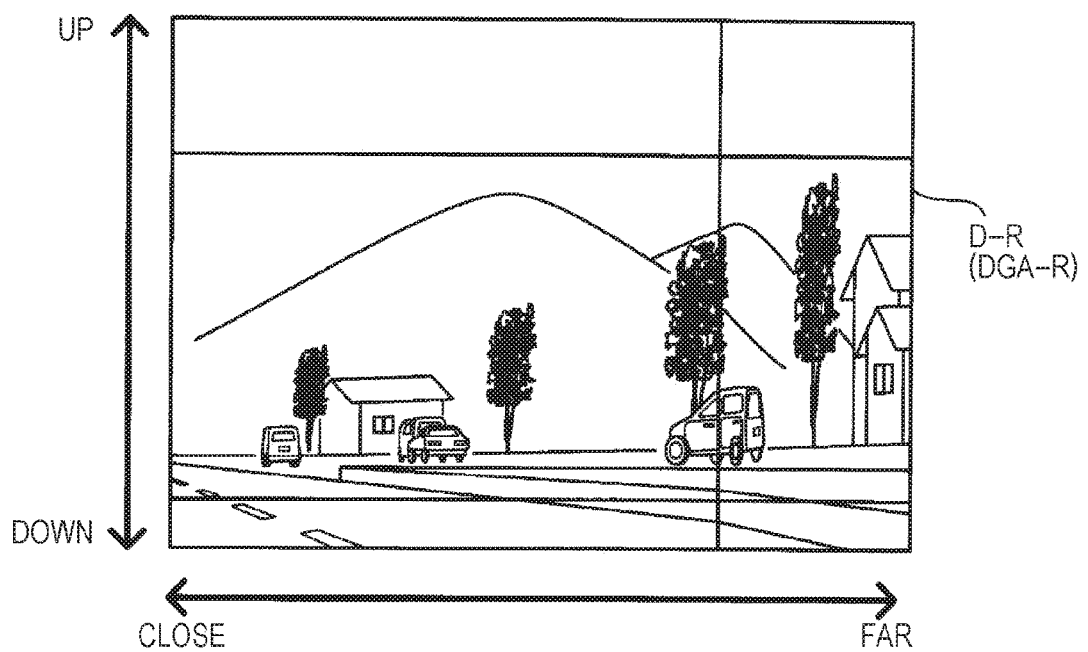
FIG. 18 is a diagram showing an example of the image after the minification and magnification process.

FIG. 18 shows an example of the image indicated by the partial image signals D-R on which the horizontal-direction minification and magnification process and the vertical-direction minification and magnification process have been performed. The image indicated by the partial image signals D-R shown in this drawing is displayed in the right display in the right display area AD-R, and then is magnified and displayed in the magnification display area Area-R (see FIG. 3A or 3B). That is, an image of which the area which is close to the vehicle body in the left and right direction and is the center in the up and down direction is relatively further magnified than another area is displayed in the magnification display area Area-R. As shown in FIG. 18, in the image indicated by the partial image signals D-R magnified and displayed in the magnification display area Area-R, the area RRC (see FIG. 2) close to the vehicle body in the left and right direction is further magnified than the area RRR far away from the vehicle body, and the center area in the up and down direction is magnified.

Hereinafter, the minification and magnification processes (horizontal-direction minification and magnification process and the vertical-direction minification and magnification process) of the center-image image processing unit 21C will be described.

The minification and magnification process of the center-image image processing unit 21C is different from the minification and magnification processes of the left-image image processing unit 21L and the right-image image processing unit 21R in a classification aspect when the partial image signals DT-J are classified according to a plurality of areas and minification and magnification ratios of the classified respective areas.

Figure 19:
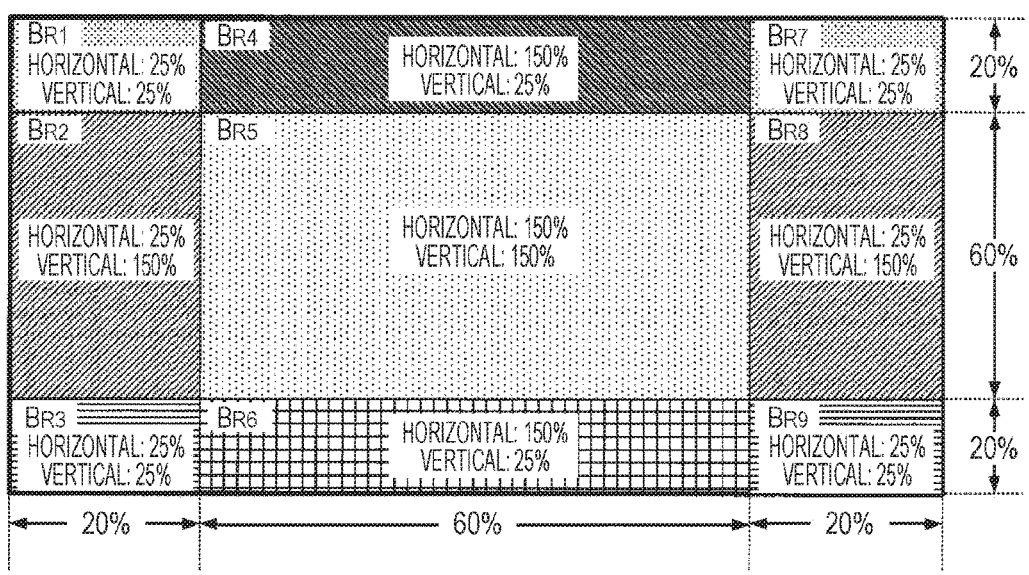
FIG. 19 is an explanatory diagram for describing the minification and magnification process.

FIG. 19 is a conceptual diagram of the minification and magnification process of the center-image image processing unit 21C. As shown in this drawing, in the minification and magnification process of the center-image image processing unit 21C, the image of the partial image signals DF-C output from the mirror image generation unit 219C is classified into nine areas including an upper left area BR1, a left center area BR2, a lower left area BR3, an upper center area BR4, a center area BR5, a lower center area BR6, an upper right area BR7, a right center area BRB, and a lower right area BR9. In the example shown in this drawing, in the left and right direction of the image indicated by the partial image signals DF-C, a length ratio between a left area BRL (see FIG. 2), a center area BRC, and a right area BRR is "1:3:1", and in the up and down direction, a length ratio between the upper area, the center area, and the lower area is "1:3:1".

A predetermined horizontal-direction variable magnification (a magnification ratio or a minification ratio in the left and right direction) and a predetermined horizontal-direction variable magnification (a magnification ratio or a minification ratio in the up and down direction) are previously set to the respective areas shown in FIG. 19. Specifically, the minification ratio in the left and right direction and the minification ratio in the up and down direction are set as 25% to the upper left area BR1, the lower left area BR3, the upper right area BR7, and the lower right area BR9 in any direction of the left and right direction and the up and down direction, as shown in FIG. 19. The minification ratio in the left and right direction and the magnification ratio in the up and down direction are respectively set as 25% and 150% to the left center area BR2 and the right center area BR8 which are the end areas in the left and right direction but are the center areas in the up and down direction. The magnification ratio in the left and right direction and the minification ratio in the up and down direction are respective set as 150% and 25% to the upper center area BR4 and the lower center area BR6 which are the center areas in the left and right direction but are an upper or lower area. The magnification ratio in the left and right direction and the magnification ratio in the up and down direction are set as 150% to the center area BR5 which is the center area in any direction of the left and right direction and the up and down direction.

By setting the ratios in this manner, it is possible to improve visual perceptibility of a required area by the safety check when the vehicle is driven, among the image based on the imaging signals DS-C. For example, it is possible to further improve visual perceptibility of the area which is the center in the up and down direction and the up and down direction without requiring a physical machining process than that in the configuration in which a plane-surface portion and a convex-surface portion are formed on the mirror surface of the rear-view mirror and the mirror image reflected on the convex-surface portion is contracted.

The image indicated by the partial image signals D-C generated in this manner is displayed in the center display area AD-C, and then is magnified and displayed in the magnification display area Area-L (see FIG. 3A or 3B).

If the horizontal-direction minification and magnification process for generating the partial image signals D-J[m] is completed, the horizontal-direction minification and magnification process unit 221J stores the generated partial image signals D-J[m] (partial image signals DGA-J[m]) in the line buffer 22, and outputs the partial writing-completion signal PtA-J indicating that the storing of the partial image signals D-J[m] in the line buffer 22.

<3. Relationship Between Imaging Signal and Image Signal>

Hereinafter, the relationship between the imaging signal DS and the image signal D, particularly, the relationship between the output (supply) timing of the imaging signal DS to the image signal generation unit 20 from the imaging unit 10 and the output timing of the image signal D from the image signal generation unit 20 will be described.

The imaging signal DS-J[pJ] required to generate the image signal D[m] as the assumption for describing the relationship between the imaging signal DS (imaging signal DS-J[pJ]) and the image signal D (image signal D[m]) will be initially described.

As can be apparent from the aforementioned description, in the image processing performed by the partial image processing unit 21J, the number of lines of the imaging signal DS-J required to generate the partial image signal D-J[m] is changed depending on the position (value of m) of the line corresponding to the partial image signal D-J[m].

For example, the number of lines of the imaging signals DS-J required when the resizing process unit 217J of the partial image processing unit 21J generates the partial image signal DRS-J[m] by the resizing process including the distortion correction process is changed depending on the position (value of m) of the line corresponding to the partial image signal DRS-J[m]. In the example shown in FIG. 14, the imaging signals DS-J required to generate the partial image signal DRS-J[1] are as many imaging signals DS-J[pJ] as five lines of the imaging signals DS-J[1] to DS-J[5], the imaging signals DS-J required to generate the partial image signal DRS-J[7] are as many imaging signals DS-J[pJ] as three lines of the imaging signals DS-J[8] to DS-J[10], and the imaging signals DS-J required to generate the partial image signals DRS-J[12] are as many imaging signals DS-J[pJ] as five lines of the imaging signals DS-J[12] to DS-J[16].

For example, the number of lines of the partial image signals DX-J required when the vertical-direction minification and magnification process unit 221J generates the partial image signals D-J[m] by the vertical-direction minification and magnification process is changed depending on the position (value of m) of the line corresponding to the partial image signal D-J[m].

Thus, the time necessary for the partial image processing unit 21J to perform the image processing performed to generate the partial image signals D-J[m] is changed depending on the position (value of m) of the line corresponding to the partial image signal D-J[m].

Hereinafter, for the sake of convenience in the description, all the imaging signals DS-J[pJ] required to generate the partial image signals D-J[m] are referred to as imaging signals DGS-J[m].

Figure 20:
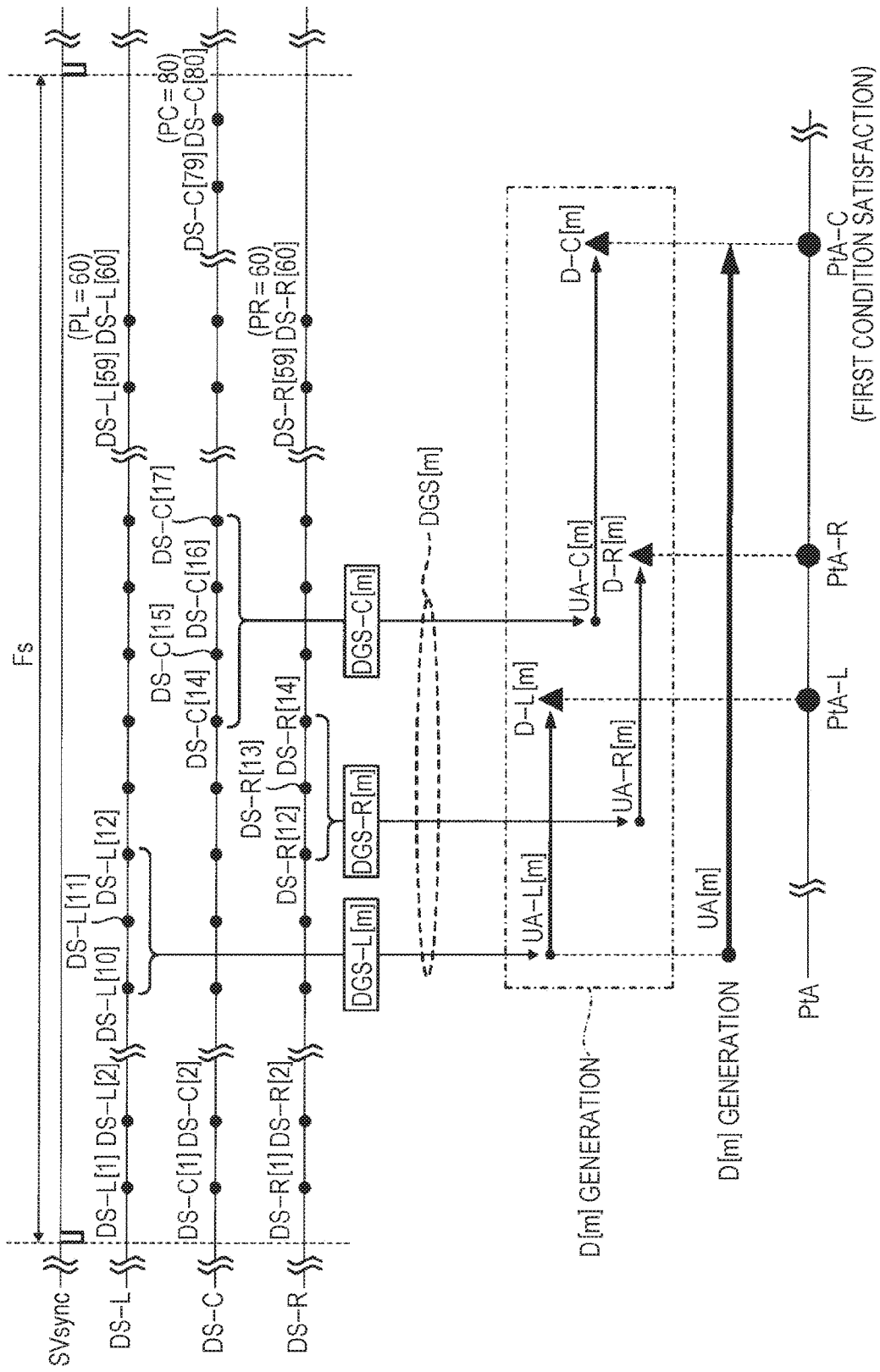
FIG. 20 is a timing chart for describing the relationship between image signal D[m] and an imaging signal DS-J[pJ].

FIG. 20 is a schematic timing chart showing the relationship between the image signal D[m] and the partial image signal D-J[m] and the image signal and the imaging signal DS-J[pJ]. As shown in this drawing, in a case where the imaging signals DS-L[pL] of the imaging signals DS-L[1] to DS-L[60] (in this drawing, "PL=60 lines") which are used to generate the partial image signal D-L[m] are the imaging signals DS-L[10] to DS-L[12], the imaging signals DS-L[10] to DS-L[12] are referred to as imaging signals DGS-L[m]. Similarly, in a case where the imaging signals DS-C[pC] of the imaging signals DS-C[1] to DS-C[80] (in this drawing, "PC=80 lines") which are used to generate the partial image signals D-C[m] are the imaging signals DS-C[14] to DS-C[17], the imaging signals DS-C[14] to DS-C[17] are referred to as imaging signals DGS-C[m]. Similarly, the imaging signals DS-R[pR] of the imaging signals DS-R[1] to DS-R[60] (in this drawing, "PR=60 lines") which are use to generate the partial image signals D-R[m] are the imaging signals DS-R[12] to DS-R[14], the imaging signals DS-R[12] to DS-R[14] are referred to as imaging signals DGS-R[m].

The signals which are required to generate the image signals D[m] and include the imaging signals DGS-L[m], the imaging signals DGS-C[m], and the imaging signals DGS-R[m] are referred to as the imaging signals DGS[m].

For example, in the example shown in FIG. 20, all the imaging signals DS-J[pJ] used to the image signals D[m], that is, the imaging signals DGS-L[m] including the imaging signals DS-L[10] to DS-L[12], the imaging signals DGS-C[m] including the imaging signals DS-C[14] to DS-C[17], and the imaging signals DGS-R[m] including the imaging signals DS-R[12] to DS-R[14] are referred to as the imaging signals DGS[m].

As shown in FIG. 20, a time necessary to perform the image processing for generating the image signals D[m] is referred to an image processing time UA[m], and a time necessary to perform the image processing for generating the partial image signals D-J[m] is referred to as a partial image processing time UA-J[m].

As mentioned above, in the partial image processing unit 21J, the partial image processing time UA-J[m] is changed depending on the position (value of m) of the line corresponding to the partial image signal D-J[m]. The image signals D[m] include the partial image signals D-L[m], D-C[m], and D-R[m]. Thus, the image processing time UA[m] is changed depending on the position (value of m) of the line corresponding to the image signal D[m].

If the supply of the imaging signals DGS[m] from the imaging unit 10 is started, the image processing unit 21 performs the image processing on the imaging signals DGS[m]. The image processing unit 21 completes the image processing after the image processing unit UA[m], and generates the image signals D[m].

More specifically, as shown in FIG. 20, the left-image image processing unit 21L of the image processing unit 21 performs the image processing on the imaging signals DGS-L[m] supplied from the rear-left image sensor 12L, generates the partial image signals D-L[m] after the partial image processing time UA-L[m], and outputs the partial writing-completion signals PtA-L. The center-image image processing unit 21C of the image processing unit 21 performs the image processing on the imaging signals DGS-C[m] supplied from the rear-center image sensor 12C, generates the partial image signals D-C[m] after the partial image processing time UA-C[m], and outputs the partial writing-completion signals PtA-C. The right-image image processing unit 21R of the image processing unit 21 performs the image processing on the imaging signals DGS-R[m] supplied from the rear-right image sensor 12R, generates the partial image signals D-R[m] after the partial image processing time UA-R[m], and outputs the partial writing-completion signals PtA-R.

For example, various signals such as the imaging signals DS-J[pJ] are continuously output over some periods of the imaging horizontal synchronization signals SHsync, but periods during which various signals are output are depicted by circles in FIG. 20 (and the subsequent drawings).

Hereinafter, the relationship between the output (supply) timing of the imaging signal DS to the image signal generation unit 20 from the imaging unit 10 and the output timing of the image signal D from the image signal generation unit 20 will be described with reference to FIGS. 21 and 22.

Figure 21:
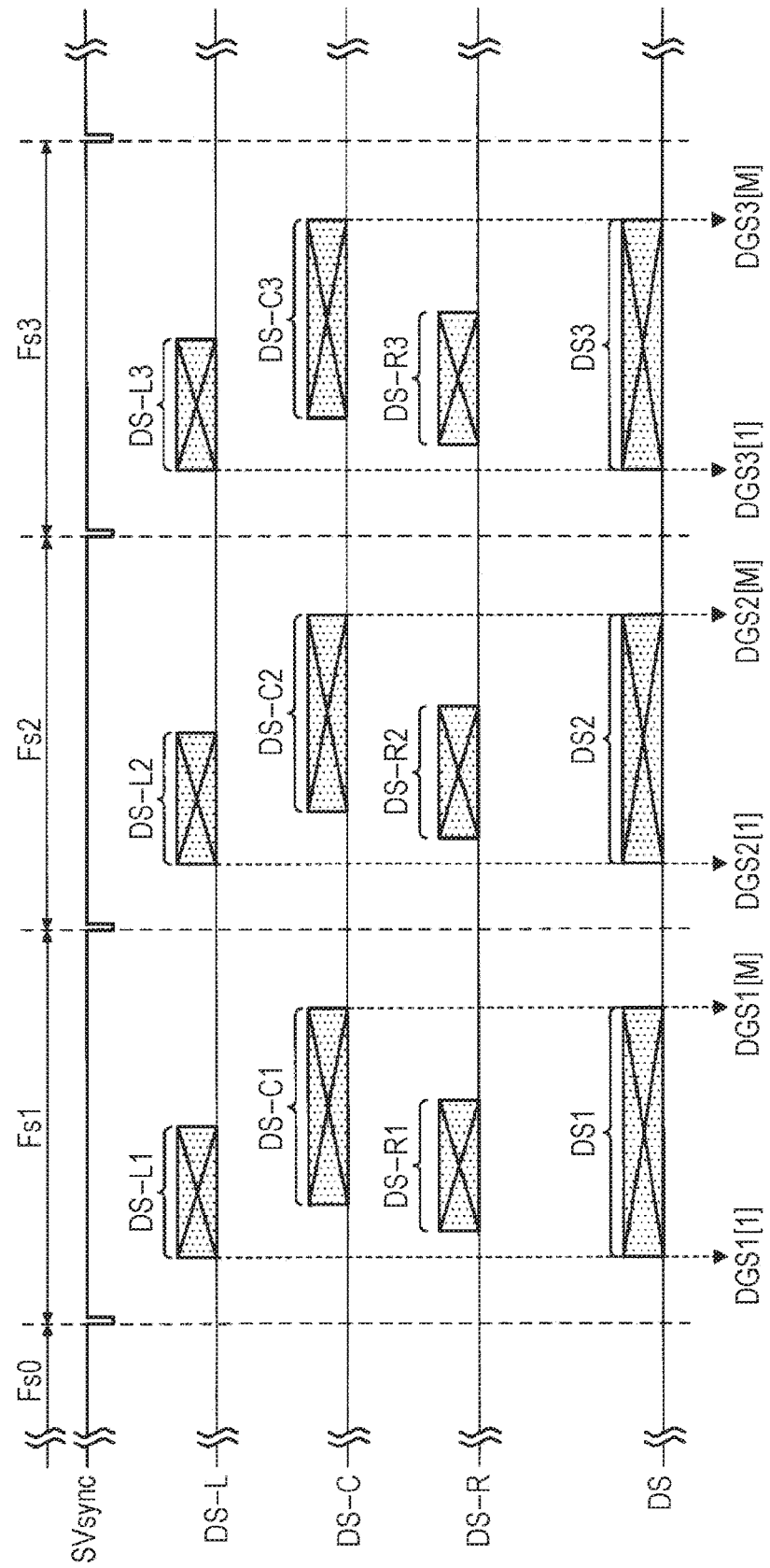
FIG. 21 is a timing chart for describing an output timing of the imaging signal DS.

FIG. 21 is a schematic timing chart showing timings when the imaging unit 10 outputs (supplies) the imaging signals DS (imaging signals DS-J[1] to DS-J[pJ]) to the image signal generation unit 20 during the imaging vertical scanning periods Fs1 to Fs3 of the plurality of continuous imaging vertical scanning periods Fs (Fs0 to Fs3).

As mentioned above, the rear-left image sensor 12L, the rear-center image sensor 12C, and the rear-right image sensor 12R are operated in synchronization with various timing signals output from the timing generator 13. Thus, the frame rates of the rear-left image sensor 12L, the rear-center image sensor 12C, and the rear-right image sensor 12R are equal to one another.

However, the size of the pixels of the imaging signal DS-J output from each image sensor 12J may be different from one another. The times necessary to transmit the imaging signals DS-J from the respective image sensors 12J to the partial image processing units 21J may be different. Accordingly, the periods during which the imaging signals DS-J are typically output (supplied) from the imaging unit 10 to the image signal generation unit 20 are different for the imaging signals DS-L, DS-C, and DS-R.

Thus, as shown in FIG. 21, the period during which the imaging unit 10 outputs the imaging signals DS, that is, the period during which the imaging unit 10 outputs the imaging signals DGS[1] to DGS[M] is a period from the earliest time of the times when the output (supply) of the imaging signals DS-L, DS-C, and DS-R is started to the latest time of the times when the output (supply) of the imaging signals DS-L, DS-C and DS-R is ended.

Hereinafter, the imaging signals DS (imaging signals DS-J[pJ]) output during the imaging vertical scanning periods Fs0 to Fs3 may be distinguishably described as imaging signals DS0 to DS3 (imaging signals DS-J0[pJ] to DS-J3[pJ]). Similarly, the imaging signals DGS[m] output during the imaging vertical scanning periods Fs0 to Fs3 may be distinguishably described as imaging signals DGS0[$m$] to DGS3[$m$].

Hereinafter, for the sake of convenience in the description, it will be described that the time when the imaging unit 10 outputs the imaging signals DS and the time when the image signal generation unit 20 receives the imaging signals DS are deemed to be the substantially same time without being distinguished.

Figure 22:
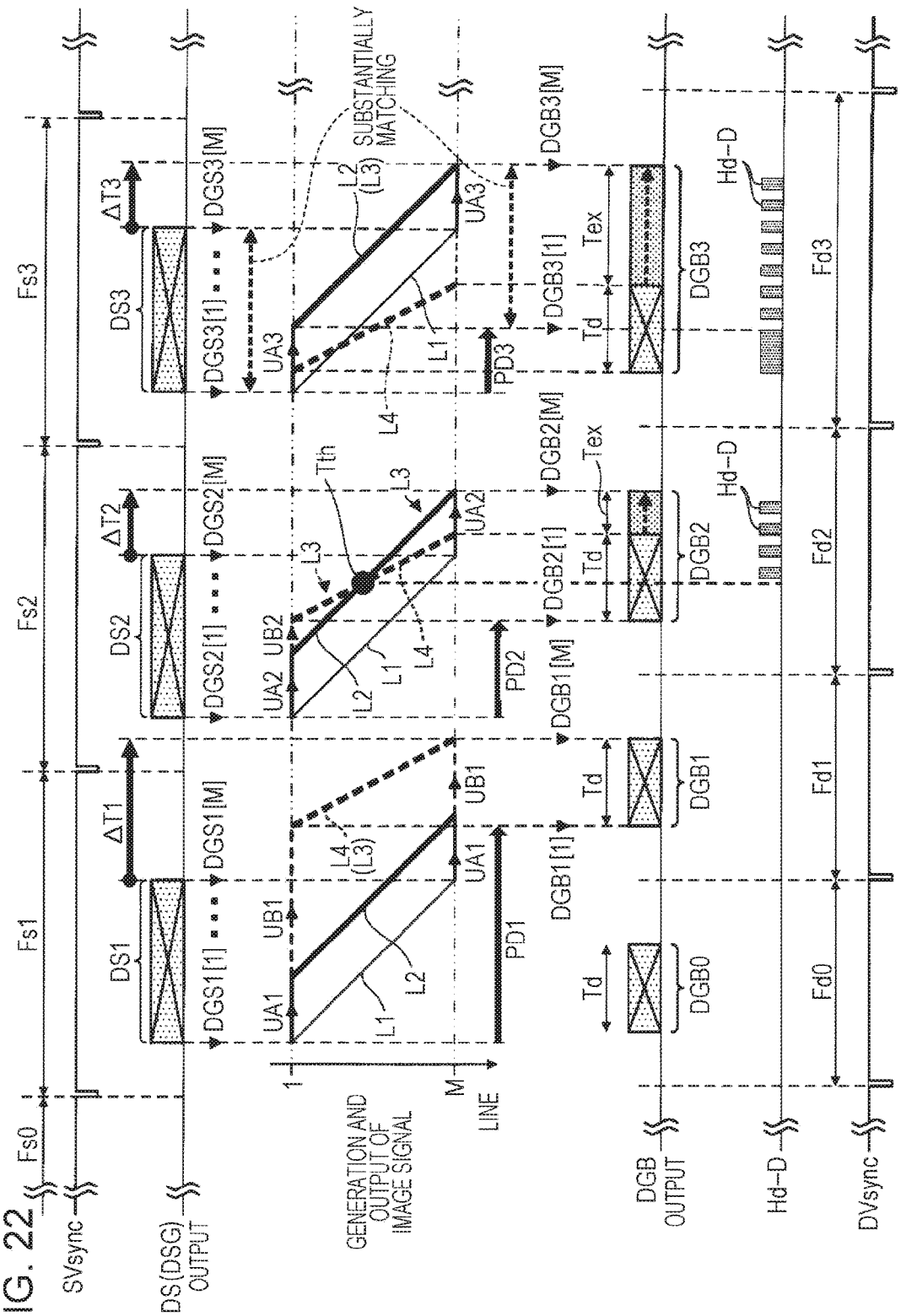
FIG. 22 is a timing chart for describing the operation of the vehicle imaging display apparatus 1.

FIG. 22 is a schematic timing chart showing the relationship between the timing when the image processing unit 21 generates the image signals D (D[1] to D[M]), that is, the image signals DGA (DGA[1] to DGA[M]) and stores the generated image signals DGA in the line buffer 22 based on the imaging signals DS1 to DS3 output by the imaging unit 10 during the imaging vertical scanning periods Fs1 to Fs3 and the timing when the image signal output unit 23 acquires the image signals D (D[1] to D[M]), that is, the image signals DGB (DGB [1] to DGB [M]) from the line buffer 22 and outputs the acquired signals to the display unit 40 during the display vertical scanning periods Fd1 to Fd3 of the plurality of continuous display vertical scanning periods Fd (Fd0 to Fd3).

Hereinafter, the image signals D[m] (DGA[m] or DGB[m]) generated based on the imaging signals DGS0[$m$] to DGS3[$m$] may be distinguishably described as image signals D0[$m$] to D3[$m$] (DGA0[$m$] to DGA3[$m$], or DGB0[$m$] to DGB3[$m$]).

As shown in FIG. 22, the periods during which the imaging signals DS are output, among the imaging vertical scanning periods Fs, are referred to as "frames of the imaging signals DS". The vertical active data periods DVI which are the periods during which the image signals D may be output, among the display vertical scanning periods Fd, are referred to as "frames of the image signals D". As shown in FIG. 22, a time from the starting of the frame of the imaging signal DS to the starting of the frame of the image signal D is referred to as a phase difference PD.

For example, the phase difference PD may be a time from the starting of the frame of the imaging vertical scanning period Fs to the starting of the frame of the display vertical scanning period Fd during which the image signal generation unit 20 outputs the image signal D based on the imaging signal DS output from the imaging unit 10 during the imaging vertical scanning period Fs.

In FIG. 22, the timings when the imaging unit 10 supplies the imaging signals DGS[1] to DGS[M] to the image processing unit 21 are depicted by line L1. That is, the line L1 represents an aspect (timing) in the time direction in which the image processing unit 21 starts the image processing for generating the image signals D[1] to D[M] (image signals DGA([1] to DGA[M]) for every line. Line L2 represents an aspect (timing) in the time direction in which the generation of the image signals DGA[1] to DGA[M] by the image processing unit 21 is completed and the generated image signals are stored in the line buffer 22 for every line. The image signal output unit 23 outputs the image signals DGB[m] after the generation of the image signals DGA[m] is completed. Thus, the image signals DGB[m] are not output at the time earlier than the time depicted by the line L2. The line L2 is a line that connects the image signal generation times TC[1] to TC[M] described in FIG. 10.

The timings when the image signal output unit 23 sequentially reads the image signals DGB[1] to DGB[M] for every line and displays the read signals in a case where the image signal output unit 23 supplies the image signals DGB[1] to DGB[M] to the display unit 40 at an ideal timing, that is, in a case where the image signal output unit supplies the image signals DGB[1] to DGB[M] so as to be displayed at the highest frame rate (frame rate in a case where the time length of the display vertical scanning period Fd is the standard vertical scanning time Td) at which the display unit 40 can display are depicted by line L3.

That is, the line L3 is a line indicating the timing when the display unit 40 sequentially reads the images indicated by the image signals DGB[1] to DGB[M] and displays the read images for every horizontal scanning period Hd in a case where it is assumed that the image signal output unit 23 outputs as many image signals DGB[m] as one line during every horizontal scanning period Hd during which the display unit 40 can display as many of an image as one line (that is, in a case where the frame rate of the display unit 40 is the second frame rate), and has a slope such that one line is increased for every horizontal scanning period Hd. That is, the line L3 indicates the time in a case where it is assumed that all the horizontal scanning periods included in the vertical active data period DVI are the active horizontal scanning periods Hd-A, and is not necessarily equal to the display preparation determination time TB[m] indicating the output time of the image signal D[M] based on the assumption that the output of the image signals D[m−1] in the (m−1)-th row is completed (the second condition) in a case where it is assumed that the inactive horizontal scanning periods Hd-D are included in the vertical active data period DVI.

The image signal output unit 23 outputs the image signals DGB[m] when the display unit 40 can display. Thus, the image signals DGB[m] are not read and output at the time earlier than the time depicted by the line L3.

Hereinafter, the image processing times UA which respectively correspond to the image signals DGA0[m] to DGA3[m] may be distinguishably described as image processing times UA0[m] to UA3[m].

Hereinafter, times from the storing of the image signals DGA[m] in the line buffer 22 to the outputting of the image signals to the display unit 40 by the image signal output unit 23 are referred to as waiting times UB. Hereinafter, for the sake of convenience in the description, the waiting times UB which respectively correspond to the image signals DGB1[m] to DGB3[m] may be distinguishably described as waiting times UB1[m] to UB3[m].

As stated above, in the image processing performed by the partial image processing unit 21J, the number of lines of the imaging signals DS-J required to generate the partial image signals D-J[m] is changed depending on the position (value of m) of the line corresponding to the partial image signal D-J[m]. Thus, starting intervals of the image processing for generating the image signals D[m] corresponding to the respective lines are not typically constant, and are changed. That is, the line L1 is not typically a straight line and is a broken line. In FIG. 22, the line L1 is drawn as the straight line for the sake of convenience in the illustration. In a case where the line L1 is the straight line (for example, a case where a starting point and an ending point of the line L1 is connected by the straight line), the slope of the line L1 is determined depending on the first frame rate which is the frame rate of the imaging unit 10.

As mentioned above, the image processing time UA[m] required to generate the image signal D[m] is changed depending on the position (value of m) of the line corresponding to the image signal D[m]. Thus, the line L2 is not typically the straight line and is a broken line, but is drawn as the straight line for the sake of convenience in the illustration in FIG. 22.

As shown in FIG. 22, the line L2 indicating the time when the image processing unit 21 generates the image signal D1[m] (DGA1[m]) based on the imaging signal DS1 (DGS1[m]) output from the imaging unit 10 during the imaging vertical scanning period Fs1 temporarily precedes line L4 (a virtual timing different from the definition of the line L3 is described as line L4) indicating the earliest time when the display unit 40 can display the image indicated by the image signal D1[m] (DGA1[m]) during the display vertical scanning period Fd1. A state in which the line L2 temporally precedes the line L3 (line L4) is referred to as a "first state".

That is, the first state is a state in which the display unit 40 is not prepared to display the image indicated by the image signals D[m] when the image processing unit 21 generates the image signals D[m] based on the imaging signals DS. Here, for example, the case where the display unit 40 is not prepared to display the image signals D[m] is a case where the display unit 40 is displaying the image indicated by the image signals D1[m−1] to be displayed before the image signal D1[m] and the display unit 40 does not display the image indicated by the image signal D1[m] when the image signal D1[m] is generated.

That is, the first state is a state in which even though the image processing unit 21 generates the image signal D[m], since the preparation of the display unit 40 for displaying the image signal D[m] is not in time, the display of the image on the display unit 40 is delayed due to a bottleneck phenomenon occurring in the display preparation of the display unit 40. In other words, the first state is a state in which the image signal D[m] can be promptly displayed without being delayed at the timing when the display unit 40 can display the image signal DNA.

Incidentally, since a time (cycle) necessary for the display unit 40 to display one screen is less than a time (cycle) necessary for the imaging unit 10 to image one screen, a display delay due to the bottleneck phenomenon occurring in the display preparation of the display unit 40 is slowly reduced and resolved.

In FIG. 22, for the sake of convenience in the illustration, only one pair of vertical scanning periods including one imaging vertical scanning period Fs (Fs1) and one display vertical scanning period Fd (Fd1) is described as the first state, but there may be a plurality of pairs of vertical scanning periods. In this case, in the first state, a phase difference PD1 (is a phase difference PD in the first state, and is assigned reference sign PD1 as shown in FIG. 22) is shortened by a time equivalent to a difference between the display vertical scanning period Fd and the imaging vertical scanning period Fs. In other words, a distance between the line L3 and the line L2 for each pair of vertical scanning periods is roughly shortened by the time equivalent to the difference between the display vertical scanning period Fd and the imaging vertical scanning period Fs.

Before the display delay due to the bottleneck phenomenon occurring in the display preparation of the display unit 40 is resolved, the line L2 temporally precedes the line L3 (line L4). Meanwhile, in a case where the display delay due to the bottleneck phenomenon occurring in the display preparation is resolved, the display delay is not actually resolved, but it is assumed that the line L4 indicating the earliest time when the display unit 40 can display the image may be a timing that temporally precedes the line L2 as a virtual state. That is, in the virtual state, it can be seen that the timing when the display delay due to the bottleneck phenomenon occurring in the display preparation is resolved may be a timing when the line L2 and the line L4 cross each other in the fastest state in the virtual state.

As stated above, the line L2 may not be a straight line, and may be a broken line. In this case, it can be seen that the line L2 and the virtual line L4 may cross multiple times.

In the example shown in FIG. 22, the line L2 indicating the time when the image processing unit 21 generates the image signal D2[m] (DGA2[m]) based on the imaging signal DS2 (DGS2[m]) output from the imaging unit 10 during the imaging vertical scanning period Fs2 crosses the line L4 indicating the earliest time when the display unit 40 can display the image indicated by the image signal D2[m] (DGA2[m]) during the display vertical scanning period Fd2. Such a state in which the line L2 and the line L4 cross is referred to as a "second state". In a case where the line L2 and the line L4 cross multiple times, a state in which these lines initially cross is referred to as the "second state". The time when the line L2 and the line L4 cross is referred to as a time Tth. In a case where the line L2 and the line L4 cross multiple times, it is assumed that the time when these lines initially cross is the time Tth.

That is, the second state refers to transition from a state (state in which the line L2 temporally precedes the line L3 in general) in which the display unit 40 is not prepared to display the image indicated by the image signal DM when the image processing unit 21 generates the image signal D[m] based on the imaging signal DS to a state (state in which the line L4 temporally precedes the line L2) in which the image processing unit 21 may not complete the image processing for generating the image signal D[m] when the display unit 40 can display the image indicated by the image signal D[m].

That is, the second state is a state in which the image indicated by the image signal D[m] is displayed without being delayed at the timing when the display unit 40 can display the image indicated by the image signal D[m] before the time Tth, and is a state in which even though the time when the display unit 40 can display the image signal D[m] arrives, since the image processing in the image processing unit 21 for generating the image signal D[m] is not in time, the image processing of the image processing unit 21 is in the bottleneck state, and thus, the display of the image of the display unit 40 may be delayed after the time Tth.

In the second state, a phase difference PD2 (is a phase difference PD in the second state, and is assigned reference sign PD2 as shown in FIG. 22) is less than the phase difference PD1 as shown in FIG. 22.

After the time Tth, the timing generator 32 inserts the inactive horizontal scanning period Hd-D into the vertical active data period DVI once, and adjusts the output timing (display timing of the image indicated by the image signal D[m] on the display unit 40) of the image signal D[m] from the image signal output unit 23. Even though the inactive horizontal scanning period Hd-D is inserted once, the image processing of the image processing unit 21 for generating the image signal D[m] is not in time, the insertion of the next inactive horizontal scanning period Hd-D is repeated. The display unit 40 waits for the completion of the image processing for generating the image signal D[m], and displays the image indicated by the image signal D[m] within a time equal to or less than the horizontal scanning period Hd in a case where the image signal D[m] is generated. That is, after the time Tth, the output timing of the image signal D[m] (DGB[m]) from the image signal output unit 23 is adjusted due to the insertion of the inactive horizontal scanning period Hd-D, and thus, the display timing of the display unit 40 follows a completion timing of the image processing of the image processing unit 21 with the precision of the horizontal scanning period Hd.

As shown in FIG. 22, the line L4 indicating the earliest time when the display unit 40 can display the image indicated by the image signal D3[m] (DGA3[m]) during the display vertical scanning period Fd3 temporally precedes the line L2 indicating the time when the image processing unit 21 generates the image signal D3[m] (DGA3[m]) based on the imaging signal DS3 (DGS3[m]) output during the imaging vertical scanning period Fs3. Such a state in which the line L4 temporally precedes the line L2 is referred to as a "third state". As stated above, the line L2 may not be a straight line and may be a broken line, and the line L2 and the line L3 may cross multiple times. In such a case, a state in the pair (Fs and Fd) of vertical scanning periods started after the time Tth is referred to as the third state.

That is, the third state is a state in which the image processing unit 21 may not constantly complete the image processing for generating the image signal D[m] when the display unit 40 completes the preparation to display the image indicated by the image signal D[m].

That is, the third state is a state in which even though the preparation of the display unit 40 for displaying the image signal DM is completed, since the image processing of the image processing unit 21 for generating the image signal D[m] is not constantly in time, the image processing of the image processing unit 21 is in the bottleneck state, and thus, the display of the image of the display unit 40 is delayed.

In the third state, a phase difference PD3 (is a phase difference PD in the third state, and is assigned reference sign PD3 as shown in FIG. 22) is less than the phase difference PD2 as shown in FIG. 22.

The phase difference PD1 in the first state is greater than the image processing time UA (more specifically, the maximum value of the image processing times UA1[1] to UA1[M]), and the phase difference PD3 in the third state is equal to or less than the maximum value of the image processing times UA3[1] to UA3[M].

Even in the third state, the timing generator 32 inserts the inactive horizontal scanning period Hd-D into the vertical active data period DVI, and adjusts the display timing of the image indicated by the image signal D[m] on the display unit 40. Accordingly, the display timing of the display unit 40 can follow the completion timing of the image processing of the image processing unit 21 with the precision of the horizontal scanning period Hd.

As mentioned above, the image processing time UA is changed for every line. However, a changing range is sufficiently smaller than the imaging vertical scanning period Fs. Thus, in a state in which the output timing (display timing of the display unit 40) of the image signal D[m] follows the completion timing of the image processing of the image processing unit 21, a time length of the period during which the imaging unit 10 outputs the imaging signal DS3 is substantially the same as a time length of the period during which the image signal output unit 23 outputs the image signal DGB3. In other words, in the third state, the timing control unit 30 adjusts the timing when the image signal D[m] is output such that the frame rate of the display unit 40 becomes the first frame rate which is the frame rate of the imaging unit 10 (second timing control).

In FIG. 22, for the sake of convenience in the illustration, only one pair of vertical scanning periods including one imaging vertical scanning period Fs (Fs3) and one display vertical scanning period Fd (Fd3) is described as the third state, but there is actually a plurality of pairs of vertical scanning periods. In third state, the timing when the image signal D[m] is output is adjusted in each of the plurality of pairs of vertical scanning periods such that the time length of the period during which the imaging unit 10 outputs the imaging signal DS3 and the time length of the period during which the image signal output unit 23 outputs the image signal DGB3 are substantially the same. That is, in the third state, the timing when the image signal D[m] is output is adjusted in each of the plurality of pairs of vertical scanning periods such that the frame rate of the display unit 40 becomes the first frame rate which is the frame rate of the imaging unit 10. Thus, in the third state, the phase differences PD3 have the substantially same time length in the plurality of pairs of vertical scanning periods.

That is, in a case where the phase difference PD is greater than a predetermined time, the timing control unit 30 slowly reduces the phase difference PD through the first timing control for controlling the timing such that the image signal D is output at the second frame rate, and maintains the phase difference PD in the shortest state through the second timing control for controlling the timing when the image signal D is output at the first frame rate in a case where the phase difference PD is equal to or less than the predetermined time.

In the present embodiment, for example, since the phase difference PD is a time from the starting of the frame of the imaging signal DS to the starting of the frame of the image signal D, the maximum value of the image processing times UA1[1] to UA1[M] may be used as the predetermined time.

As mentioned above, for example, in a case where the phase difference PD is defined as the time from the starting of the frame of the imaging vertical scanning period Fs to the starting of the frame of the display vertical scanning period Fd, the predetermined time may be determined based on the maximum value of the image processing times UA1[1] to UA1[M], the time from the starting of the frame of the imaging vertical scanning period Fs to the starting of the frame of imaging signal DS, and the time from the starting of the frame of the display vertical scanning period Fd to the starting of the frame of the image signal D.

Hereinafter, the first state will be described using the relationship between the imaging signal DS1 (DGS1) output from the imaging unit 10 during the imaging vertical scanning period Fs1 and the image signal D1 (DGB1) output from the image signal generation unit 20 to the display unit 40 during the display vertical scanning period Fd1 an example by referring to FIGS. 22 and 23.

Figure 23:
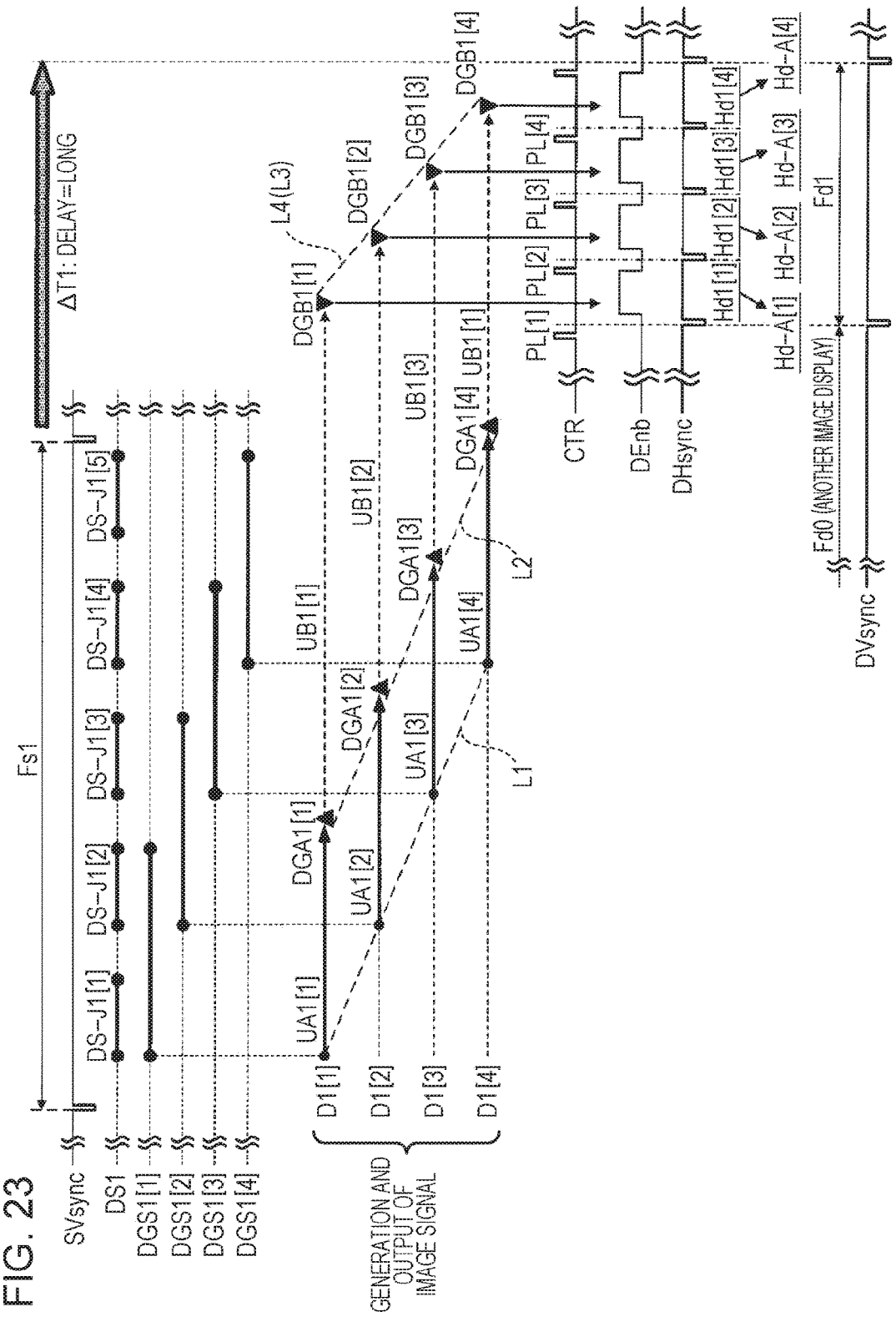
FIG. 23 is a timing chart for describing the operation of the vehicle imaging display apparatus 1.

FIG. 23 is a timing chart for describing the relationship between the imaging signal DS-J1[pJ], the imaging signal DGS1[m], and the image signal D1[m] (image signal DGA1[m] and the image signal DGB1[m]).

Figure 24:
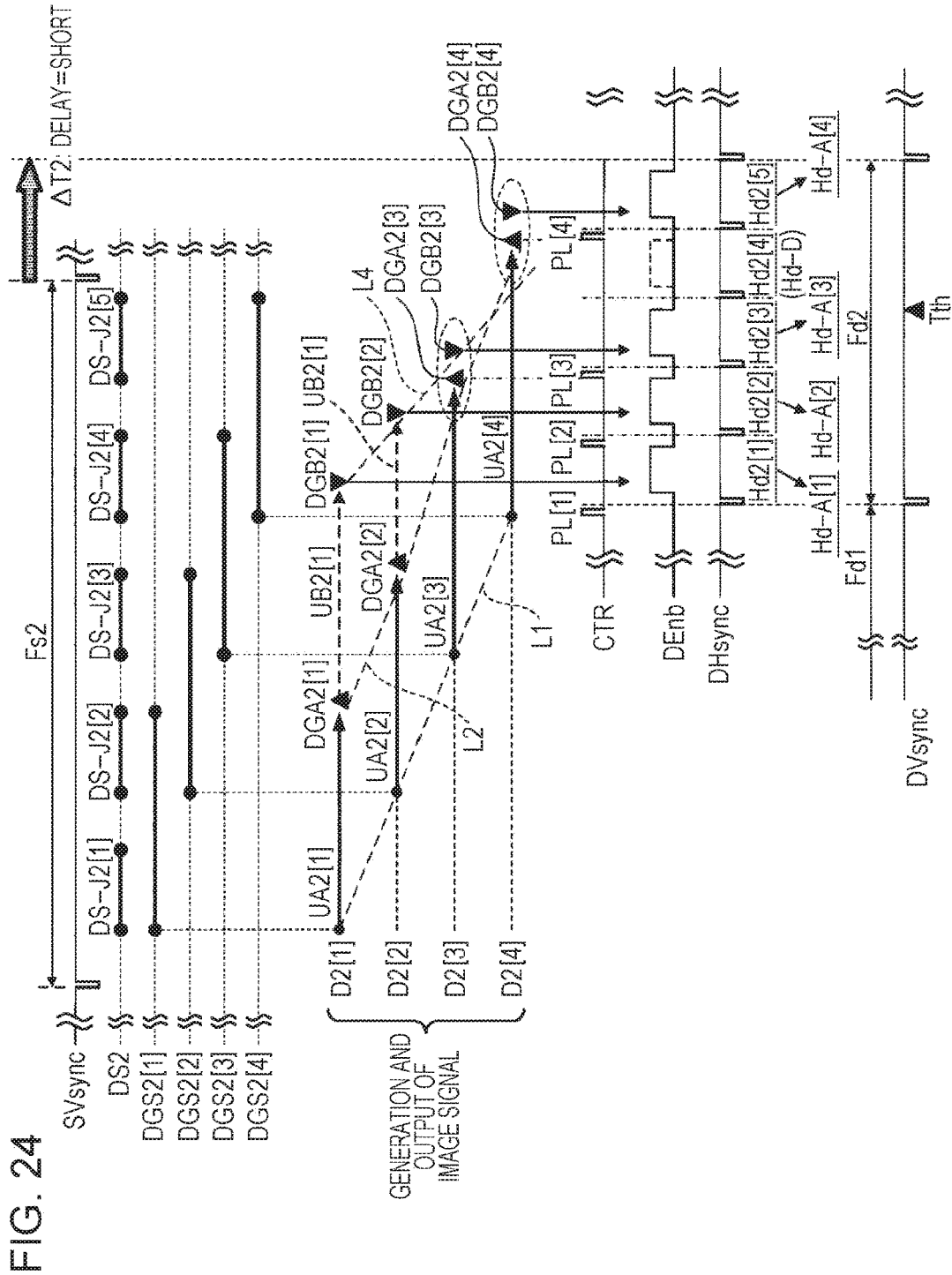
FIG. 24 is a timing chart for describing the operation of the vehicle imaging display apparatus 1.
Figure 25:
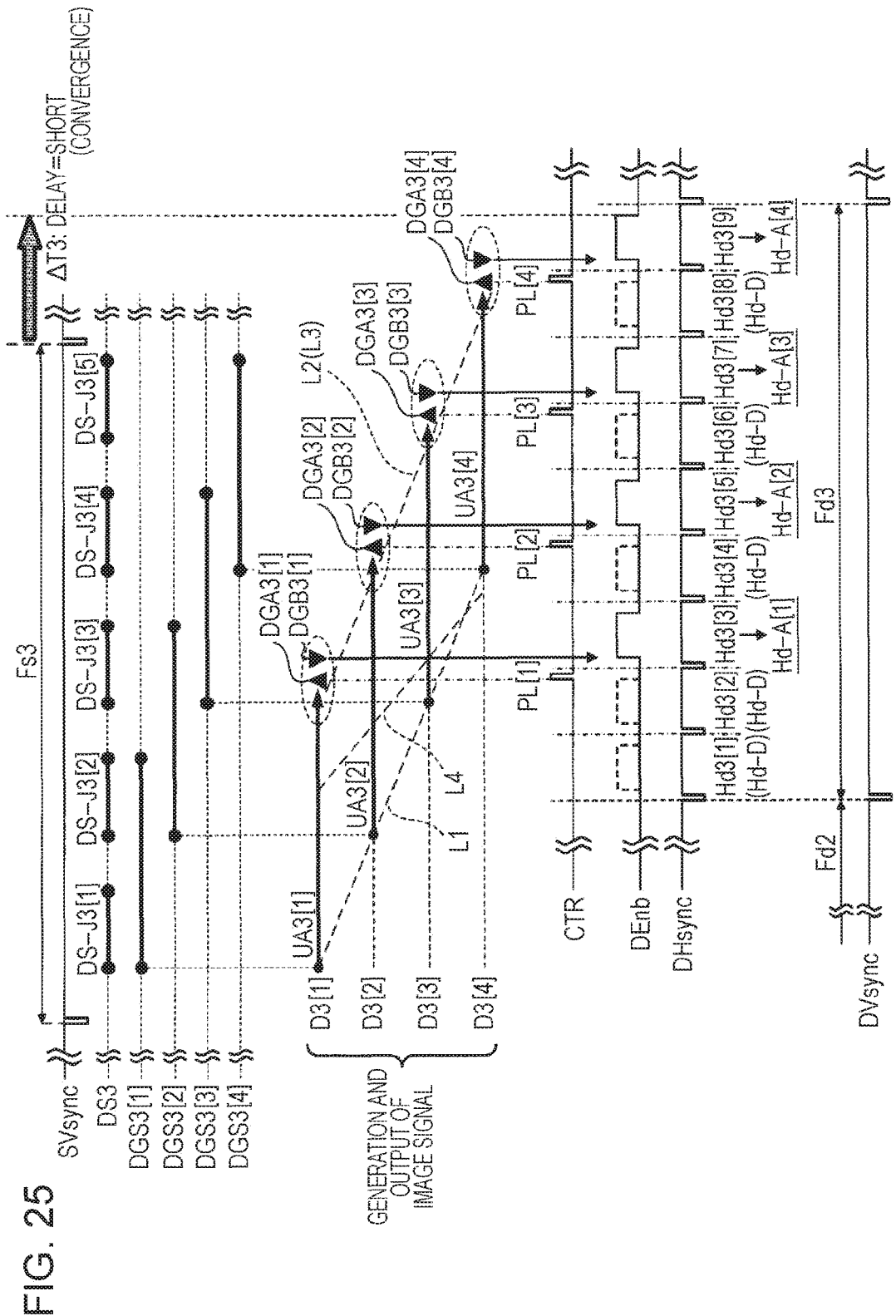
FIG. 25 is a timing chart for describing the operation of the vehicle imaging display apparatus 1.

In FIG. 23 and FIGS. 24 and 25 to be described below, for the sake of convenience in the description, it is assumed that the number of lines of the image indicated by the imaging signal DS is five lines (P=5) and the number of lines of the image indicated by the image signal D is four lines (M=4). In the example shown in FIGS. 23 to 25, for the sake of convenience in the description, the imaging signals DS-L[pL], DS-C[pC], and DS-R[pR] are described as the imaging signals DS-J [pJ] (DS-J1[pJ], DS-J2[pJ], and DS-J3[pJ]) without being distinguished. In the example shown in FIGS. 23 to 25, it is assumed that the imaging signal DGS[1] includes the imaging signals DS-J[1] and DS-J[2], the imaging signal DGS[2] includes the imaging signals DS-J[2] and DS-J[3], the imaging signal DGS[3] includes the imaging signals DS-J[3] and DS-J[4], and the imaging signal DGS[4] includes the imaging signals DS-J[4] and DS-J[5]. That is, in the example shown in FIGS. 23 to 25, it is assumed that the image signal D[1] is generated based on the imaging signals DS-J[1] and DS-J[2], the image signal D[2] is generated based on the imaging signals DS-J[2] and DS-J[3], the image signal D[3] is generated based on the imaging signals DS-J[3] and DS-J[4], and the image signal D[4] is generated based on the imaging signals DS-J[4] and DS-J[5]. In the example shown in FIGS. 23 to 25, it is assumed that the line L2 and the line L3 cross once.

As shown in FIG. 23, if the imaging signals DS-J1[m] and DS-J1[m+1] are output from the imaging unit 10 (the output of the imaging signals DGS1[m] is started for convenience's sake), the image processing unit 21 starts to generate the image signal DGA1[m] based on the imaging signal DGS1[m]. The image processing unit 21 completes the generation of the image signal DGA1[m] after the image processing time UA1[m] elapses from the starting of the image processing, and stores the generated signals in the line buffer 22.

Meanwhile, the example shown in FIG. 23 is a case where the first state is described as the example, and the line L2 temporally precedes the line L3. That is, in the example shown in FIG. 23, the display unit 40 is not prepared to display the image indicated by the image signal DGB1[m] at the timing when the generation of the image signal DGA1[m] by the image processing unit 21 is completed. In other words, the output permission pulse PL[m] is not output from the output control unit 31 at the timing when the generation of the image signal DGA1[m] by the image processing unit 21 is completed.

Thus, the image signal output unit 23 waits for the output of the image signal DGB1[m] by the waiting time UB1[m] until the first horizontal scanning period Hd1[m] after the output permission pulse PL[m] is output, and then outputs the image signal DGB1[m] during the horizontal scanning period Hd1[m].

The first state shown in FIG. 23 is a case where the display preparation of the display unit 40 is not in time before the image processing of the image processing unit 21 is completed. In other words, the generation of the image signal DGA1[m] by the image processing unit 21 is completed before the horizontal scanning period Hd1[m] is started, and the image signal DGB1[m] can be output from the image signal output unit 23. Thus, in the first state shown in FIG. 23, all the horizontal scanning periods Hd included in the vertical active data period DVI of the display vertical scanning period Fd1 are the active horizontal scanning periods Hd-A. That is, in the first state, the time length of the display vertical scanning period Fd is the standard vertical scanning time Td.

As stated above, in the first state shown in FIG. 23, the image processing for generating the image signal D1 is completed with sufficient time to spare, but the display preparation of the display unit 40 is in the bottleneck state, and the display of the display unit 40 is delayed.

Thus, a delay time ΔT1 to when the display unit 40 displays the image indicated by the image signal D1 from when the imaging unit 10 outputs the imaging signal DS1 is a total time of a time (image processing time UA) required to perform the image processing of the image signal generation unit 20 and a time (waiting time UB) to wait for the display preparation of the display unit 40 after the image processing is completed.

Hereinafter, the second state will be described using the relationship between the imaging signal DS2 (DGS2) output from the imaging unit 10 during the imaging vertical scanning period Fs2 and the image signal D2 (DGB2) output from the image signal generation unit 20 to the display unit 40 during the display vertical scanning period Fd2 as an example by referring to FIGS. 22 and 24.

FIG. 24 is a timing chart for describing the relationship between the imaging signal DS-J2[pJ] (imaging signal DGS2[m]) and the image signal D2[m] (image signal DGA2[m] and image signal DGB2[m]). As shown in this drawing, if the imaging signal including the imaging signals DS-J2[m] and DS-J2[m+1] is output from the imaging unit 10 (if the output of the signal DGS2[m] is started for convenience's sake), the image processing unit 21 starts to generate the image signal DGA2[m] based on the imaging signal DGS2[m]. The image processing unit 21 completes the generation of the image signal DGA2[m] after the image processing time UA2[m] elapses from the starting of the image processing, and stores the generated signals in the line buffer 22.

In the example shown in FIG. 24, it is assumed that the image signals D2[1], D2[2], and D2[3] are the image signals D[m] output from the image signal output unit 23 before the time Tth and the image signal D2[4] is the image signal D[m] output from the image signal output unit 23 after the time Tth.

Before the time Tth, the line L2 temporally precedes the line L3 (line L4). That is, before the time Tth, the output permission pulse PL[m] is not output from the output control unit 31 at the timing when the generation of the image signal DGA2[m] by the image processing unit 21 is completed.

Thus, before the time Tth, the image signal output unit 23 waits for the output of the image signal DGB2[m] by the waiting time UB2[m] until the first horizontal scanning period Hd2[m] after the output permission pulse PL[m] is output, and then outputs the image signal DGB2[m] during the horizontal scanning period Hd2[m].

In the example shown in FIG. 24, the image signal output unit 23 waits for the output of the image signal DGB2[1] by the waiting time UB2[1] after the image signal DGA2[1] is generated, and then outputs the image signal DGB2[1] during the horizontal scanning period Hd2[1]. Similarly, the image signal output unit 23 waits for the output of the image signal DGB2[2] by the waiting time UB2[2] after the image signal DGA2[2] is generated, and then outputs the image signal DGB2[2] during the horizontal scanning period Hd2[2].

Meanwhile, after the time Tth, the line L4 temporally precedes the line L2 in general. In a case where the line L4 temporally precedes the line L2, if the image processing unit 21 generates the image signal DGA2[m], the display unit 40 can display the image indicated by the image signal DGB2[m] immediately (during the horizontal scanning period Hd immediately after the generation of the signal). Thus, in a case where the line L4 temporally precedes the line L2, the output permission pulse PL[m] is output from the output control unit 31 at the timing when the generation of the image signal DGA2 by the image processing unit 21 is completed.

In the example shown in FIG. 24, the image signal output unit 23 outputs the image signal DGB2[3] during the first horizontal scanning period Hd2[3] after the image signal DGA2[3] is generated and the output permission pulse PL[3] is output.

In the example shown in this drawing, the image signal DGA2[4] is generated after the horizontal scanning period Hd2[4] is started. Thus, the image signal output unit 23 outputs the image signal DGB2[4] during the first horizontal scanning period Hd2[5] after the image signal DGA2[4] is generated and the output permission pulse PL[4] is output.

The timing generator 32 sets the horizontal scanning period Hd2[4] to be the inactive horizontal scanning period Hd-D.

As stated above, in the second state shown in FIG. 24, after the time Tth, since the display delay caused by the image processing occurs, the inactive horizontal scanning period Hd-D is inserted into the vertical active data period DVI of the display vertical scanning period Fd2. That is, in the second state, the time length of the display vertical scanning period Fd is a total time of the standard vertical scanning time Td and the extended vertical scanning time Tex.

A delay time ΔT2 to when the display unit 40 displays the image indicated by the image signal D2 from when the imaging unit 10 outputs the imaging signal DS2 is a total time of the time (image processing time UA) required to perform the image processing of the image signal generation unit 20 and the time (waiting time UB) required to wait for the display preparation of the display unit 40 before the time Tth, and is only the time (image processing time UA) required to perform the image processing of the image signal generation unit 20 in a case where the line L4 temporally precedes the line L2 after the time Tth. Thus, the delay time ΔT2 according to the second state is less than the delay time ΔT1 according to the first state.

Hereinafter, the third state will be described using the relationship between the imaging signal DS3 (DGS3) output from the imaging unit 10 during the imaging vertical scanning period Fs3 and the image signal D3 (DGB3) output from the image signal generation unit 20 to the display unit 40 during the display vertical scanning period Fd3 as an example by referring to FIGS. 22 and 25.

FIG. 25 is a timing chart for describing the relationship between the imaging signal DS-J3[pJ] (imaging signal DGS3[m]) and the image signal D3[m] (the image signal DGA3[m] and the image signal DGB3[m]).

As shown in FIG. 25, if the imaging signal including the imaging signals DS-J3[m] and DS-J3[m+1] is output from the imaging unit 10 (the output of the image DGS3[m] is started for convenience's sake), the image processing unit 21 starts to generate the image signal DGA3[m] based on the imaging signal DGS3[m]. The image processing unit 21 completes the generation of the image signal DGA3[m] after the image processing time UA3[m] elapses from the starting of the image processing, and stores the generated signal in the line buffer 22.

In the third state, the line L4 temporally precedes the line L2 in general. In a case where the line L4 temporally precedes the line L2, if the image processing unit 21 generates the image signal DGA3[m], the display unit 40 can display the image indicated by the image signal DGB3[m] immediately (during the horizontal scanning period Hd immediately after the generation of the signal). Thus, in this case, the output permission pulse PL[m] is output from the output control unit 31 at the timing when the generation of the image signal DGA3[m] by the image processing unit 21 is completed.

Specifically, in the example shown in FIG. 25, the image signal output unit 23 outputs the image signal DGB3[1] during the first horizontal scanning period Hd3[3] after the image signal DGA3[1] is generated and the output permission pulse PL[1] is output, outputs the image signal DGB3[2] during the first horizontal scanning period Hd3[5] after the image signal DGA3[2] is generated and the output permission pulse PL[2] is output, outputs the image signal DGB3[3] during the first horizontal scanning period Hd3[7] after the image signal DGA3[3] is generated and the output permission pulse PL[3] is output, and outputs the image signal DGB3[4] during the first horizontal scanning period Hd3[9] after the image signal DGA3[4] is generated and the output permission pulse PL[4] is output. In this case, since the vertical active data period DVI of the display vertical scanning period Fd1 is started but the output permission pulse PL[1] is not output, the timing generator 32 performs a process of outputting the inactive horizontal scanning period Hd-D during the horizontal scanning periods hd3[1] and Hd3[2] and similarly outputting the inactive horizontal scanning period Hd-D during the periods Hd3[4], Hd3[6], and Hd3[8].

As stated above, in the third state shown in FIG. 25, since the display delay caused by the image processing occurs, the inactive horizontal scanning period Hd-D is inserted into the vertical active data period DVI of the display vertical scanning period Fd3. As a result, in the third state, the time length of the display vertical scanning period Fd is adjusted with the precision of the horizontal scanning period Hd such that the display unit 40 can display in synchronization with the imaging signal DS output during the imaging vertical scanning period Fs. That is, roughly speaking, in the third state, the display vertical scanning period Fd is adjusted so as to be substantially the same as the imaging vertical scanning period Fs.

In the third state, in a case where the line L4 temporally precedes the line L2, the display unit 40 displays the image indicated by the image signal D[m] during the first horizontal scanning period Hd after the image processing unit 21 generates the image signal D[m]. Thus, a delay time ΔT3 from when the imaging unit 10 outputs the imaging signal DS3 to when the display unit 40 displays the image indicated by the image signal D3 is substantially the same as the time (image processing time UA) required to perform the image processing of the image signal generation unit 20. Specifically, in the third state, a delay time ΔT3 from when the imaging unit 10 starts to output the imaging signal DS-J[pJ] to when the display unit 40 starts to display the image indicated by the image signal D[m] and the image processing time UA necessary for the image processing unit 21 to generate the image signal D[m] are equal with the precision of the horizontal scanning period Hd.

Thus, in the third state, the delay from the imaging by the imaging unit 10 to the displaying by the display unit 40 can be minimized with the precision of the horizontal scanning period Hd. In this case, the delay time ΔT3 is less than the delay time ΔT1 according to the first state, and is equal to or less than the delay time ΔT2 according to the second state.

As stated above, a time (cycle) necessary for the display unit 40 to display one screen is less than a time (cycle) necessary for the imaging unit 10 to image one screen. Thus, even in a case where the vehicle imaging display apparatus 1 operates in the first state and the display delay due to the bottleneck phenomenon occurring in the display preparation of the display unit 40 occurs, the display delay slowly is reduced for every imaging vertical scanning period Fs. That is, even in a case where the vehicle imaging display apparatus 1 operates in the first state, the vehicle imaging display apparatus may ultimately transition to the operation in the third state, and may maintain the operation in the third state after the operation in the third state is started. As a result, the display timing of the display unit 40 can follow the completion timing of the image processing of the image processing unit 21 with the precision of the horizontal scanning period Hd.

<4. Advantages of First Embodiment>

In the vehicle imaging display apparatus 1 according to the present embodiment, the image signal D[m] is output from the image signal output unit 23 in a case where the first condition and the second condition are satisfied, and the output timing of the image signal D[m] from the image signal output unit 23 is adjusted with the precision of the horizontal scanning period Hd by inserting the inactive horizontal scanning period Hd-D in a case where the first condition or the second condition is not satisfied. That is, in the vehicle imaging display apparatus 1 according to the present embodiment, the display unit 40 can display the image indicated by the image signal DM during the first horizontal scanning period Hd after the image processing unit 21 generates the image signal D[m]. Accordingly, the delay from the imaging by the imaging unit 10 to the displaying by the display unit 40 can be minimized with the precision of the horizontal scanning period Hd.

In the vehicle imaging display apparatus 1 according to the present embodiment, the time length of the display vertical scanning period Fd can be varied and can be maintained so as to be substantially the same as the time length of the imaging vertical scanning period Fs by inserting the inactive horizontal scanning period Hd-D into the vertical active data period DVI. Thus, it is possible to realize high-quality display with suppressed flickers in displaying.

For example, according to the present embodiment, even in a case where a part or all of the phase difference between the imaging unit 10 and the display unit 40, the frame rate of the imaging unit 10, and the highest frame rate at which the display unit 40 can display is changed, such as a case the image processing time is changed due to a change of the image processing method, a case where the image processing time UA is changed for every line, a case where the imaging unit 10 is replaced with an imaging unit having a different frame rate, or a case where the display unit 40 is replaced with a display unit having a different frame rate, the phase difference PD can automatically converge on the length equal to or less than the image processing time UA.

In the present embodiment, since the image indicated by the partial image signal D-L, the image indicated by the partial image signal D-R, and the image indicated by the partial image signal D-C are displayed in the display area AD formed in one display unit 40, it is possible to suppress the vehicle imaging display apparatus 1 at lower cost than that in a case where three display units are provided in a one-to-one correspondence with three partial image signals D-J.

Incidentally, in the present embodiment, the time necessary for the left-image image processing unit 21L to perform the image processing for generating the partial image signal D-L[m], the time necessary for the right-image image processing unit 21R to perform the image processing for generating the partial image signal D-R[m], and the time necessary for the center-image image processing unit 21C to perform the image processing for generating the partial image signal D-C[m] may be different from one another due to a difference (see FIG. 6) between the number of pixels of the imaging signal DS-L of the imaging signals DS output from the imaging unit 10, the number of pixels of the imaging signal DS-R thereof, and the number of pixels of the imaging signal DS-C thereof.

In this case, for example, in a case where three display units are provided in a one-to-one correspondence with three partial image signals D-J and the images indicated by the partial image signals D-J are individually displayed on the respective display units, the display timings are different for the display units. In such a case, the display quality of the three display units may be deteriorated as a whole.

In contrast, in the image processing circuit 100 according to the present embodiment, after the first condition indicating that all the partial image signal D-L[m], the partial image signal D-R[m], and the partial image signal D-C[m] are generated is satisfied, the three partial image signals D-J[m]

are output as one image signal D[m]. The display unit 40 displays the image indicated by the image signal D[m] including the three partial image signals D-J[m] in one display area AD during the same horizontal scanning period Hd. Accordingly, it is possible to suppress a deterioration in display quality of the entire display area AD caused by a different display timing for each display area AD-J.

<B. Second Embodiment>

As shown in FIG. 10, it has been described in the aforementioned first embodiment that the output timing of the image signal D[m] is adjusted with the precision of the horizontal scanning period Hd and the time length of the horizontal scanning period Hd is the fixed length by inserting the inactive horizontal scanning period Hd-D into the vertical active data period DVI.

In contrast, the vehicle imaging display apparatus according to the second embodiment is different from the vehicle imaging display apparatus 1 according to the first embodiment in that the output timing of the image signal D[m] is adjusted at, for example, a cycle of the display dot clock signal DCLK by setting the time length of the horizontal scanning period Hd as the variable length.

Hereinafter, the vehicle imaging display apparatus according to the second embodiment will be described with reference to FIGS. 26 to 28. Components having the same advantages or functions of the second embodiment to be described below as those of the first embodiment will be assigned the reference signs referred to in the aforementioned description, and thus, the detailed description thereof will be appropriately omitted (the same is true of modification examples to be described below).

Figure 26:
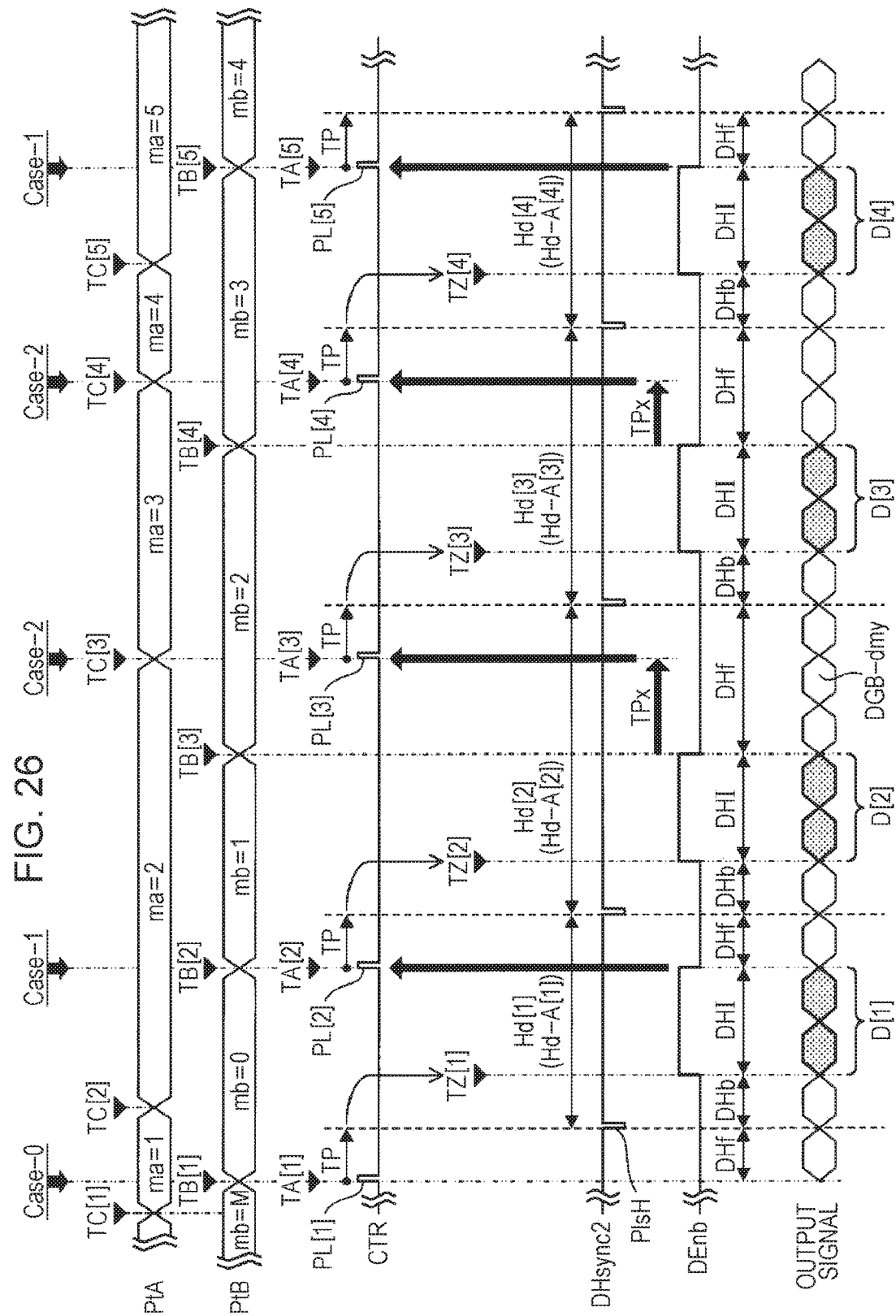
FIG. 26 is a timing chart for describing an operation of a vehicle imaging display apparatus according to a second embodiment of the present invention.

FIG. 26 is an explanatory diagram for describing the relationship between the output control signal CTR, the enable signal DEnb, and a display horizontal synchronization signal DHsync2 which are generated by the timing control unit 30 (the output control unit 31 and the timing generator 32) included in the vehicle imaging display apparatus according to the second embodiment.

The timing control unit 30 included in the vehicle imaging display apparatus according to the second embodiment has the same configuration as that of the vehicle imaging display apparatus 1 (see FIG. 10) according to the first embodiment except that the timing generator 32 generates a display horizontal synchronization signal DHsync2 having a display horizontal synchronization pulse PlsH with a variable cycle instead of the display horizontal synchronization signal DHsync, and generates a display vertical synchronization signal DVsync2 having a display vertical synchronization pulse PlsV with a variable cycle instead of the display vertical synchronization signal DVsync.

As shown in FIG. 26, similarly to the first embodiment, the output control unit 31 according to the second embodiment sets the output permission pulse PL[m] to the output control signal CTR at the later time (the image processing determination time TAM since the second aspect is adopted in this drawing) of the image processing determination time TA[m] and the display preparation determination time TB[m].

As shown in FIG. 26, the timing generator 32 according to the second embodiment outputs the display horizontal synchronization pulse PlsH as the display horizontal synchronization signal DHsync2 after a reference front porch time TP which is a fixed time length elapses from the timing when the output permission pulse PL[m] is set to the output control signal CTR output from the output control unit 31.

Thus, in a case where the generation of the image signal D[m] is completed before the display preparation determination time TB[m] and the image signal generation time TC[m] elapses (Case-1), the time length of the horizontal front porch period DHf becomes the reference front porch time TP.

Meanwhile, in a case where the generation of the image signal D[m] is not completed before the display preparation determination time TB[m], that is, in a case where the image signal generation time TC[m] arrives later than the display preparation determination time TB[m] (Case-2), the time length of the horizontal front porch period DHf is the total time of the reference front porch time TP and an extended front porch time TPX which is a time length from the display preparation determination time TB[m] to the image signal generation time TC[m] (image processing determination time TA[m]).

As stated above, in the timing generator 32 according to the second embodiment, the output control unit 31 determines that the output preparation of the image signal D[m] is completed, waits to output the output permission pulse PL[m] as the output control signal CTR, and starts the horizontal scanning period Hd[m] after only the reference front porch time TP from the output of the output permission pulse PL[m]. In other words, the timing generator 32 according to the second embodiment extends the horizontal front porch period DHf until the output preparation of the image signal D[m] is completed.

Thus, for example, even in a case where the image processing of the image processing unit 21 on the image signal D[m] is delayed, the image signal output unit 23 can output the image signal D[m] during the horizontal scanning period Hd[m]. In this case, a delay time from when the imaging unit 10 outputs the imaging signal DGS[m] to when the display unit 40 displays the image based on the image signal D[m] is minimized with the precision of the display dot clock signal DCLK.

Figure 27:
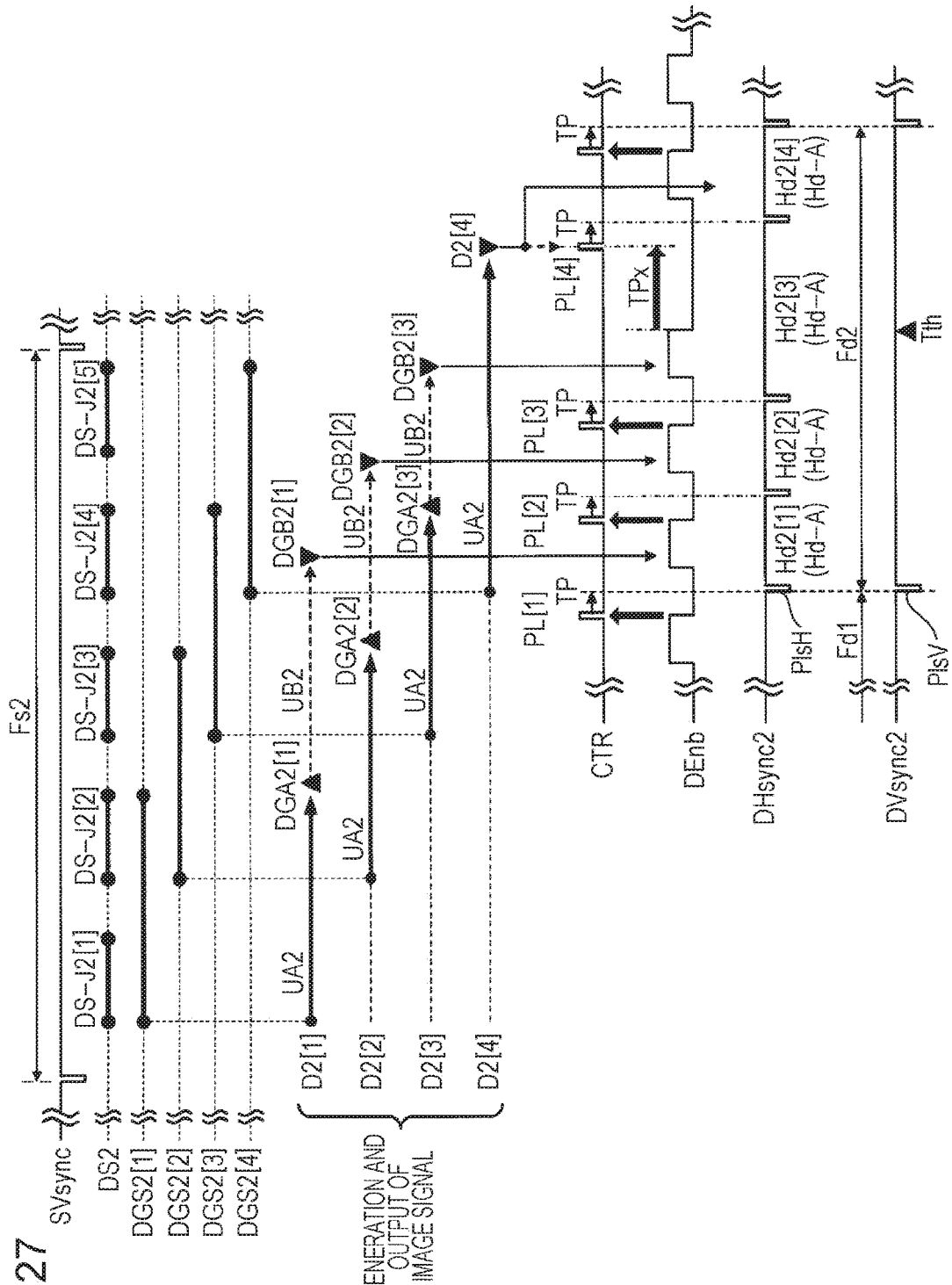
FIG. 27 is a timing chart for describing the operation of the vehicle imaging display apparatus according to the second embodiment.

FIG. 27 is a timing chart for describing an operation of the vehicle imaging display apparatus according to the second embodiment in a state (that is, the second state described in FIG. 24) in which the display delay as the bottleneck phenomenon occurring in the display preparation of the display unit 40 is resolved. FIG. 28 is a timing chart for describing the operation of the vehicle imaging display apparatus according to the second embodiment in a state (that is, the third state described in FIG. 25) in which the display delay due to the bottleneck phenomenon occurring in the image processing of the image processing unit 21 occurs. In FIGS. 27 and 28, the reference signs described in FIGS. 22 to 25 will be used.

In FIG. 27, for example, the image signal DGA2[3] is generated before a falling timing of the enable signal DEnb during the horizontal scanning period Hd2[2]. Thus, the output permission pulse PL[3] is output at the falling timing of the enable signal DEnb during the horizontal scanning period Hd2[2]. In this case, the time length of the horizontal front porch period DHf of the horizontal scanning period Hd2[2] becomes the reference front porch time TP.

Meanwhile, in the example shown in this drawing, the timing when the image signal DGA2[4] is generated is later than the falling timing of the enable signal DEnb during the horizontal scanning period Hd2[3]. Thus, the output permission pulse PL[4] is output at the timing when the image signal DGA2[4] is generated. In this case, the time length of the horizontal front porch period DHf of the horizontal scanning period Hd2[3] becomes the total time length of the reference front porch time TP and the extended front porch time TPX (time from the falling timing of the enable signal DEnb during the horizontal scanning period Hd2[3] to the output of the output permission pulse PL[4]). That is, the horizontal scanning period Hd is extended depending on the status of the image processing after the time Tth when the display delay due to the display preparation of the display unit 40 is resolved.

Figure 28:
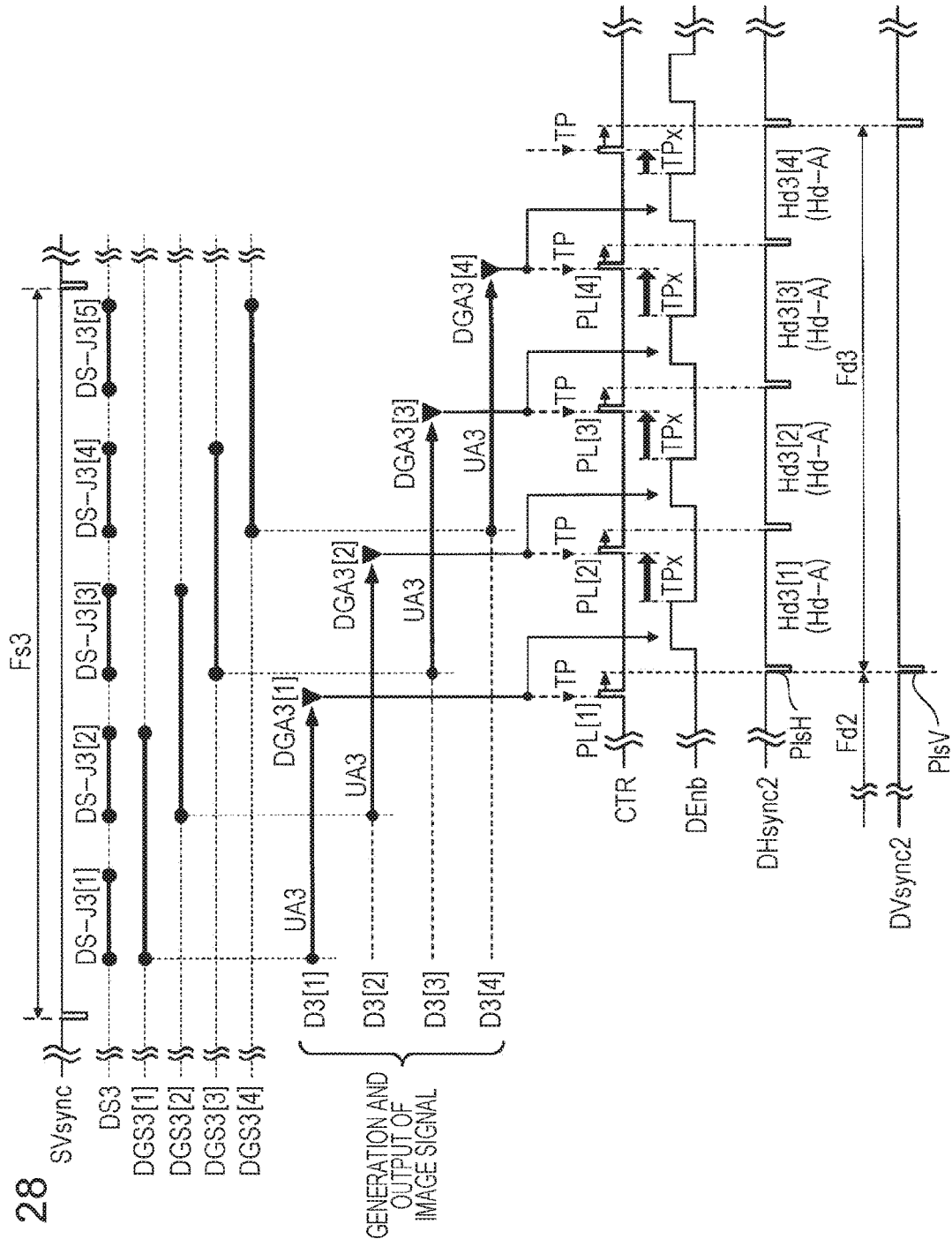
FIG. 28 is a timing chart for describing the operation of the vehicle imaging display apparatus according to the second embodiment.

In FIG. 28, the timing when the image signal DGA3[m] is generated is later than the falling timing of the enable signal DEnb during the horizontal scanning period Hd3[m−1]. Thus, the output permission pulse PL[m] is output at the timing when the image signal DGA3[m] is generated. In this case, the time length of the horizontal front porch period DHf of the horizontal scanning period Hd3[m] becomes the total time length of the reference front porch time TP and the extended front porch time TPX (time from the falling timing of the enable signal DEnb during the horizontal scanning period Hd3[m] to the output of the output permission pulse PL[m]). That is, in a state (third state) in which the display delay due to the bottleneck phenomenon of the imaging processing of the image processing unit 21 occurs, the horizontal scanning period Hd is delayed depending on the status of the image processing.

As can be apparent from FIGS. 27 and 28, in the second embodiment, there is no inactive horizontal scanning period Hd-D, and all the horizontal scanning periods Hd become the active horizontal scanning periods Hd-A.

In the second embodiment, for example, since the horizontal scanning period is varied for every display dot clock signal DCLK, the display vertical scanning period Fd also has a variable time length.

<C. Modification Examples>

The aforementioned embodiments may be variously modified. Specific modification aspects will be described below. Two or more aspects arbitrarily selected from the following examples may be appropriately combined with each other without a contradiction therebetween. In modification examples to be described below, common points with the above-described embodiments of the present invention will be omitted in order to avoid the redundant description thereof.

MODIFICATION EXAMPLE 1

Although it has been described in the aforementioned embodiments that the HUD is used as the display unit 40, the present invention is not limited to such an aspect, and the display unit may be a rear-projection projector, a liquid crystal display device, an organic light emitting diode (OLED) display device, or a plasma display device.

MODIFICATION EXAMPLE 2

Although It has been described in the aforementioned embodiment and modification example that the data transmission between the image processing circuit 100 and the display unit 40 is performed through a low-voltage differential (LVDS) serial interface, the data transmission therebetween may be performed through a parallel interface.

MODIFICATION EXAMPLE 3

Although it has been described in the aforementioned embodiment and modification examples that the imaging vertical scanning period Fs defined by the imaging vertical synchronization signal SVsync has a time length which is equal to or greater than the display vertical scanning period Fd defined by the display vertical synchronization signal DVsync (or DVsync2), the present invention is not limited to such an aspect, and the imaging vertical scanning period Fs may have a time length less than the display vertical scanning period Fd.

MODIFICATION EXAMPLE 4

Although it has been described in the aforementioned embodiment and modification examples that the output control unit 31 determines whether or not the preparation to output the image signal D[m] is completed based on the writing-completion signal PtA output from the image processing unit 21 and the output-completion signal PtB, output from the image signal output unit 23, the present invention is not limited to such an aspect, and the output control unit 31 may determine whether or not the preparation to output the image signal D[m] is completed by determining that the image signal D[m] is registered in the line buffer 22 and the image signal D[m−1] is read from the line buffer 22 by periodically referring to the line buffer 22.

MODIFICATION EXAMPLE 5

Although it has been described in the aforementioned embodiment and modification examples that the image processing times UA[m] are changed for the respective lines, the present invention is not limited to such an aspect, and the image processing times UA[m] may be the same between the lines.

MODIFICATION EXAMPLE 6

Although it has been described in the aforementioned embodiment and modification examples that the imaging unit 10 includes three image sensors 12J (12L, 12C, and 12R), the present invention is not limited to such an aspect, and the imaging unit 10 may include two or more image sensors 12J.

In this case, the image processing unit 21 may include two or more partial image processing units 21J in a one-to-one correspondence with two or more image sensors 12J, or the display area AD may display the images by using two or more display areas AD-J in a one-to-one correspondence with two or more image sensors 12J.

In this case, the first condition indicating that the image processing on the image signal D[m] in the m-th row which is the display target line is completed may be satisfied in a case where the minimum value ma of the values indicated by the partial writing-completion signals PtA-J output from two or more partial image processing units 21J is equal to or greater than the line number m of the display target line. That is, in this case, "image processing line information" is information indicating a line in which the image is displayed last among the lines in which the partial image signals D-J[m] generated by two or more partial image processing units 21J are displayed.

MODIFICATION EXAMPLE 7

Although the aspect in which the image processing unit 21 performs both the horizontal-direction minification and magnification process of relatively further magnifying the area close to the vehicle α in the left and right direction than the area far away from the vehicle body and the vertical-direction minification and magnification process of relatively further magnifying the center area in the up and down direction than the upper or lower area has been described in the aforementioned embodiment and modification examples, the image processing unit may perform any one thereof, or may not perform any one thereof.

The horizontal-direction minification and magnification process of relatively further magnifying the area close to the vehicle body a in the left and right direction than the area far away from the vehicle α is a process capable of being realized by at least any one of the process of minifying the area far away from the vehicle α and the process of magnifying the area close to the vehicle body. That is, it is not necessary to perform the process of minifying the area far away from the vehicle body in a case where the area close to the vehicle body is magnified, and it is not necessary to perform the process of magnifying the area close to the vehicle body in a case where the area far away from the vehicle body is minified. Similarly, the vertical-direction minification and magnification process of relatively further magnifying the center area in the up and down direction than the upper or lower area is a process capable of being realized by at least one of the process of magnifying the center area, the process of minifying the upper area, and the process of minifying the lower area. That is, it is not necessary to perform the process of magnifying the upper or lower area in a case where the center area is magnified, and it is not necessary to perform the process of magnifying the center area in a case where the upper or lower area is minified.

In the minification and magnification process, a ratio between the respective areas LR1 to LR6 (see FIG. 16A) or the respective areas BR1 to BR9 (see FIG. 19), the number of areas to be divided, a magnification ratio, or a minification ratio thereof may be appropriately changed.

MODIFICATION EXAMPLE 8

Although it has been described in the aforementioned embodiment and modification examples that the mirror image generation process is performed after the trimming process and then the horizontal-direction minification and magnification process and the vertical-direction minification and magnification process are performed, the present invention is not limited thereto, and the performing order may be appropriately changed. It has been described in the aforementioned embodiments that after the image of the trimming area AreaT-J trimmed in the trimming process is magnified so as to match to the size of the display area AD-J, the left-right reversal process, the horizontal-direction minification and magnification process, and the vertical-direction minification and magnification process are performed. However, the left-right reversal process may be performed without magnifying the trimmed image, and then the magnification process for matching to the size of the display area AD-J may be performed in the horizontal-direction minification and magnification process and the vertical-direction minification and magnification process. In such a configuration, it is possible to reduce the image processing time.

MODIFICATION EXAMPLE 9

Although the arrangement example of the magnification display area Area-L in which the image displayed in the left display area AD-L is magnified and displayed, the magnification display area Area-C in which the image displayed in the center display area AD-C is magnified and displayed, and the magnification display area Area-R in which the image displayed in the right display area AD-R is magnified and displayed has been described in the aforementioned embodiment and modification examples in FIGS. 3A and 3B, these areas may be appropriately changed without departing from the gist of the present invention.

MODIFICATION EXAMPLE 10

Since the brightness of the image reflected on the wing mirror or the rear-view mirror is not sufficient while driving at night, the driver may not sense danger. Thus, the image processing unit 21 may perform the process of correcting the brightness of the image based on the imaging signal DS in addition to the image processing described in the aforementioned embodiments and modification examples. It is possible to display an image outside of the vehicle more useful for safely driving the vehicle even though the image is an image imaged in a dark place by performing the correction for increasing the brightness of the image based on the imaging signal DS.

MODIFICATION EXAMPLE 11

Although it has been described in the aforementioned embodiment and modification examples that the vehicle imaging display apparatus mounted on the vehicle α is used as the "imaging display apparatus", the "imaging display apparatus" is not limited to the vehicle imaging display apparatus mounted on the vehicle. For example, the imaging display apparatus may be used in a display device such as a projector device, a head-up display (HUD), or a head-mounted display (HMD).

The entire disclosure of Japanese Patent Application No. 2014-163407, filed Aug. 11, 2014 and Japanese Patent Application No. 2015-136740, filed Jul. 8, 2015 are expressly incorporated by reference herein.

REFERENCE SIGNS LIST

1 VEHICLE IMAGING DISPLAY APPARATUS
10 IMAGING UNIT
12 IMAGE SENSOR
12L REAR-LEFT IMAGE SENSOR
12C REAR-CENTER IMAGE SENSOR
12R REAR-RIGHT IMAGE SENSOR
13 TIMING GENERATOR
20 IMAGE SIGNAL GENERATION UNIT
21 IMAGE PROCESSING UNIT
21L LEFT-IMAGE IMAGE PROCESSING UNIT
21C CENTER-IMAGE IMAGE PROCESSING UNIT
21R RIGHT-IMAGE IMAGE PROCESSING UNIT
22 LINE BUFFER
23 IMAGE SIGNAL OUTPUT UNIT
30 TIMING CONTROL UNIT
31 OUTPUT CONTROL UNIT
32 TIMING GENERATOR
33 PARAMETER TRANSMISSION UNIT
40 DISPLAY UNIT
41 CONTROLLER
42 LIQUID CRYSTAL PANEL
50 CONTROL UNIT
60 OPERATION UNIT
100 IMAGE PROCESSING CIRCUIT
AD DISPLAY AREA
AD-L LEFT DISPLAY AREA
AD-C CENTER DISPLAY AREA
AD-R RIGHT DISPLAY AREA AD-R

The invention claimed is:

1. An imaging device comprising:
    an imaging unit that includes K imaging elements (K is a natural number which is equal to or greater than 2) which image subjects and output imaging signals indicating imaging results in synchronization with an imaging synchronization signal;
    a display unit that includes K display areas in a one-to-one correspondence with the K imaging elements of the imaging unit, and is configured to display an image at a frame rate higher than that of the imaging unit in synchronization with a display synchronization signal;
    an image signal generation unit including an image processing unit, a memory, and an image signal output unit,
        the image processing unit performing image processing on at least an imaging signal that has been output from a j-th imaging element of the imaging unit and generating a partial image signal indicating an image to be displayed in a j-th display area (the j is a natural number which satisfies 1≤j≤K) of the display unit, the image processing unit at least performing, as the image processing, a resizing process to convert the imaging signal to the partial image signal that corresponds to a count number of pixels of the display unit,
        the memory storing the partial image signal that has been generated by the image processing unit,
        the image signal output unit acquiring, from the memory, an image signal which includes K partial image signals, which have been generated by the image processing unit and correspond to the K display areas, and indicates an image to be displayed on the display unit, and outputting the image signal from the image signal generation unit to the display unit in synchronization with the display synchronization signal; and
    a timing control unit that controls a timing of the image signal output unit to acquire the image signal from the memory and output the image signal from the image signal generation unit to the display unit,
    wherein, when a time from starting of a frame of the imaging synchronization signal to starting of a frame of the display synchronization signal is a phase difference, a frame rate of the imaging unit is a first frame rate, and a highest frame rate at which the display unit is configured to display is a second frame rate, the timing control unit is configured to
        control the image signal output unit to acquire the image signal and output the image signal from the image signal generation unit to the display unit such that the display unit displays the image at the second frame rate, in first timing control for gradually decreasing the phase difference in a case where the phase difference is greater than a predetermined time that is a maximum processing time of processing times in which the image processing unit performs the image processing on the K partial image signals,
        control the image signal output unit to acquire the image signal and output the image signal from the image signal generation unit to the display unit such that the display unit displays the image at the first frame rate, in second timing control after the phase difference is equal to or less than the predetermined time.

2. The imaging device according to claim 1,
    wherein, in a case where the phase difference is greater than the predetermined time, the timing control unit generates the K partial image signals, waits until the image indicated by the K partial image signals is configured to be displayed on the display unit, and outputs the image signal including the K partial image signals to the display unit.

3. The imaging device according to claim 1,
    wherein the display synchronization signal includes a display horizontal synchronization pulse having a predetermined cycle, and
    the timing control unit outputs the image signal including the K partial image signals to the display unit in synchronization with a first display horizontal synchronization pulse output after an image signal generation time when the generation of the K partial image signals is completed in a case where the image signal generation time is equal to or less than a display available time when the image indicated by the K partial image signals is configured to be displayed on the display unit after the phase difference is equal to or less than the predetermined time.

4. The imaging device according to claim 1,
    wherein the timing control unit outputs the display synchronization signal including a display horizontal synchronization pulse having a variable cycle, stops outputting the display horizontal synchronization pulse and stops outputting the image signal including the K partial image signals until an image signal generation time when generation of the K partial image signals is completed, in a case where the image signal generation time is equal to or less than a display available time when the image indicated by the K partial image signals is configured to be displayed on the display unit after the phase difference is equal to or less than the predetermined time, and outputs the display horizontal synchronization pulse and outputs the image signal including the K partial image signals in synchronization with the output display horizontal synchronization pulse after the image signal generation time.

5. The imaging device according to claim 1,
    wherein the display unit is provided within a vehicle, and the imaging elements image the outside of the vehicle.

6. The imaging device according to claim 5,
    wherein the K imaging elements included in the imaging unit include a first imaging element that images a subject in the rear of the vehicle, a second imaging element that images a subject on a rear left side of the vehicle, and a third imaging element that images a subject on a rear right side of the vehicle, and
    the K display areas of the display unit include a first display area that corresponds to the first imaging element, a second display area that corresponds to the second imaging element and is formed on a left side of the first display area, and a third display area which corresponds to the third imaging element and is formed on a right side of the first display area.

7. A vehicle imaging display system comprising:
    the imaging device according to claim 1.

8. A vehicle comprising the imaging display system according to claim 7.

* * * * *